US005969283A

United States Patent [19]

Looney et al.

[11] Patent Number: 5,969,283

[45] Date of Patent: Oct. 19, 1999

[54] MUSIC ORGANIZER AND ENTERTAINMENT CENTER

[75] Inventors: Brian M. Looney, Lexington, Mass.; Dale R. McMullin, Parker, Colo.; Joseph Pasciuto, Bellingham; Edward T. Doyle, Westford, both of Mass.

[73] Assignee: Looney Productions, LLC, Lexington, Mass.

[21] Appl. No.: 09/098,843

[22] Filed: Jun. 17, 1998

[51] Int. Cl.[6] .............................. G09B 5/00; G09B 15/04; H04L 9/00; G10H 1/46

[52] U.S. Cl. ................................ 84/609; 84/639; 84/478; 84/633; 380/19; 380/25; 380/49; 380/53; 434/307 A

[58] Field of Search ..................... 84/601, 602, 609–614, 84/633–640, 477 R, 478, DIG. 6; 434/307 R, 307 A; 380/19–21, 23–25, 30, 49, 50, 53

[56] References Cited

U.S. PATENT DOCUMENTS

| | | | |
|---|---|---|---|
| 5,486,645 | 1/1996 | Suh et al. | 84/610 |
| 5,510,573 | 4/1996 | Cho et al. | 84/610 |
| 5,616,876 | 4/1997 | Cluts | 84/609 |
| 5,619,425 | 4/1997 | Funahashi et al. | 434/307 A X |
| 5,670,730 | 9/1997 | Grewe et al. | 84/609 |
| 5,679,911 | 10/1997 | Moriyama et al. | 84/601 |

*Primary Examiner*—Stanley J. Witkowski
*Attorney, Agent, or Firm*—Cesari and McKenna LLP

[57] ABSTRACT

A music organizer and entertainment center provides a center having a microprocessor, sound card functions and high-volume data storage and retrieval units for playing back music according to a variety of predetermined categories. Music can be played back in random form or can be played back according to a particular pre-selected order. The categories are provided by service provider who delivers selected titles and/or songs to the end user. The songs are typically loaded using a custom CD-ROM provided from the service provider. The music is provided in- data-compressed form and is decompressed and processed through a sound card during playback. The categories can include a variety of parameters such as title, artists, date, speed, dance characteristics, subjective energy level and music style, such as easy-listening, upbeat, etc.

18 Claims, 27 Drawing Sheets

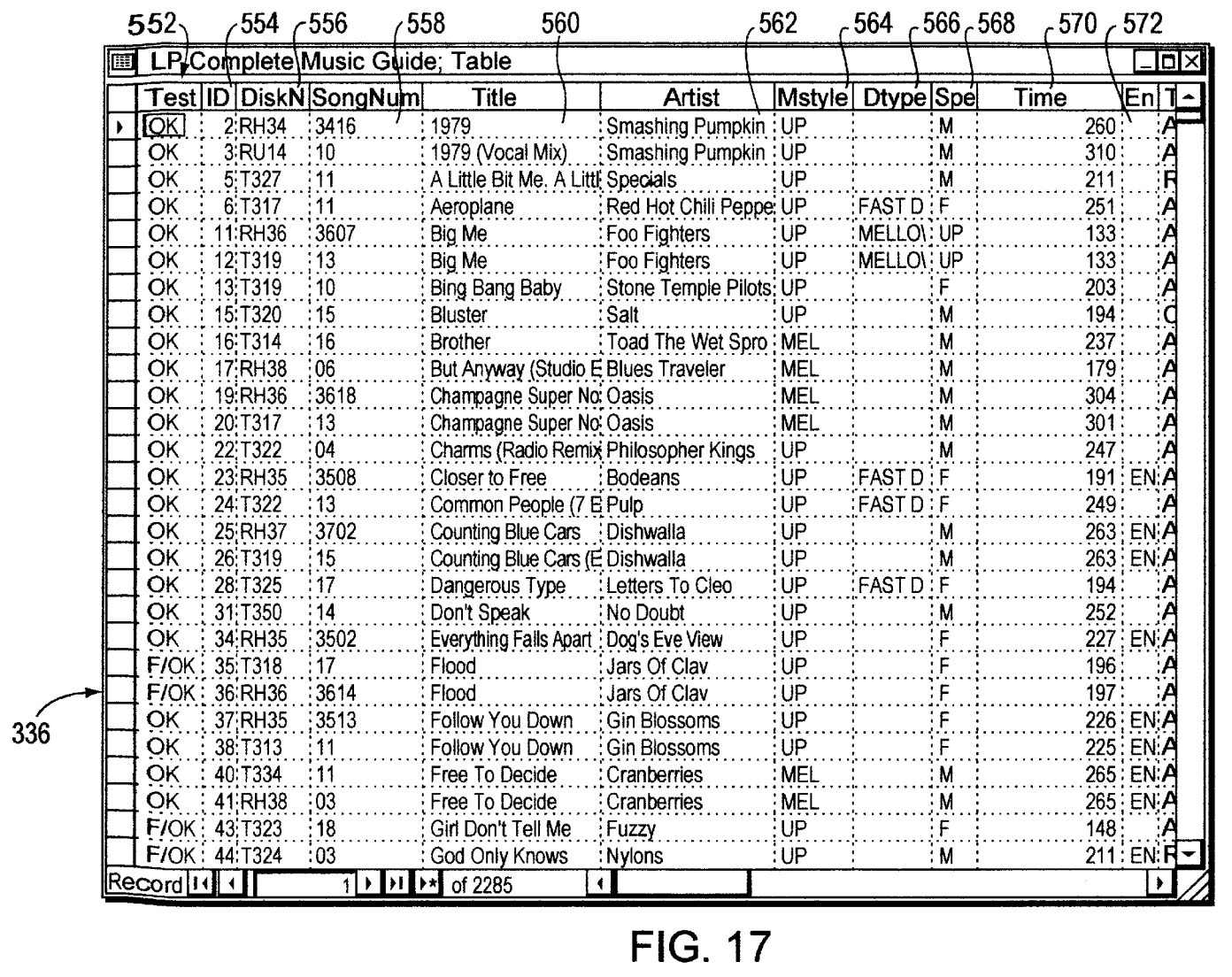

552 554 556 558 560 562 564 566 568 570 572

LP Complete Music Guide; Table

| Test | ID | DiskN | SongNum | Title | Artist | Mstyle | Dtype | Spe | Time | En | T |
|---|---|---|---|---|---|---|---|---|---|---|---|
| OK | 2 | RH34 | 3416 | 1979 | Smashing Pumpkin | UP | | M | 260 | | A |
| OK | 3 | RU14 | 10 | 1979 (Vocal Mix) | Smashing Pumpkin | UP | | M | 310 | | A |
| OK | 5 | T327 | 11 | A Little Bit Me. A Littl | Specials | UP | | M | 211 | | R |
| OK | 6 | T317 | 11 | Aeroplane | Red Hot Chili Peppe | UP | FAST D | F | 251 | | A |
| OK | 11 | RH36 | 3607 | Big Me | Foo Fighters | UP | MELLO\ | UP | 133 | | A |
| OK | 12 | T319 | 13 | Big Me | Foo Fighters | UP | MELLO\ | UP | 133 | | A |
| OK | 13 | T319 | 10 | Bing Bang Baby | Stone Temple Pilots | UP | | F | 203 | | A |
| OK | 15 | T320 | 15 | Bluster | Salt | UP | | M | 194 | | C |
| OK | 16 | T314 | 16 | Brother | Toad The Wet Spro | MEL | | M | 237 | | A |
| OK | 17 | RH38 | 06 | But Anyway (Studio E | Blues Traveler | MEL | | M | 179 | | A |
| OK | 19 | RH36 | 3618 | Champagne Super No | Oasis | MEL | | M | 304 | | A |
| OK | 20 | T317 | 13 | Champagne Super No | Oasis | MEL | | M | 301 | | A |
| OK | 22 | T322 | 04 | Charms (Radio Remix | Philosopher Kings | UP | | M | 247 | | A |
| OK | 23 | RH35 | 3508 | Closer to Free | Bodeans | UP | FAST D | F | 191 | EN | A |
| OK | 24 | T322 | 13 | Common People (7 E | Pulp | UP | FAST D | F | 249 | | A |
| OK | 25 | RH37 | 3702 | Counting Blue Cars | Dishwalla | UP | | M | 263 | EN | A |
| OK | 26 | T319 | 15 | Counting Blue Cars (E | Dishwalla | UP | | M | 263 | EN | A |
| OK | 28 | T325 | 17 | Dangerous Type | Letters To Cleo | UP | FAST D | F | 194 | | A |
| OK | 31 | T350 | 14 | Don't Speak | No Doubt | UP | | M | 252 | | A |
| OK | 34 | RH35 | 3502 | Everything Falls Apart | Dog's Eve View | UP | | F | 227 | EN | A |
| F/OK | 35 | T318 | 17 | Flood | Jars Of Clav | UP | | F | 196 | | A |
| F/OK | 36 | RH36 | 3614 | Flood | Jars Of Clav | UP | | F | 197 | | A |
| OK | 37 | RH35 | 3513 | Follow You Down | Gin Blossoms | UP | | F | 226 | EN | A |
| OK | 38 | T313 | 11 | Follow You Down | Gin Blossoms | UP | | F | 225 | EN | A |
| OK | 40 | T334 | 11 | Free To Decide | Cranberries | MEL | | M | 265 | EN | A |
| OK | 41 | RH38 | 03 | Free To Decide | Cranberries | MEL | | M | 265 | EN | A |
| F/OK | 43 | T323 | 18 | Girl Don't Tell Me | Fuzzy | UP | | F | 148 | | A |
| F/OK | 44 | T324 | 03 | God Only Knows | Nylons | UP | | M | 211 | EN | R |

Record 1 of 2285

336

FIG. 17

MUSIC ORGANIZER AND ENTERTAINMENT CENTER

This application includes a Microfiche Appendix pursuant to 37 CFR 1.96(c) that contains a computer program listing of program commands in the commercially available Visual Basic language for implementing various functions of one embodiment of the center of the present invention described herein. The total number of microfiche and the total number of frames in the Microfiche Appendix are 2 and 103, respectively. A portion of the disclosure of this patent document or patent disclosure contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to music recording and playback systems, and more particularly to a system that enables storage and playback of a wide range of individual music selections/songs according to a pre-programmed list of categories.

BACKGROUND OF THE INVENTION

The storage of music on digital media has presented a number of opportunities to miniaturize storage devices for music, thus enabling larger amounts of music to be stored in one place, and to radically alter the presentation of this music. In addition to the actual music sound data, new data related to certain characteristics of the music can now be overlaid in the storage media. This enables a listener to organize and playback music in a highly customized manner. It is no longer strictly necessary to store music in one format (e.g., a single disc or record) and playback individual selections from this disc or record according to a strict organization scheme. Likewise, advances in data compression and storage technology have enabled much larger quantities of digital data to be stored on magnetic disc and optical media than previously. The "Red Book" format common to music compact discs is somewhat inefficient due to its slow sample rate, and a much larger amount of data can be compressed on a standard data optical disc (CD-ROM), and decompressed and replayed using any number of readily available playback software routines.

In addition, most computers and data processing devices are now equipped with multimedia programs and advanced high-fidelity sound.

It is, therefore, an object of this invention to provide a music organizer and entertainment center that takes advantage of the latest advances in music data compression, storage and data processing capabilities. It is a further object of this invention to provide a user with the ability to fully customize playback of music according to a variety of parameters including categories of music. The graphical presentation of playback and storage controls should be easy to use and learn, and should take advantage of color and other visual aids.

SUMMARY OF THE INVENTION

This invention overcomes the disadvantages of the prior art by providing a music organizer and entertainment center that enables customized playback of music having a variety of predetermined categories that are provided, typically, ahead of time by a service provider. Music is played back in any desired order based upon those categories from an onboard database that can include a large number of songs or titles.

The music organizer and entertainment center provides a center having a microprocessor, sound card functions and high-volume data storage and retrieval units for playing back music according to a variety of predetermined categories. Music can be played back in random form or can be played back according to a particular pre-selected order. The categories are provided by service provider who delivers selected titles and/or songs to the end user. The songs are typically loaded using a custom CD-ROM provided from the service provider. The music is provided in data-compressed form and is decompressed and processed through a sound card during playback. The categories can include a variety of parameters such as title, artists, date, speed, dance characteristics, energy level and music style.

The user selects between a variety of graphical user interface screens that are arranged on a display. The display can comprise a touch screen, or can include a variety of cursor-moving functions for operating different display "buttons" defined on the screen. Alternatively voice recognition software can be used to provide a voice operation capability to the user. Likewise, voice synthesis can be used to inform the user of various system operations.

The interface can be organized according to various music categories that each appear as buttons. Within each button can be contained sub-categories for further organization. All categories are cross indexed with categories that are predefined within various fields of the database, that stores the data for each song in an appropriate file having the various category flags appended thereto. Conventional database software such as Microsoft Access® can be used in forming the database for compressed music data and categories. The music is preferably compressed using MPEG3 and a standard sound card, typically having high-fidelity characteristics is used to playback the decompressed music. The music is stored in a hard drive or other high-volume storage medium on the system in compressed form. Compression of the music, as well as loading of appropriate category flags is accomplished at the service provider's facility based upon the user's orders. Orders can be taken and filled electronically, via the Internet. Alternatively, oral orders can be made, that are filled by preparing a CD-ROM containing the selected songs in compressed form. A master list can be contained on the database of the users' system. This master list can be used to select the various songs from the service provider; the CD-ROM can include updates to the master list that are loaded along with the songs.

The CD-ROM and/or individual songs can include a special code or identification that is keyed to the user's system's code. In this manner only the user's system can load the songs on its hard drive. A docking mechanism can be provided to all or part of the system to allow songs to be moved to different playback devices. In this manner the user can have a library of songs to playback in a variety of portable and fixed base units including vehicles.

One of the categories provided to selections can be ratings. Ratings are typically provided ahead of time by the service provider and are appended to the overall database of categories. The user has, in the center, a facility for blocking out any songs from being listed or searched that exceed a predetermined rating category. A password is used to control the block-out function. This password is initially entered by the user or is provided ahead of time by the service provider. It must be entered in order to control the block-out function.

The center can also be provided with an auto exit function. When an initial screen is called, the user can indicate how many minutes he or she wishes the center to playback songs. When that number of minutes has elapsed, the center automatically shuts off.

It is contemplated that with appropriate data storage techniques and playback facilities, the center can organize video and image data as well as music data. Particular video data compression and playback hardware and software are typically required for such playback.

BRIEF DESCRIPTION OF THE DRAWINGS

The foregoing and other objects and advantages of the invention will become more clear with reference to the following detailed description, as illustrated by the drawings in which:

FIG. 17 is a plan view of a forth graphical user interface screen;

DETAILED DESCRIPTION OF ILLUSTRATIVE EMBODIMENTS

Figure 1:
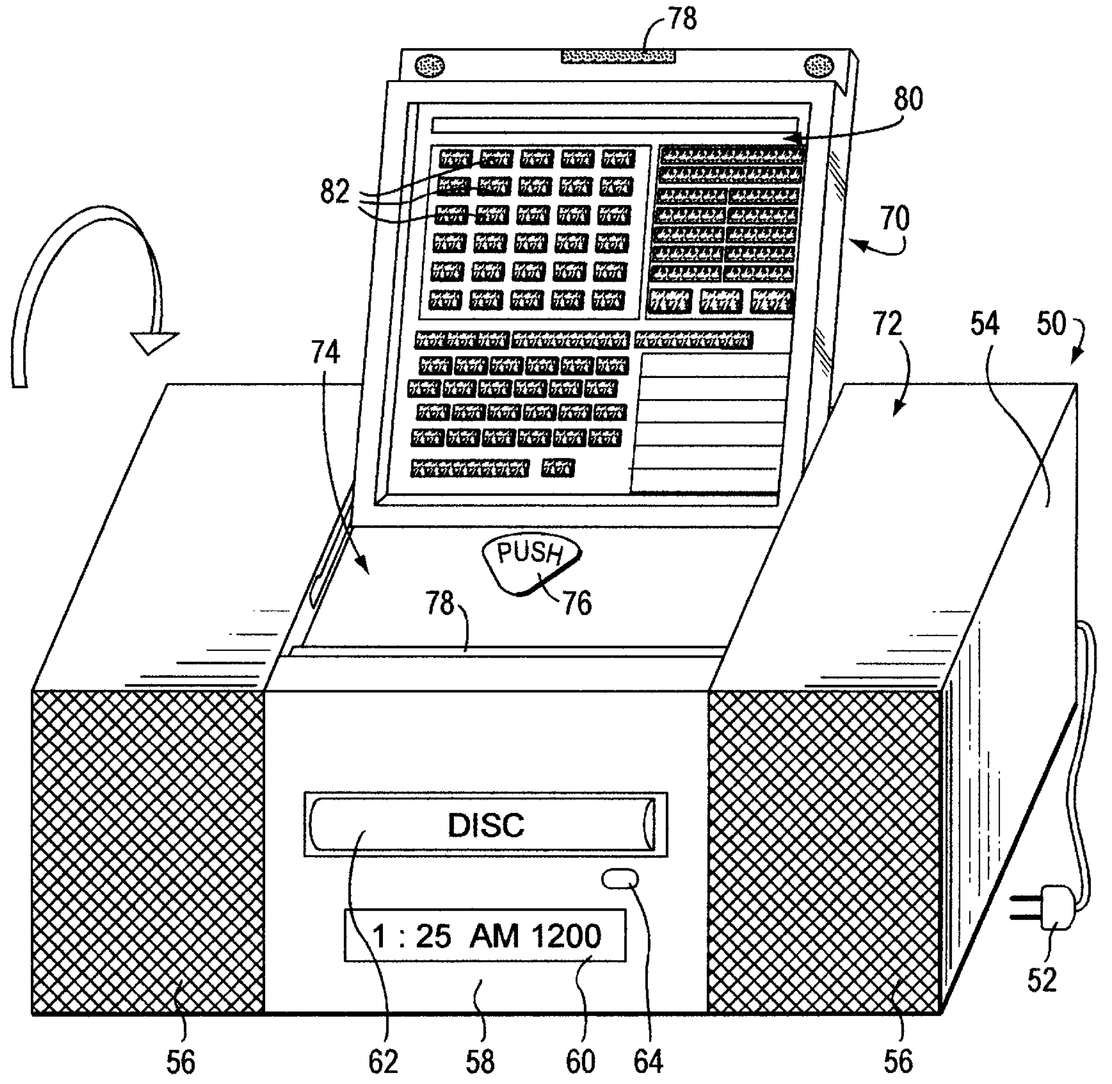
FIG. 1 is a perspective view of an exemplary music organizer and entertainment center according to an embodiment of this invention.

A generalized embodiment of a music organizer and entertainment center 50 is is detailed in FIG. 1. For the purposes of this description the term "center" will be used to describe any of the music organizer and entertainment center systems described herein.

The center 50 is a stand-alone unit powered by household current using a conventional power cord 52. The chassis 54 of the center includes at least two integral speakers 56 to provide stereo sound. A variety of horn-folding and acoustic enhancement techniques can be used to increase the performance of the speakers. Alternatively, separable speakers can be used, placed at remote locations in a room. The front panel 58 of the center can include a variety of knobs, switches and displays. In this embodiment, a basic LCD display 60 is shown and a retractable tray mechanism for receiving an optical data or music compact disc is also provided 62. This tray 62 is conventional according to this embodiment, extending outwardly and retracting inwardly based upon a switch 64. The transport mechanism and reading mechanism can be conventional. The center includes a flip-up type display 70 according to this embodiment. The display is located on the top 72 of the center and is retractable into a recess 74. A large button 76 is provided to support the display 70 in an upright position. This button can be spring-loaded. When it is pushed downwardly, it allows the display to be adjusted into different position. A latch mechanism 78 can be provided to the display 70 and to the recess 74. The latch mechanism allows the display to be locked into a close position, or, alternatively, released for deployment as shown. The display, itself, includes a screen 80 having any acceptable size, format and display technology. For example, a color active-matrix screen, such as that found in a laptop computer can be used. The pixel dimensions are generally comparable to those of a laptop computer display. The display itself includes a graphically user interface with a series of displayed graphical user interface "buttons" 82 that can be actuated using a touch-screen layer applied to the display 80. The touch-screen hardware and controller software are conventional and commercially available. Alternatively, a mouse or other cursor-moving mechanism, such as a track ball, can be provided to the chassis 54.

Figure 2:
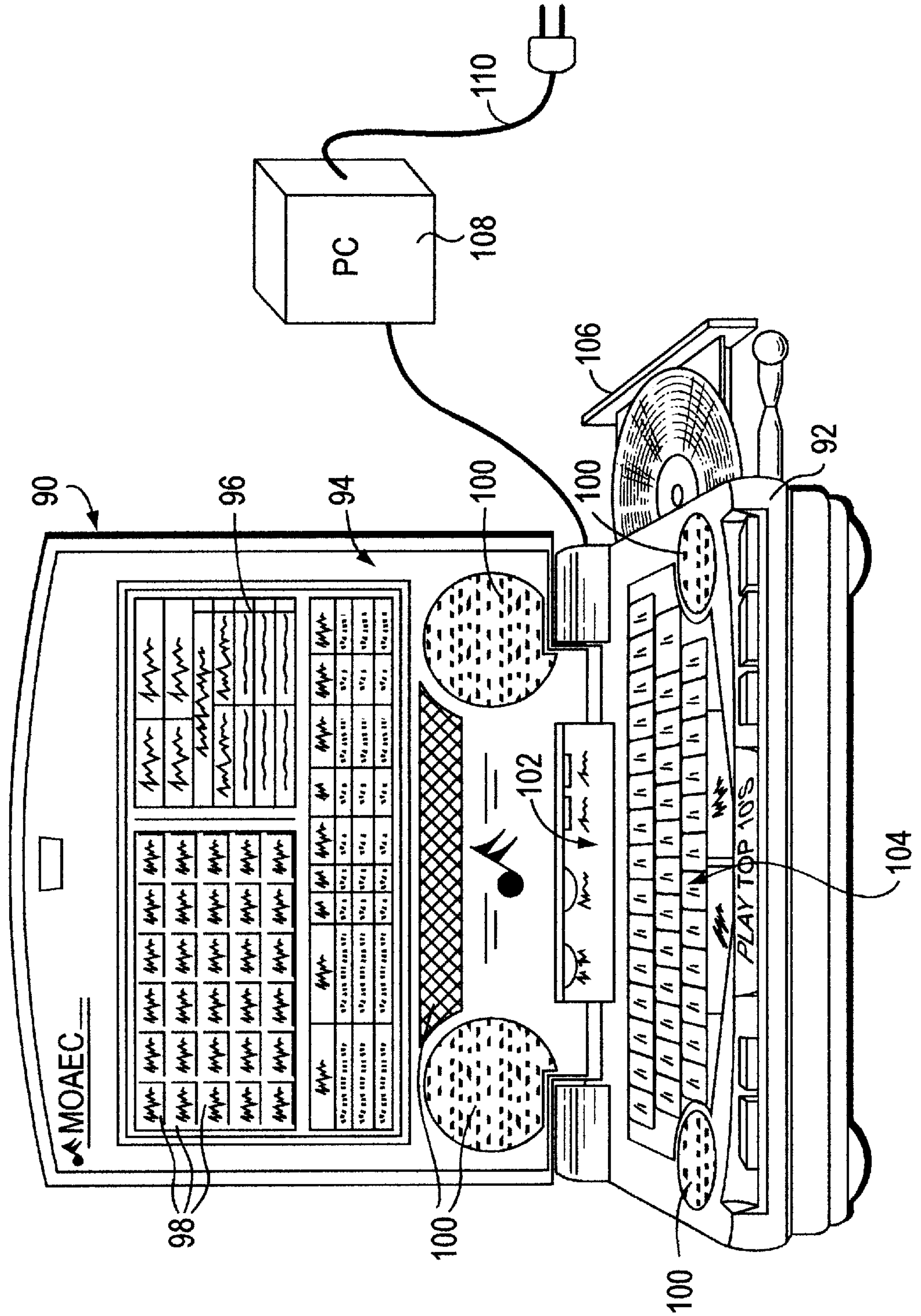
FIG. 2 is a perspective view of an exemplary music organizer and entertainment center designed for portability according to an alternate embodiment of this invention.

With reference to FIG. 2, an alternate embodiment of a center 90 is detailed. This is center comprises a laptop arrangement having a base 92 and a foldable display section 94. This center can comprise, in essence, a modified laptop computer with all the basic components of a modern multimedia computer system. Certain personal computer components not specifically required for the purposes of this embodiment can be omitted. For example, a display 96 having buttons 98 as described above can be provided. A plurality of speakers 100 can also be provided representing base, midrange, tweeters, etc. Volume and screen display controls 102 can also be provided as well as a basic alphanumeric keyboard 104 of conventional design. A retracting compact disc tray and reader 106 can also be provided. An onboard battery (not shown) provides power while an AC/DC converter 108 recharges the unit based upon household current provided by a power cord 110. Note that automotive DC current can also be used.

Figure 3:
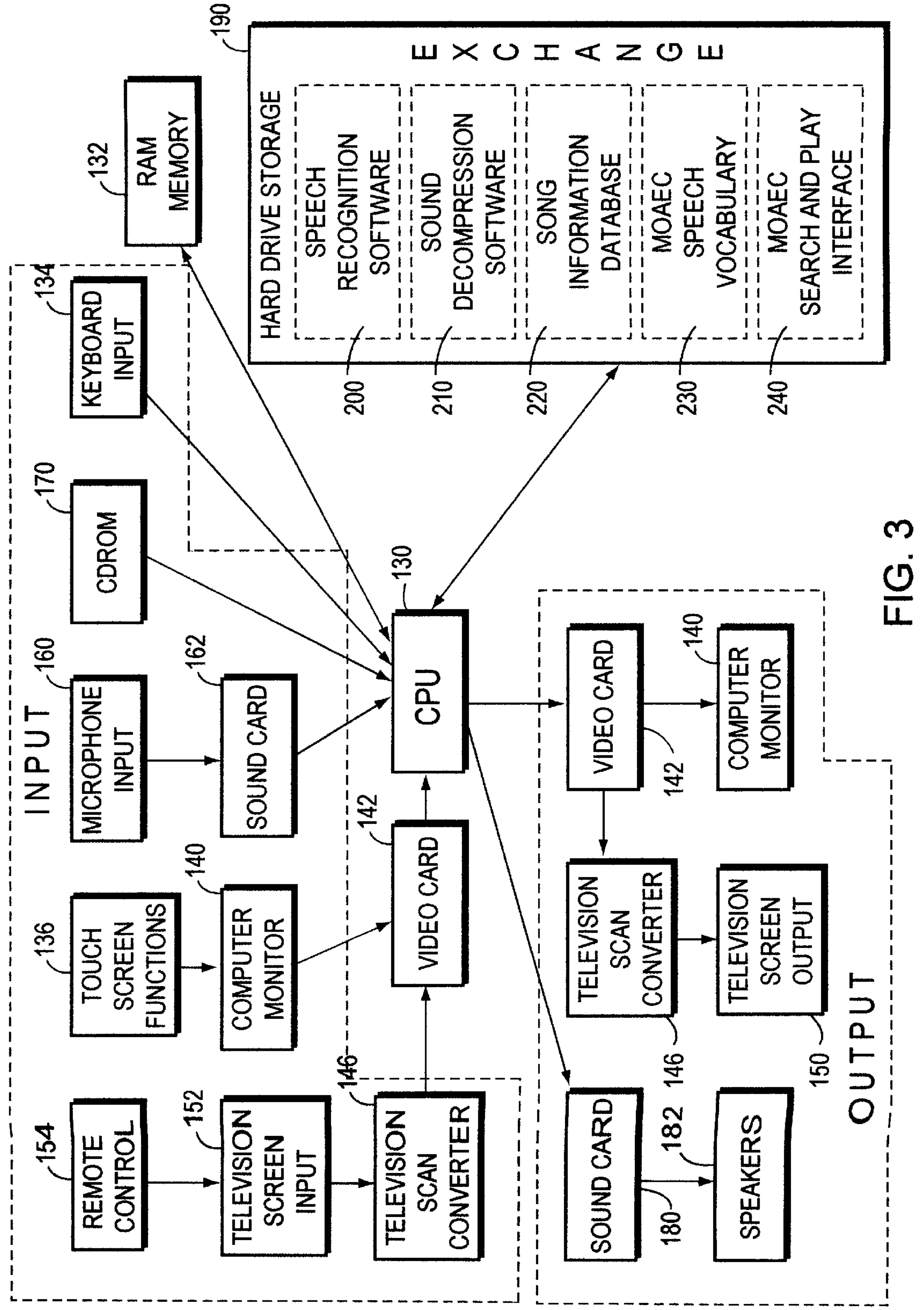
FIG. 3 is a schematic block diagram of the hardware architecture of an exemplary music organizer and entertainment center.

The generalized architecture of a center is further detailed in FIG. 3, complete with optional components. The "heart" of the center is its central processing unit or CPU 130. The CPU, in a preferred embodiment comprises a Pentium® II microprocessor having an operating speed of 266 MHz or greater available from Intel. The architecture of this microprocessor is well-known. It is adapted to accept inputs from a variety of hardware components. These hardware components are, themselves, commercially available and can be interfaced with the CPU 130 by those of ordinary skill. In summary, the components involved in a complete center will now be described.

A random access memory (RAM) 132 is provided to support the CPU 130. This RAM typically provides twenty megabytes of storage or greater. A keyboard and/or cursor-moving mouse interface is also provided. The keyboard 134 can be omitted in certain embodiments where a touch-screen is used for all onboard functions. For example, the touch-screen, shown as a touch-screen interface 136, and used in conjunction with the monitor screen 140, can include a touch-keyboard thereon for entering alphanumeric characters. Where a monitor 140 is used, a video driver card 142 of conventional design is provided. A conventional television can also be utilized. Where a television screen is used for displaying data, a scan converter 146 can be provided. The scan converter 146 can be used for output 150 to the television screen and/or input 152 from, for example, a television remote control 154. In this manner both input and output via a television and/or computer monitor can be accomplished. A microphone 160 and appropriate voice recognition card 162 can also be provided in conjunction with the CPU. Additionally, a CD-ROM, with appropriate driver card 170 can also be provided. For output, a sound card, available from a variety of commercial sources such as the Soundblaster® driver 180 can be employed and appropriate amplifiers and speakers 182 can be provided. The amplifiers and speakers are conventional and receive inputs from the sound card in the form, typically, of analog audio signals.

Input/output exchange of data is provided through a hard drive storage 190, also of conventional design. As will be described further below, the hard drive storage interacts with the CPU 130 using onboard software. This software includes a speech recognition software block 200 a sound decompression software block 210, a sound information database 220 the center's proprietary speech vocabulary 230 and the center's search and play interface 240.

A significant feature of the center, to be described in greater detail below, is the organization of individual songs or selections according to specific categories, that are determined ahead of time, on a partially subjective basis, by the service provider. These categories are carried in a database, along with the raw digital music data, and allow the user to playback each of the individual selections based upon specific categories in a random or ordered manner. The use of categories for storage and playback empowers the user in an entirely new way. Songs can be chosen based upon a specific desire or mood that relates to categories such as music age, energy, speed, style, dance, or rating. Experienced listeners can enjoy new convenience in music playback. Newer listeners typically find their use of the center to be highly educational, as they quickly learn to associate certain types of categories with specific selections, artists and songs, and can enjoy the benefit of a full display of the song data via the center's screen.

With reference to the above-described architecture, the procedure by which individual songs become categorized and eventually made available for a user to playback according to particular categories will be described in summary:

1. Musical source material is first purchased or otherwise acquired by the service provider that services the music organizer and entertainment center of this invention. This music is typically obtained in standard Red Book compact disc format on individual music albums and singles.
2. A standard compact disc player, DAT or other audio playback medium is used by the service provider in conjunction with a main computer having a large database. A hard drive rated at five gigabytes or larger is used in conjunction with the database.
3. Music is played by the playback device into a data compression card commercially available from, for example, Dialog Four™. This data compression card compresses the music into the commercially available MPEG3 format. A CPU, similar to that shown in FIG. 3 stores the music in the hard drive of the service provider in compressed form. Individual songs are each given their own file identifier for later processing.
4. Compressed music is subsequently catalogued using a conventional database program such as Microsoft Access® 2.0 in this embodiment. The following categories, among others can be used in conjunction with the database program to catalog each individual musical selection-song title, artist, date, main music category, sub-main music category, special music category, sub-music category, music style, dance type, music speed and a subjective music "energy level" determined by the service provider. These categories are used subsequently by the center's operating system as described below. All categories are stored in the service provider's hard drive for subsequent retrieval.
5. A master list of available music, in the form of individual selections or songs, is complied by the service provider. Individual customers or subscribers are solicited to select songs or groups of songs or selections from a service provider. According to a preferred embodiment, the selected songs are copied from the service provider hard drive to a writable data compact disc in MPEG3 compressed format. The center operating system software and Access® 2.0 database program available from Microsoft, Inc. of Redmond, Wash. can also be loaded unto this compact disc when the playback device does not already contain these software packages.

The package of data compressed songs and other software if applicable, is tagged with a distinct serial number or other identifier and/or format that matches a pre-loaded serial number or format in the subscriber's particular center. This serial number or format has been pre-loaded in the center from software made available by the service provider. For example, a commercially private or public key encryption algorithm can be provided to the subscriber. The data in the compact disc includes an appropriate encryption key that matches one already present in the center. Compressed data can be decrypted and "unlock" based upon a match between the key provided by the service provider and the key provided by the center. In any case, a technique for locking information so that only a desired center can read the information and, hence, play the songs, is provided. This prevents copyright infringement and unauthorized playback of songs by other units that have not paid appropriate license fees for receiving the music.

6. As noted above, a formatted, data-compressed disc is provided to the subscriber via a physical transfer of the disc. In other words, the disc is mailed or otherwise delivered to the subscriber. It should be noted that, while an optical disc is the preferred form of data transfer according to an embodiment of this invention, another form of storage media such as tape, circuit chips, removable hard drive, or any other acceptable high-volume data storage can be used to transfer song data. Likewise, the formatted compressed data can be transferred via a radio or telephone network link, assuming that appropriately wide bandwidths is available to enable the transfer to occur in a sufficiently short period of time. All these techniques of transferring formatted, compressed, customized song data are expressly contemplated according to this invention. It is desired primarily that the data include various categories as described above with reference to step 4.

When the subscriber receives the customized song data on the disc or other medium, the customer installs the disc in his or her center by following conventional installation and instructions provided with the disc. As noted, the center either includes well known CD-ROM installer routines, such as those found in popular Windows( operating system available from Microsoft or, alternatively, specialized installation software is included with the disc transferred from the service provider. All data on the disc is typically transferred into the high-volume hard drive or other storage media provided with the center. The song data, therefore, resides in the center formatted in the Access® 2.0 database as described above. The categories appended to each song as part of the database program also reside in the center's hard drive at this time.

7. The center's software loads data related to individual song selections and categories into appropriate database locations.
8. The center polls data in the downloaded disc to determine whether the appropriate identification code and/or serial number, matching that of the center is present. If not, then the downloading process in terminated, and the user is advised to contact the service provider.
9. If downloading of song data is completed successfully, then the data becomes resident on the center's disc drive or other high-volume random access memory storage unit. New songs are appended to a list that contains any previous songs. This information is displayed in a manner to be described further below.
10. The CD-ROM is subsequently removed from the center and stored for backup purposes. At this time, the user can select various songs downloaded in the previous steps using various graphical user interface and/or voice commands to be described further below.
11. Upon playback, song data is decompressed from its stored format using MPEG3 data compression. The decompressed song data is then played in a standard "wave" format using, for example, Winplay 3® available from Microsoft, or another data-to-sound software procedure. It is contemplated that the software procedure be compatible with an appropriate sound card, as described above. Speakers and an amplifier are used to deliver music to the user, as also described above.

Reference will now be made to the flow diagrams illustrated in FIGS. 4–10, and corresponding graphical user interface display screen illustrations will also be referenced. These display screens are shown in FIGS. 11–17.

Figure 4:
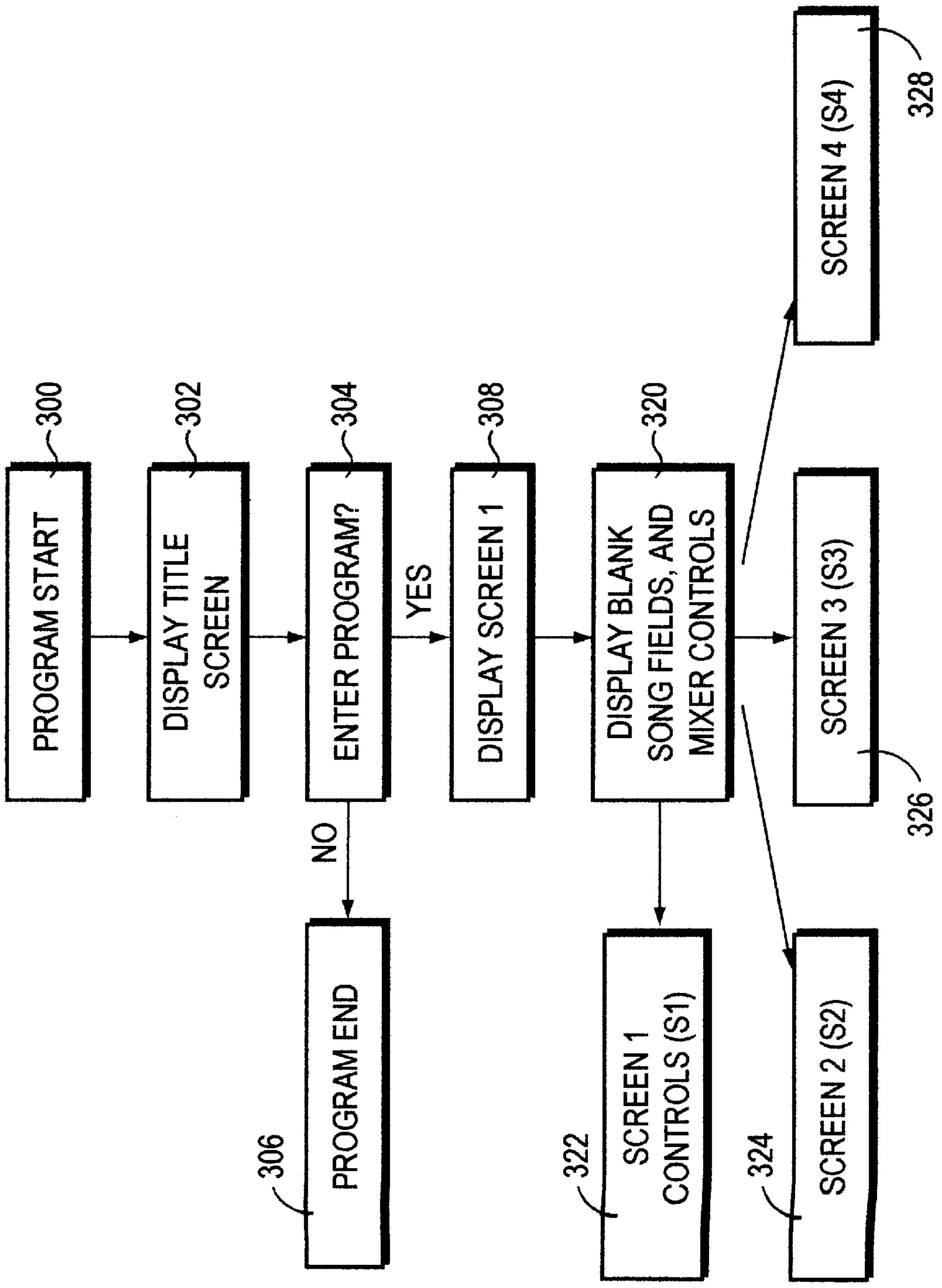
FIG. 4 is a schematic flow diagram illustrating a basic control data path for the music organizer and entertainment center of this invention.

Referring first to FIG. 4, the user initializes the program in a program start step 300. A title screen, not shown, is displayed 302. Any acceptable title screen can be used. The title screen prompts the user to enter the program in step 304. If the user does not desire to enter the program, it ends in step 306. If the user enters the program, then Screen1 is entered in step 308. Screen1 is shown in the display 310 in FIG. 11. Note that the various screens, entitled Screen1, Screen2, Screen3 and Screen4 are denoted respectively by buttons S1 (312), S2 (314), S3 (316) and S4 (318). These buttons appear on the bottom of all display screens used herein so that a user can quickly select between different control screens. The blank control fields are displayed in step 320. Based upon these fields, a user selects between Screen1 controls in step 322, Screen2 controls in step 324, Screen3 controls in step 326 and Screen4 controls in step 328.

Note that the Screen2 display 330 is shown in FIGS. 12, 13, 14 and 15. Likewise, Screen3 displays 332 are shown in FIG. 16 and Screen4 displays 336 are shown in FIG. 17. These screen displays will be described further below.

Figure 11:
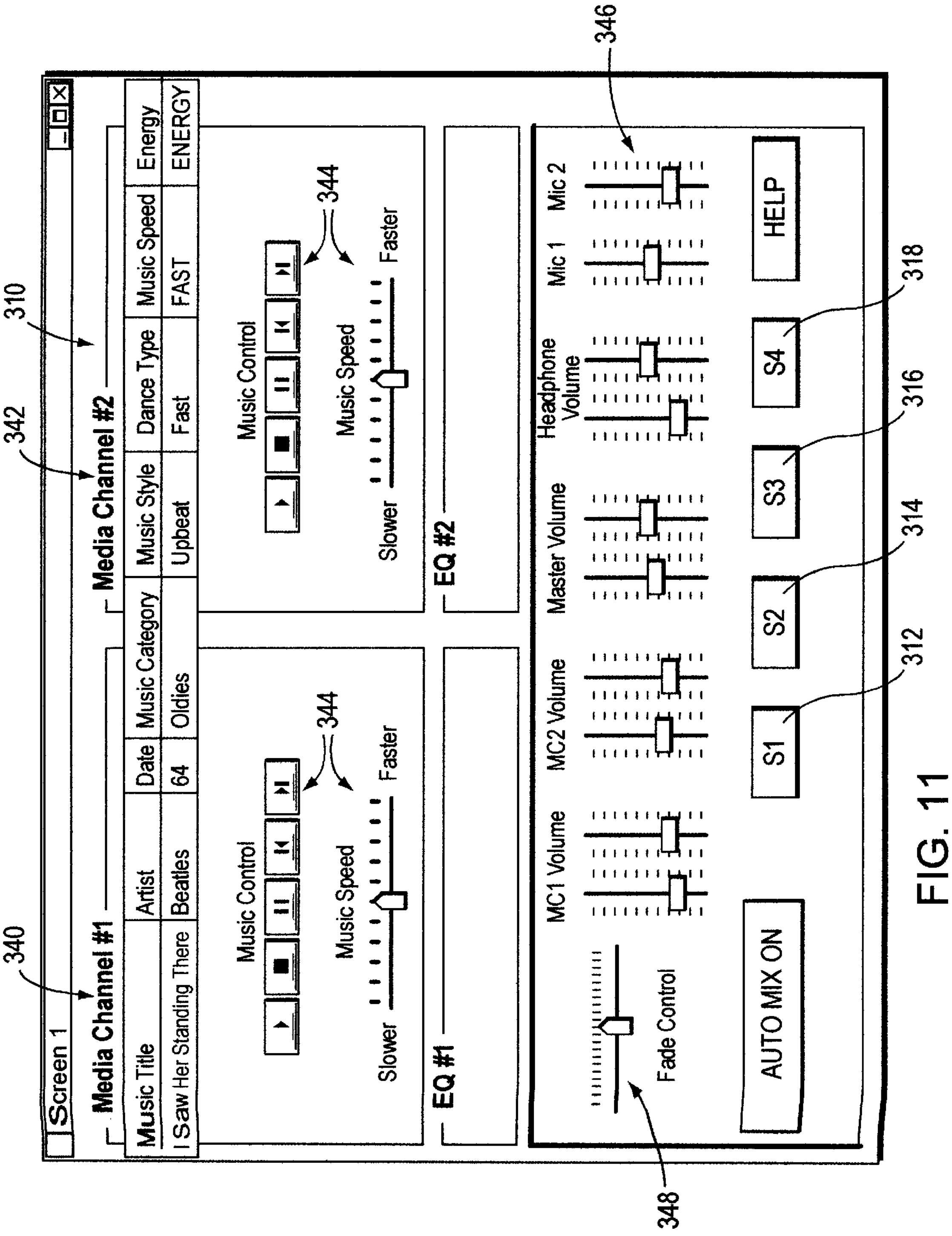
FIG. 11 is a plan view of a first graphical user interface screen.

With reference to Screen1, as shown in FIG. 11, various media channels for playing back music can be established. In this example, Channel1 340 and Channel2 342 are provided. Each channel includes an individual set of speed and playback buttons 344 having conventional control symbols allowing, for example, play, stop, pause, forward and reverse. Additional controls 346 can also be provided for the channels and can be used, for example, for specialized functions such as mixing of songs and overriding of songs using, for example, external microphone inputs. Note that, in particular, a fade control 348 is provided.

Figure 5:
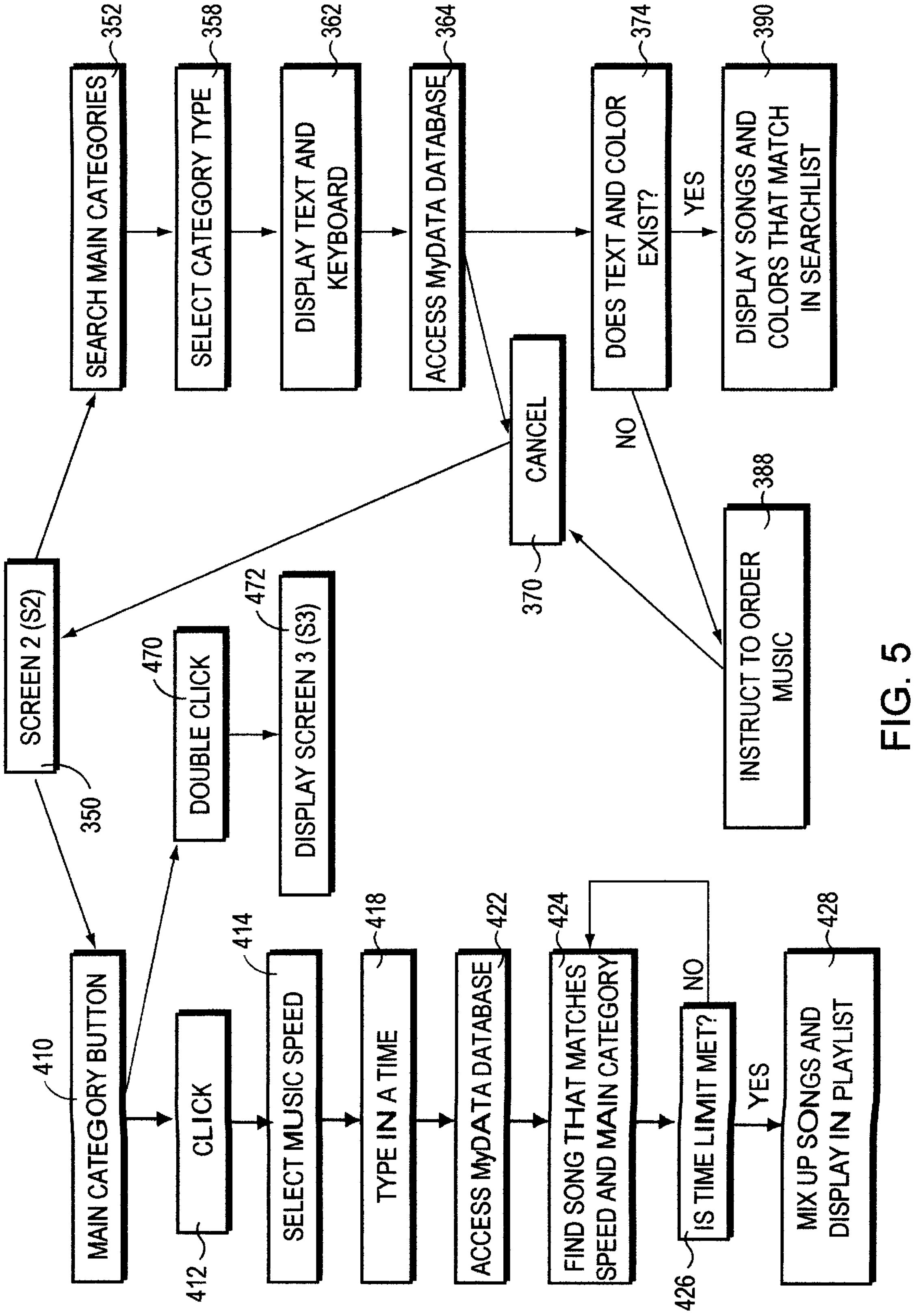
FIG. 5 is a schematic flow diagram illustrating the use of a graphical user interface screen selected according to the flow diagram of FIG. 4.
Figure 12:
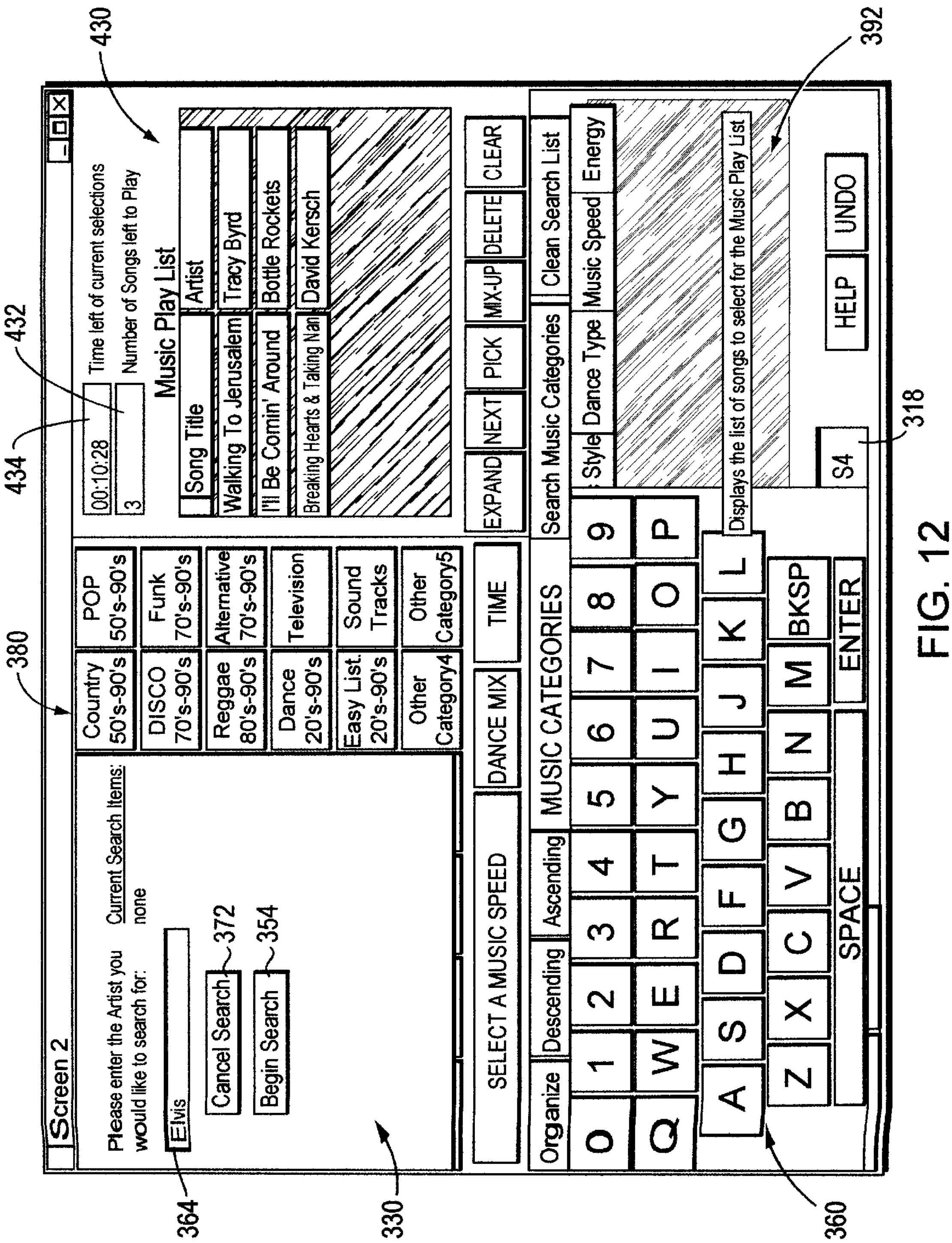
FIG. 12 is a plan view of a second graphical user interface screen.

FIG. 5 details user operations utilizing Screen2 after branching from step 350. Screen2 is shown generally in FIG. 12, as noted above. By branching to the searching step 352, a user can search the main categories of music recognized by the system. The begin search button 354 (FIG. 12) controls the searching of main categories. As noted, a variety of categories such as artists, as shown in FIG. 12, can be searched. The selection of an appropriate category is noted in block 358. Various text can be entered using a keyboard 360 (FIG. 12) according to the block 362. The particular element being searched as shown in the window 364 causes the system program to access a main song database entitled MyData in block 364. The request can be canceled in block 370, which causes a branching back to the initial screen block 350. The button 372 enables cancellation.

Figure 13:
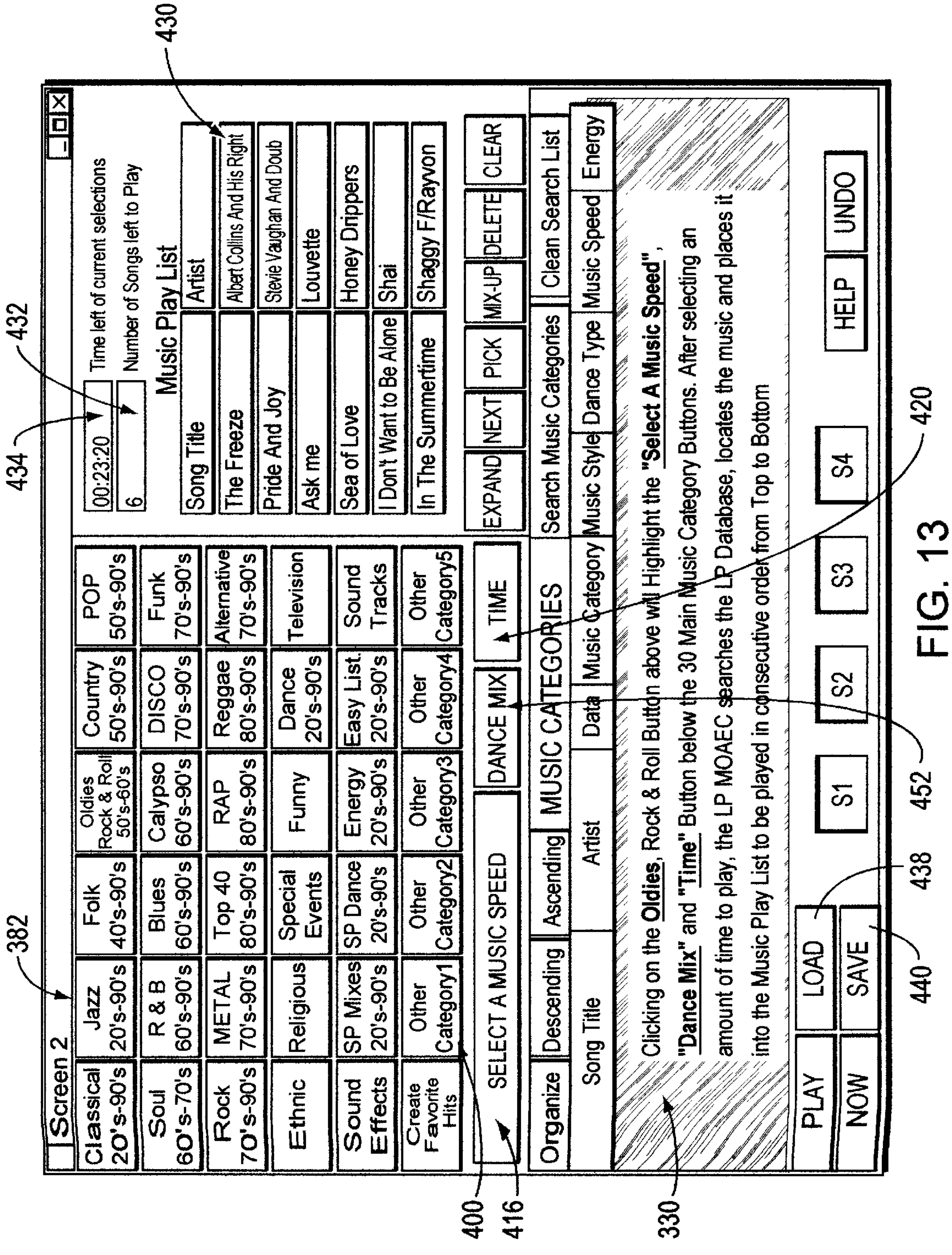
FIG. 13 is a more-detailed plan view of the second graphical user interface screen of FIG. 12.

If no cancellation occurs, then block 374 determines whether the requested category and text within the category exists. In addition, categories and information can be characterized according to a variety of colors, as displayed in the partial window of categories 380 and the more complete window, as shown in FIG. 13 as window 382. If the particular category and/or text does not exists, then block 388 notes its absence and suggests ordering the desired music. This block then branches to the cancellation block 370. Conversely, if the particular categories and/or text exists, then the appropriately organized songs are displayed according to block 390 in the window 392.

Screen2 acts generally, as a main control screen for searching and playing any selections within the center. The illustrated window 382 in FIG. 13 shows some of the possible categories that can be organized by the service provider and cross-referenced within the database with respect to each individual selection. "Other category" buttons 400 are provided for future expansion. If one of the main category buttons in the window 382 is selected, as shown in block 410, then the routine determines whether a single or double "click" of the user interface has occurred. If a single click occurs as shown in block 412, then the system prompts the user to select a music "speed" in block 414 according to screen button 416. The user is then prompted to input an appropriate time duration within which music will be played in block 418 based upon button 420. Given these parameters, the system accesses the database in step 422 to determine music matching, the selected criteria for time and category. Songs are entered in a play list according to the categories based upon blocks 424, 426 and 428. In particular, according to block 428, the songs can be randomized after the time and category criteria have been met to provide a "disc-jockey" type playback which is somewhat arbitrary. The play list for the given time is detailed in window 430. The number of songs in the play list currently remaining as shown in window 432 and the time remaining is shown in window 434. Time values are based upon pre-entered time values provided by the service provider in the original database. Like other criteria, time of a song can be determined as an individual criteria. Conversely, the time of song can be measured based upon the size of the data file and upon other criteria well known to those of ordinary skill.

At any time, a portion of the current search list 451 is displayed, showing the various depicted categories such as title, artist, publication date, music category music style, dance type, music speed and energy in row-and-column form. The search list represents the selections located by pressing one or more category buttons. Songs from the search list can be appended to the end of the play list 430 by, for example clicking on their entry in the search list 451.

Figure 14:
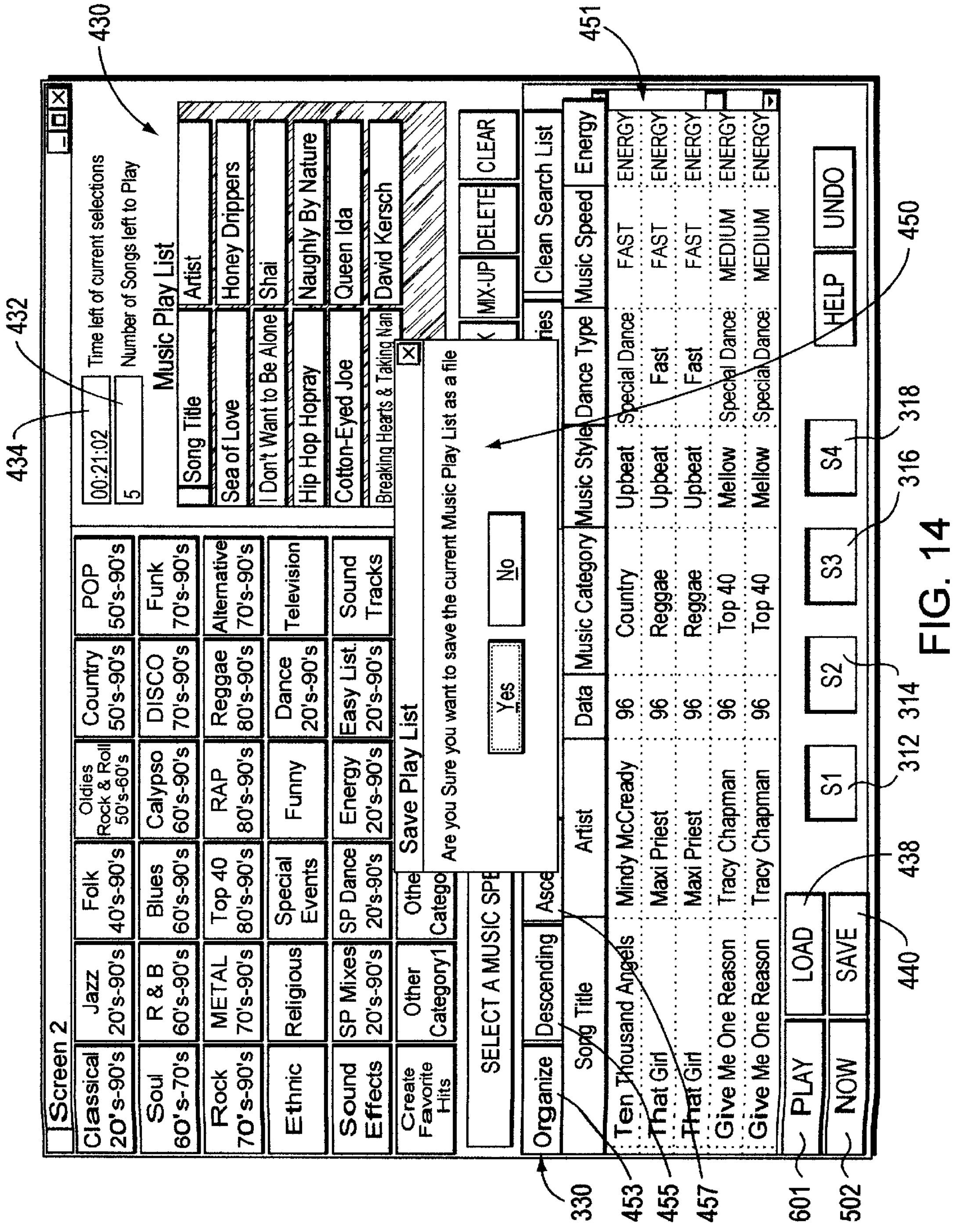
FIG. 14 is a more-detailed plan view showing the saving of music play list selections using the graphical user interface screen of FIG. 12.

Once a selected play list is created, the user has the option to load and/or save the play list using respective buttons 438 and 440. If the save button 440 is pressed, then a confirmation window 450 is displayed as shown in FIG. 14. This particular play list is assigned a name and can be replayed at any give time by calling up the particular play list from a menu.

A set of buttons of particular interest are used to organize the search list 451 so that the song titles therein are displayed in a desired manner. The organize button 453 allows displays to be refined. In particular, by pressing either ascending or descending buttons 455 and 457, respectively, the search results can be displayed in corresponding order.

Another button of interest as detailed in FIG. 13 is the "dance mix" button 452. This button is a default selection button that selects and searches for dance music having a particular speed. In a preferred embodiment, this function specifically selects, at random, from the MyData database three dance category songs with a fast speed category followed by two dance category songs having a slow speed category. These songs, the order three fast and then two slow are placed in the music play list for playback at the earliest available time.

Figure 15:
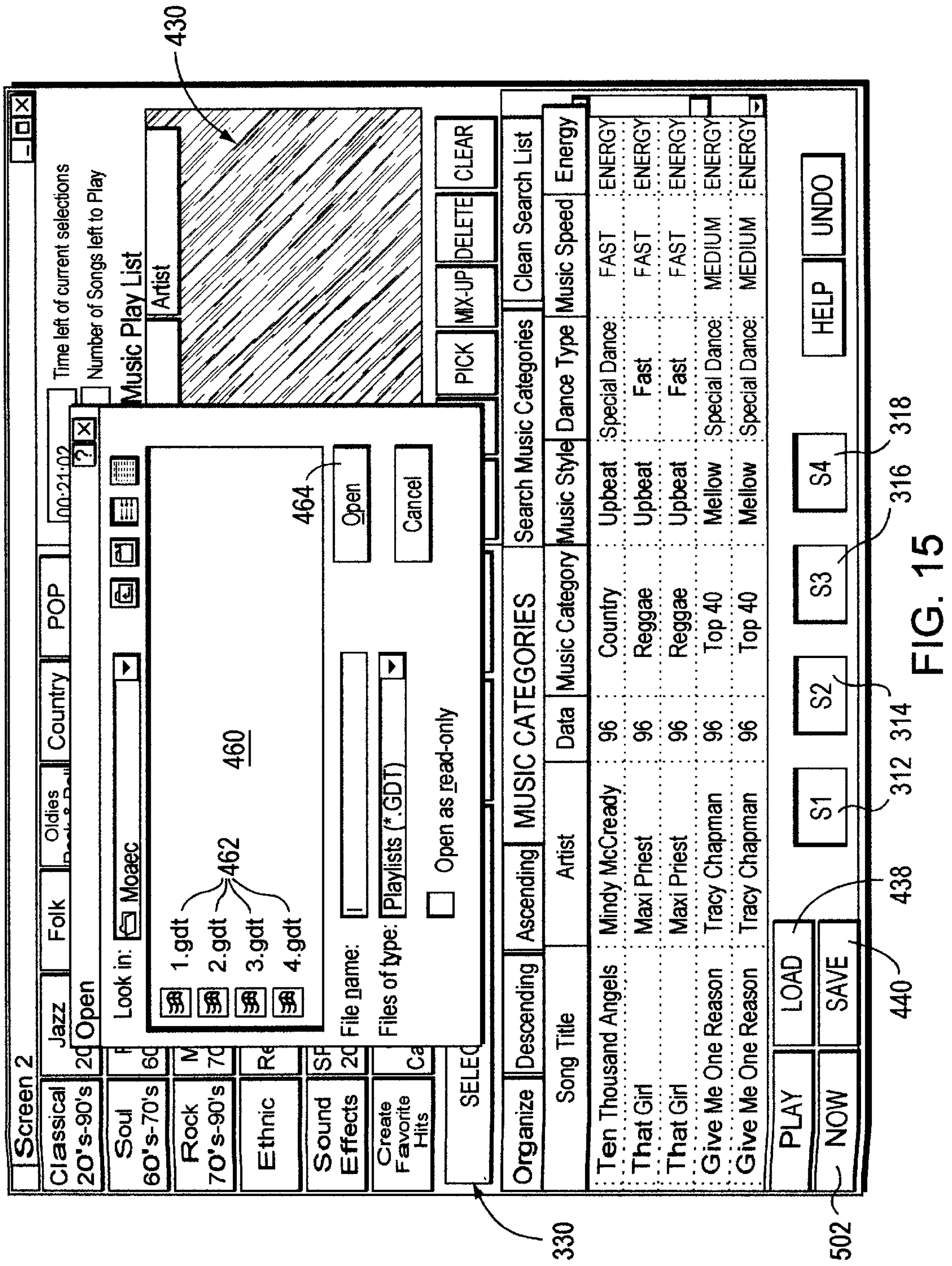
FIG. 15 is a more-detailed plan showing the loading of a music play list using the graphical user interface screen of FIG. 12.
Figure 16:
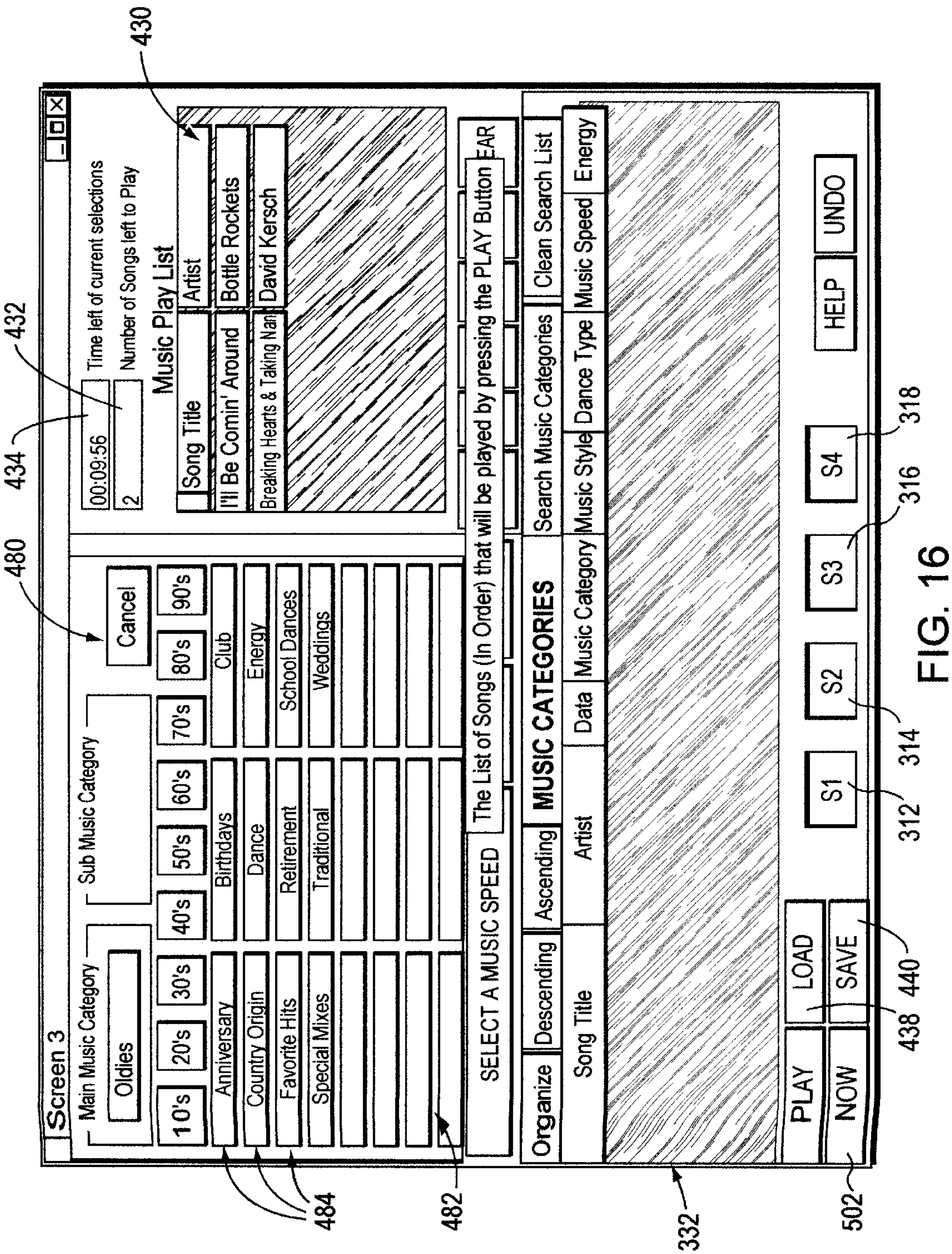
FIG. 16 is a plan view of a third graphical user interface screen.

FIG. 15 shows a file listing window 460 having a four separate play list files 462 that can be selected. The selected play list file 462 can be transferred to the main music play list window 430 by pressing the open button 464 within the window 460.

Before discussing the system procedure further, it is noted that pressing the category button as detailed in step 410 (FIG. 5) twice (e.g., "double click") as shown in block 470, causes the particular category button to display Screen3 480 (FIG. 16). The display of Screen3 is detailed in block 472. Screen3 provides a window 482 with subcategories that fall under a particular music category. The sub-categories are listed as individual buttons 484. These categories can comprise a variety of parameters such as time frame, special occasions, type of music, etc. In addition, the basic categories such as speed or "energy" can be included as subcategories under a particular category.

Figure 6:
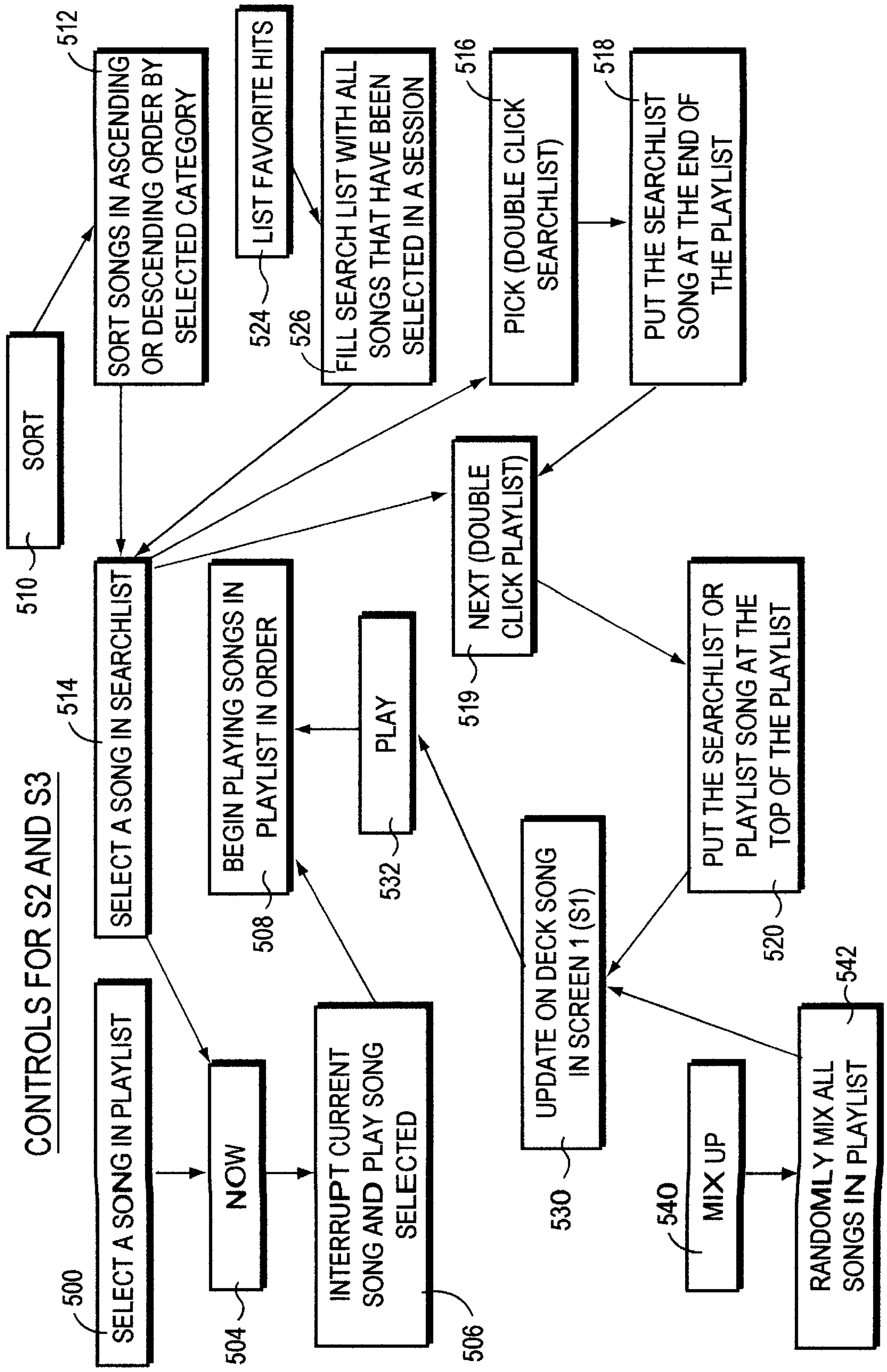
FIG. 6 is a schematic flow diagram showing the selection of a graphical user interface screen selected according to the flow diagram of FIG. 4.
Figure 7:
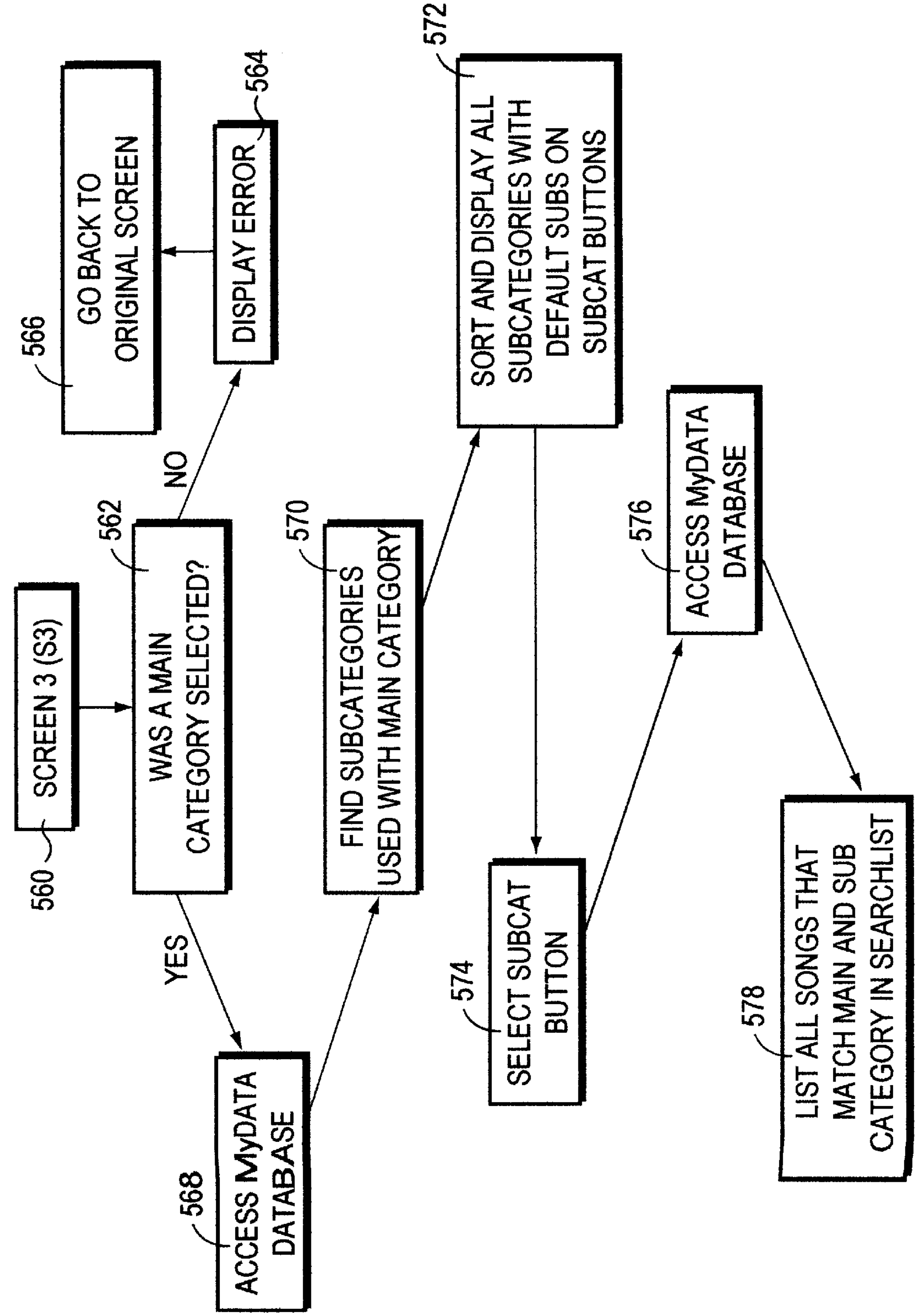
FIG. 7 is a schematic flow diagram showing the selection of a graphical user interface screen selected according to the flow diagram of FIG. 4.

Further reference is made to FIG. 6. The controls for screens 2 and 3 will be described first, in further detail. When a particular song in a play list is selected by, for example, highlighting a song with the cursor as detailed in block 500, the song can be played immediately by pushing the Now button 502 as detailed generally in block 504. Any current song being played is interrupted in block 506 and the selected song is played instead. Subsequently, the play list begins playing songs in the prior order in block 508. Conversely, if the sort command is given in block 510, then songs are sorted in ascending or descending order according to a selected category in block 512. A song in the search list is selected in block 514. The song selected can be played according to the Now block 504. Alternatively, the pick block 516 can be used to put the searched song at the end of a given play list as shown in block 518. If the play list song is "clicked" twice as shown in block 519 then the search list song selected is placed to the top of the play list in block 520. In addition, a listing of favorite hits/selections can be requested by the user in block 524. This causes the search list to be filled that have been pre-selected in block 526 and a song from the search list is selected in block 514. Block 514 then branches to the now block 504 and continues as described.

Referring again to block 520, if a song is placed at the top of the play list the song is updated in Screen1 in block 530. The song is then played based upon the play block 532. If the mix up command is entered by the user in block 540, then songs in the play list are randomly mixed in block 542 and Screen1 is updated in block 530. As described above, the play command 532 causes songs to be played in the play list order selected in block 508.

The selection of Screen3, shown in block 560, then the system determines whether a main category was selected in block 562. If not, then an error message is displayed in block 564 and the original screen is re-displayed in block 566. If a main category is selected in block 562, then the system accesses the MyData database of songs and categories in block 568. Any appropriate sub-categories are listed based upon that particular main category in block 570. Sub-categories are sorted and displayed on appropriate default sub-category buttons 572 shown in the window 482 in FIG. 16. The user can select appropriate sub-category buttons by "clicking" on them as shown in block 574. The MyData database is accessed in block 576 based upon the selected sub-categories and all songs that match the main and sub-category selections are listed in block 578. This listing is shown in the search window 332. Note that the search window 332 displays various category information such as title, artist, date, music category, music is style, dance type, music speed and energy. Of course, this can also be included as desired by the service provider who originally formats such categories. In addition, custom category information can be included based upon the user's desires.

Figure 8:
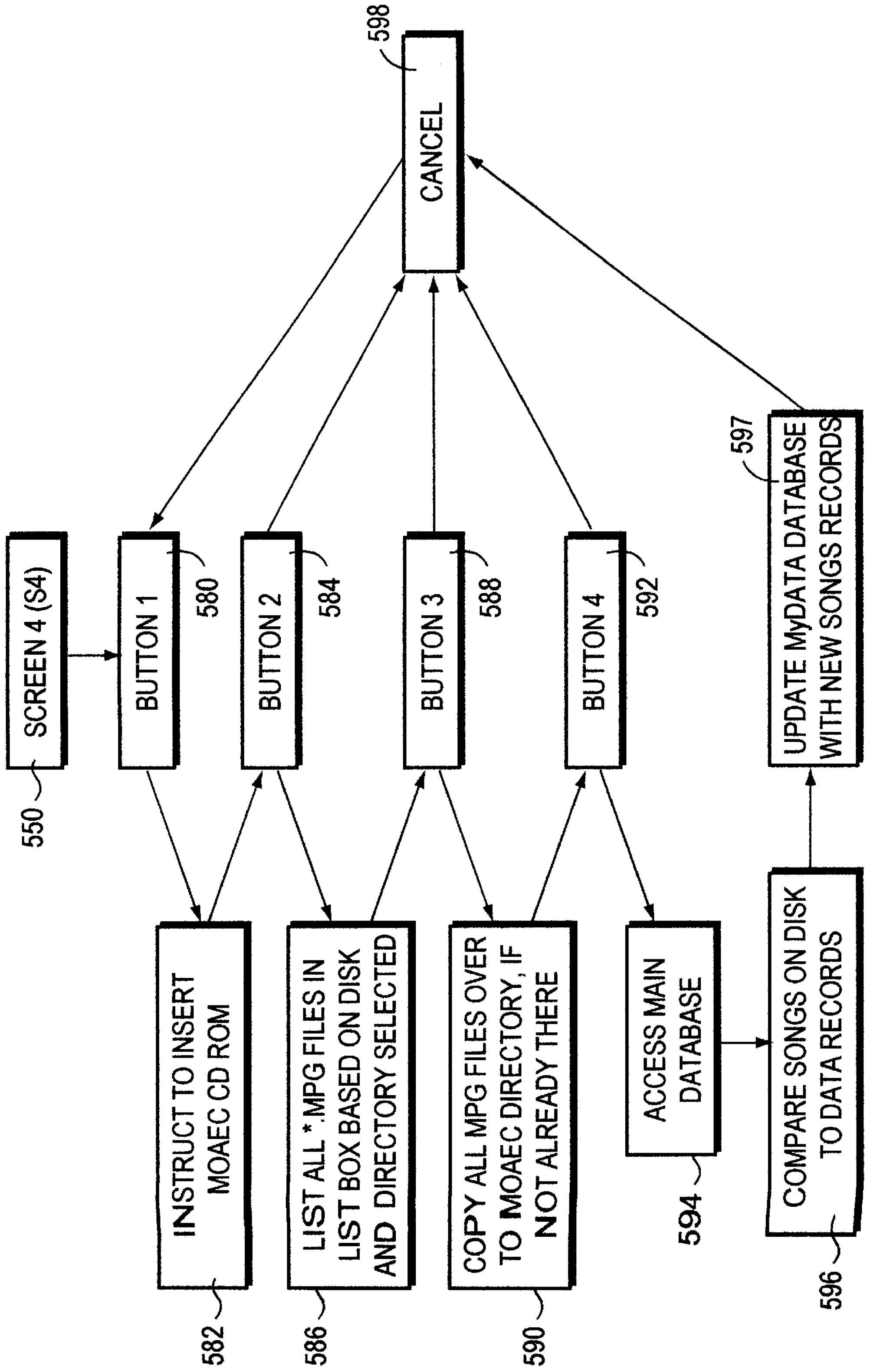
FIG. 8 is a schematic flow diagram of a graphical user interface screen selected according to the flow diagram of FIG. 4.

FIG. 8 relates to the selection of Screen4 as shown in block 550. Screen4 is also illustrated generally as the display 336 in FIG. 17. The display is organized to display all songs within the user's library and the broader service provider's library. The display 336 includes columns showing data test status 552, song identification number 554, disc number (e.g., the disc on the service provider on which the song resides 556) the catalog song number 558, the title 590, the artist 592, the music style 594, the dance type, if any, 596, the speed 598, the time in seconds 570, the energy level, if any, 572 and any other appropriate category.

The entire library of the service provider can be provided in this format to the users, so that the user can select the songs that it wishes to order at later times. A series of buttons can be provided within Screen4. The first button, Button1, shown in block 580 instructs the user to insert an appropriate CD-ROM containing music and category data in block 582. The user is then prompted to use Button2, shown in block 584. This button lists all compressed data files based on the particular disc and directory selected in block 586. The user is then prompted by Button3 in block 588. Activating this button causes the copying of all compressed files from the disc over to the directory if these files are not already present in block 560. The user is then prompted by Button4 in block 562. Activating this button accesses the main database in block 564. Songs on the CD-ROM are compared to the data records within the center in block 566. The MyData database is updated with new songs in block 567. At any time, the canceled button can be pressed as shown in block 598, which returns to the Button1 prompt of block 580.

Figure 9:
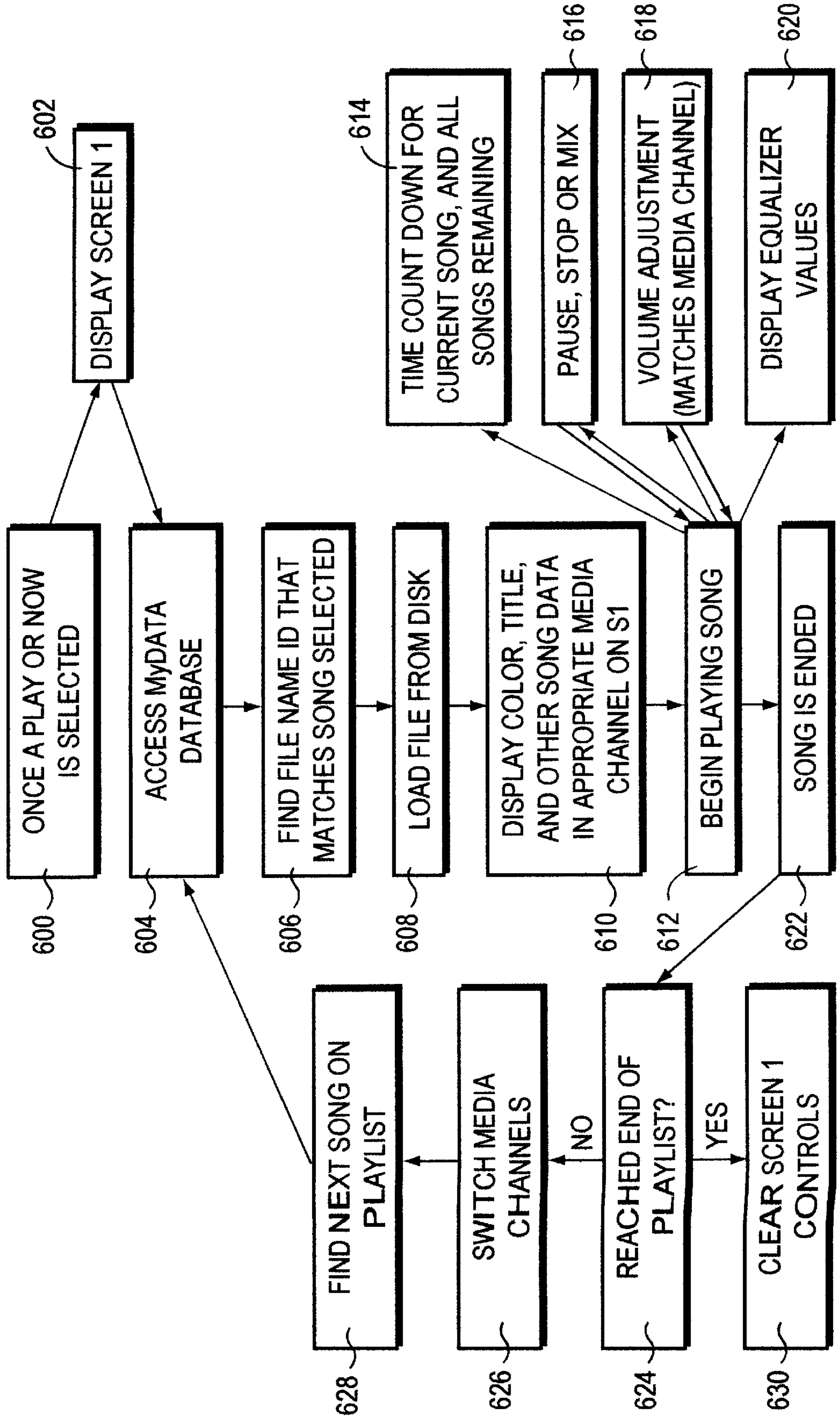
FIG. 9 is a schematic flow diagram of the playback process using the graphical user interface screens selected according to the flow diagram in FIG. 4.

Reference is now made to FIG. 9. If a Play (see button 601, FIG. 14) or Now button on the screen is selected in block 600, Screen1 is displayed showing the various playback controls in block 602. The MyData database is accessed in block 604. The file MID that matches the selected song is searched for by the system in block 606. The file is loaded from the disc in block 608. Again, this file is retrieved from the disc in MPEG3 data compressed format. A particular color for the song, which may correspond to a given set of categories, as well as a title and other data are provided to one of the media channels in Screen1 in block 610. The song begins playing in block 612 as soon as the data is ready. A time countdown for the song is initiated using known techniques in block 614. If a pause, stop or mixed command is received in block 616 then these steps, is described above, are carried out. In particular, a pause or stop ends playing of the song either temporarily (e.g., until pause is pressed again) or permanently, in case of a stop command.

Volume adjustment and other equalizer values can be provided according to block 618 and 620. These act upon the playback of a song using known techniques. When the particular song has ended in blocks 622 the system checks whether it has reached the end of the current play list in block 624 if not, media channels are switched in block 626 and the next song on the play list is located in block 628. This song information is transferred back to block 604 and the name of that new song is located in block 606. The process continues as described above.

If the end of the play list is reached in block 624, then Screen1 controls are cleared in block 630. The system awaits further instructions at this time.

Figure 10:
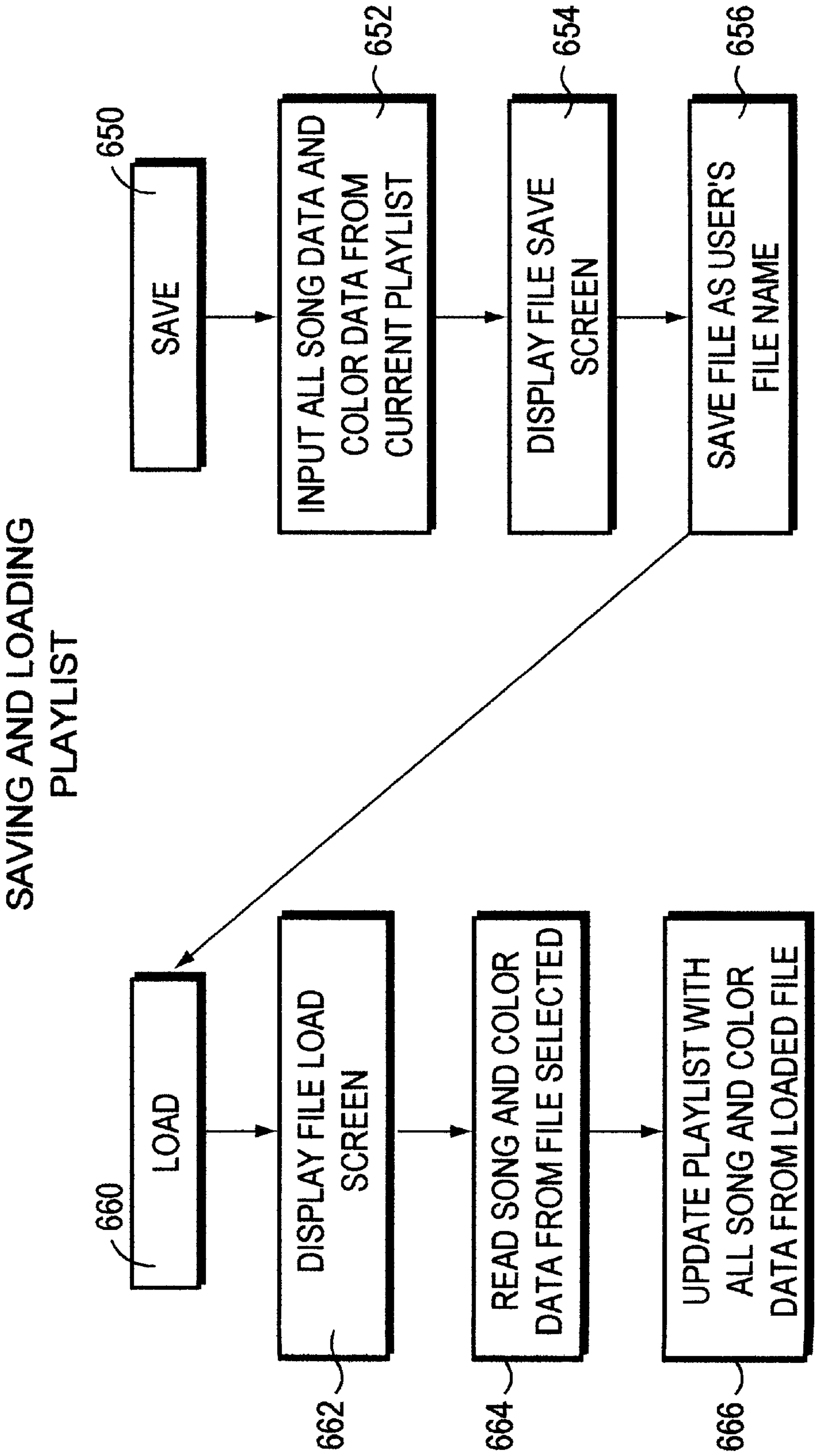
FIG. 10 is a schematic flow diagram showing the saving and loading of play lists using the music organizer and entertainment center according to this invention.

FIG. 10 describes the saving and loading of play list in more detail. If a save command is initiated by the user in block 650, then all song data and associated colored data for the display from the current play list is collected 652. The file save window is placed on the screen in block 654. The user can select an appropriate file name for saving the particular play list file in block 656. Again, the display for this procedure is detailed in FIG. 14

If a load command is entered by a user as shown in block 660, then the file load window is displayed in block 662. The display for this window in shown in FIG. 15.

Song and color data are read from the selected file in block 664 and the current play list is updated and/or replaced with all song in color data from the loaded file in block 666.

It is specifically noted that category information is provided by the service provider appended to each song in the database. The accessing of songs having such data appended thereto occurs according to applicant's unique graphical user interface based upon provider categories. The association of various database identifiers to each song is implemented using conventional database programs such as the above-described Microsoft Access® 2.0. The association of category objects to song data should be conventional to those of ordinary skill. The storage of MPEG3 data compressed song files is accomplished in the same manner as other data stored as files in a database. The Microfiche Appendix included in the subject application pursuant to 37 CFR 1.96(c) contains a listing of program commands in the commercially available Visual Basic language for implementing various functions of the center according to this embodiment.

Figure 18:
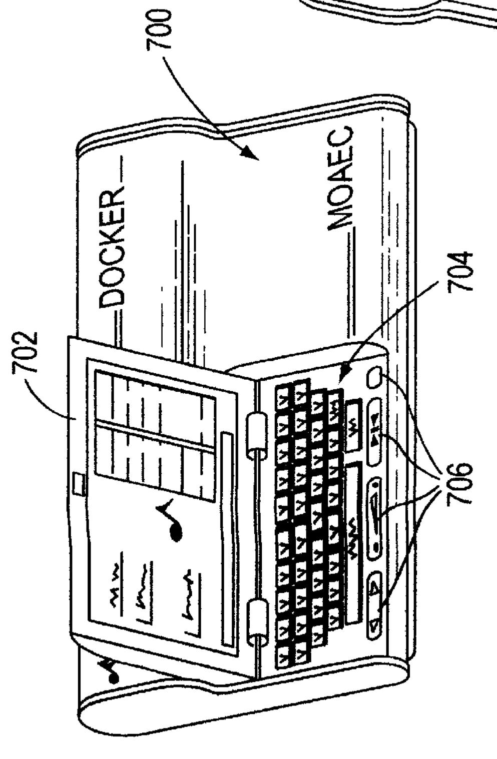
FIGS. 18 and 19 are perspective views of an exemplary music organizer and entertainment center according to an alternate embodiment of this invention utilizing a base unit and docking principle.
Figure 19:
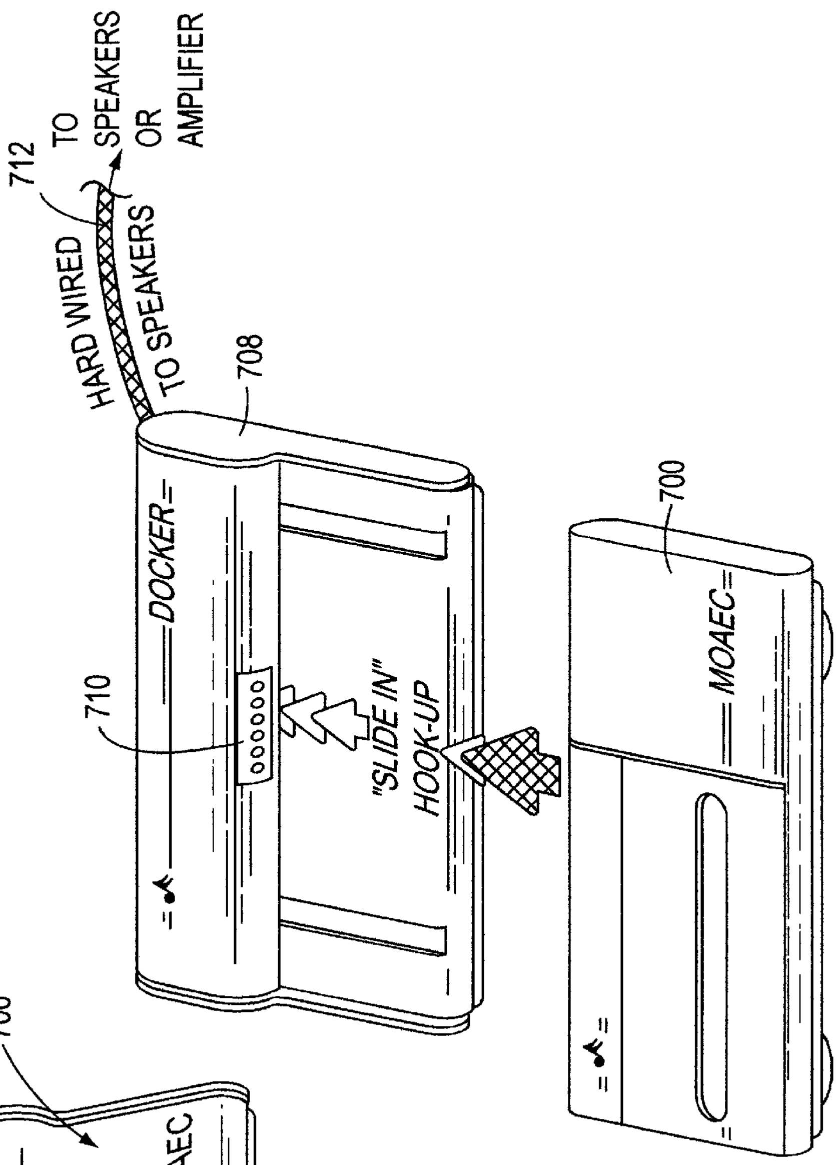

Using the hardware and software elements described above, FIGS. 18 and 19 detail a docking mechanism in which music is stored on a hard drive or other electronic medium in a main data handling unit 700 with a flip-up display 702 and associated keyboard 704 that can include playback controls 706 (e.g., play, stop, pause, forward and reverse). The unit 700 can be "docked" to a base unit 708 that includes a connector 710 for interfacing with an associated connector in the unit 700. A cable 712 can interconnect the base unit 708 with appropriate speakers or amplifiers. The unit 700, hence, can include the music data for the system and can be moved from location to location so that there is no need to purchase additional playback units to play music provided from the service provider with the particular code.

Figure 20:
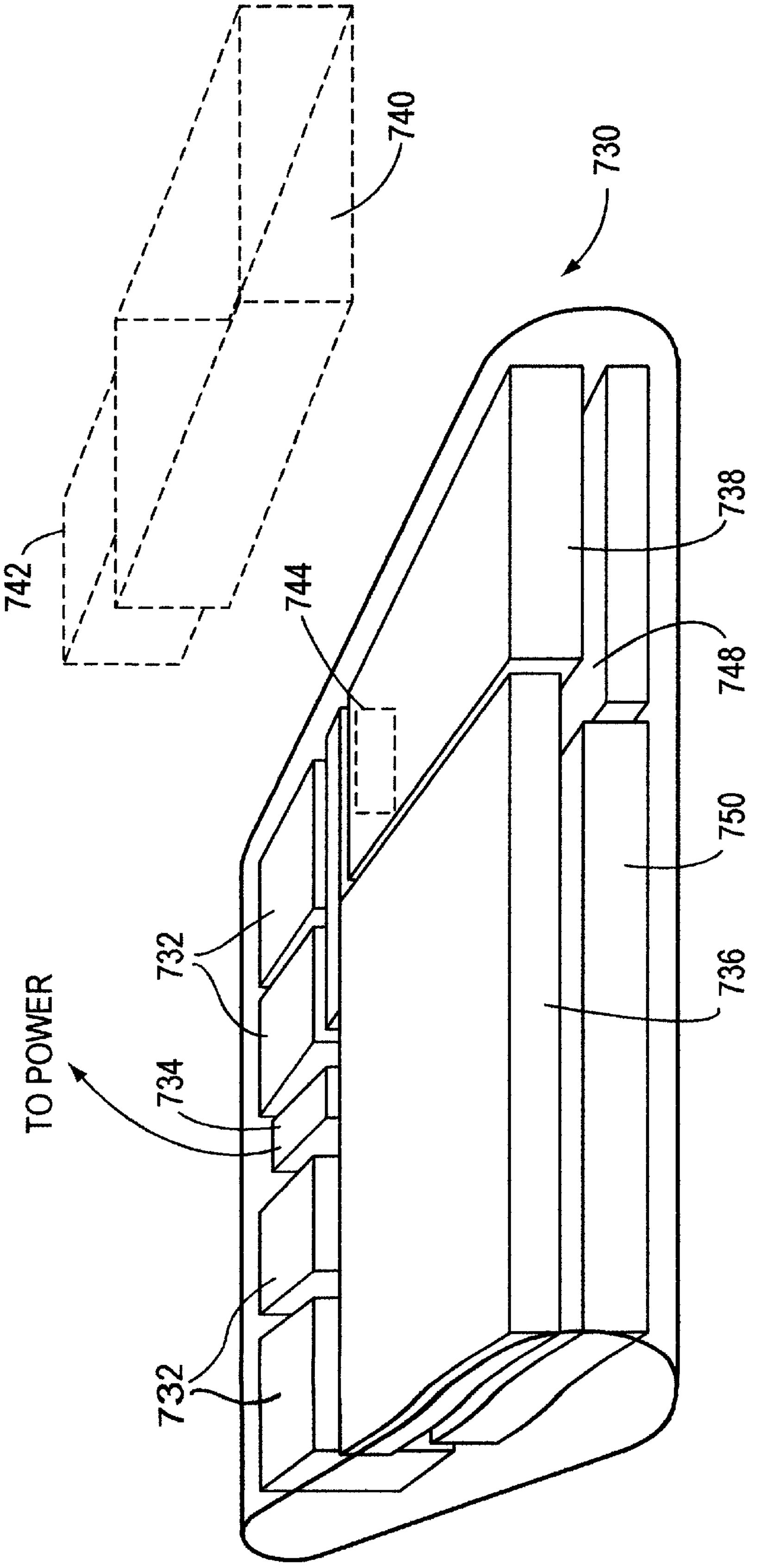
FIG. 20 is yet another alternate embodiment of a music organizer and entertainment center utilizing a docking principle for a main hard drive.

FIG. 20 illustrates and alternate embodiment for docking unit in which a base unit 730 includes speakers 732, a power coupling 734, a flip-up display 736 and a removable memory storage device, such as a compact hard drive 738. The hard drive is shown removed in phantom 740. A connector 742 can interface with an associated connector (shown in phantom) 744 on the base unit. The hard drive, itself, it moved from base unit to base unit so that, again, there is need to purchase music only once, and that music is identified to a particular hard drive. The base unit can also include a CD-ROM shelf 748 for reading music during the original loading process. In certain remote units, the CD-ROM may be omitted, since all music is contained on the hard drive and loading of music is accomplished with the base unit 730. A mother board 750 controls the operations of the unit.

Figure 21:
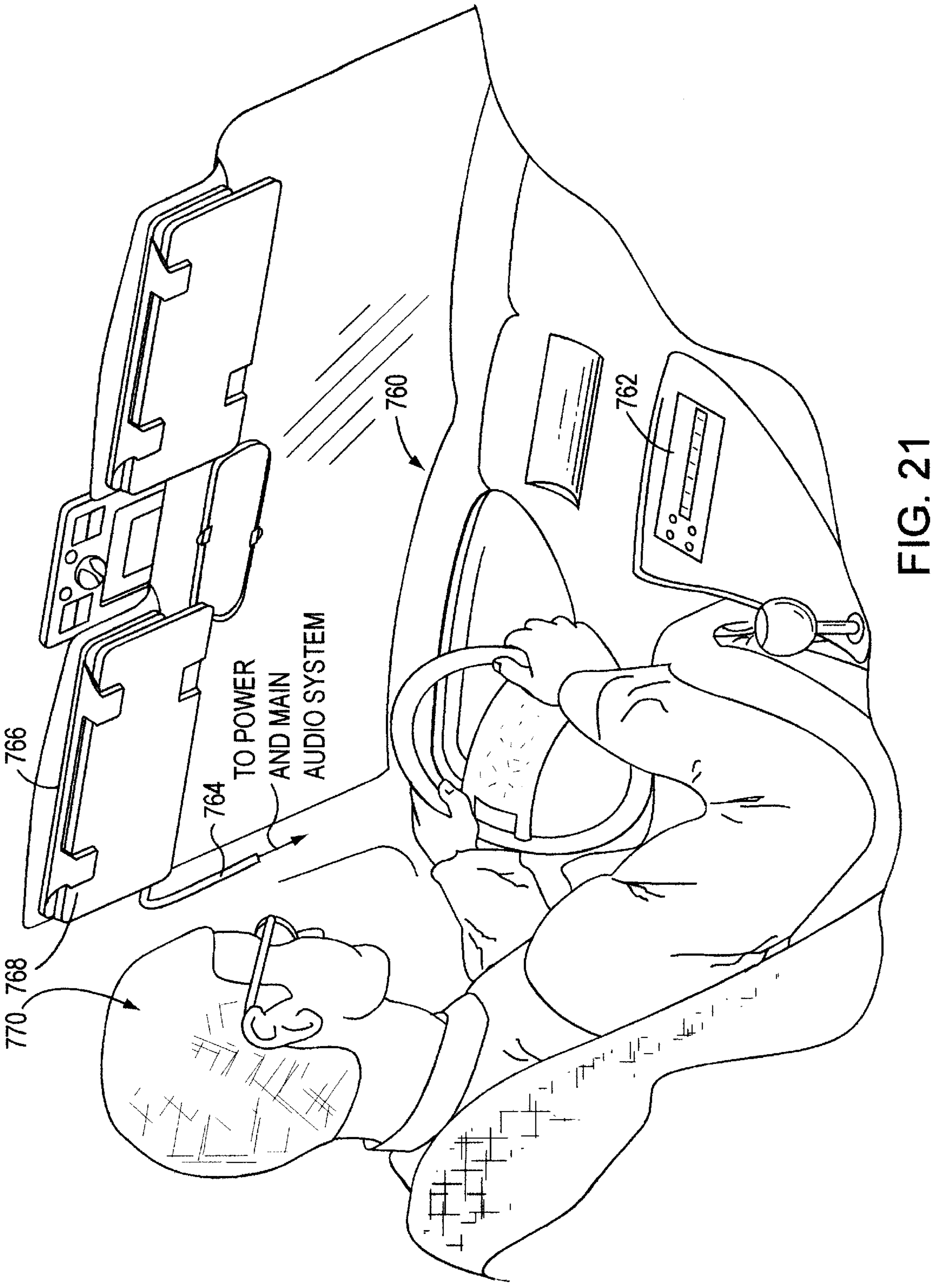
FIGS. 21 and 22 are perspective views of yet another exemplary music organizer and entertainment center for use in mobile environments including, for example, the docking element shown in FIG. 20.
Figure 22:
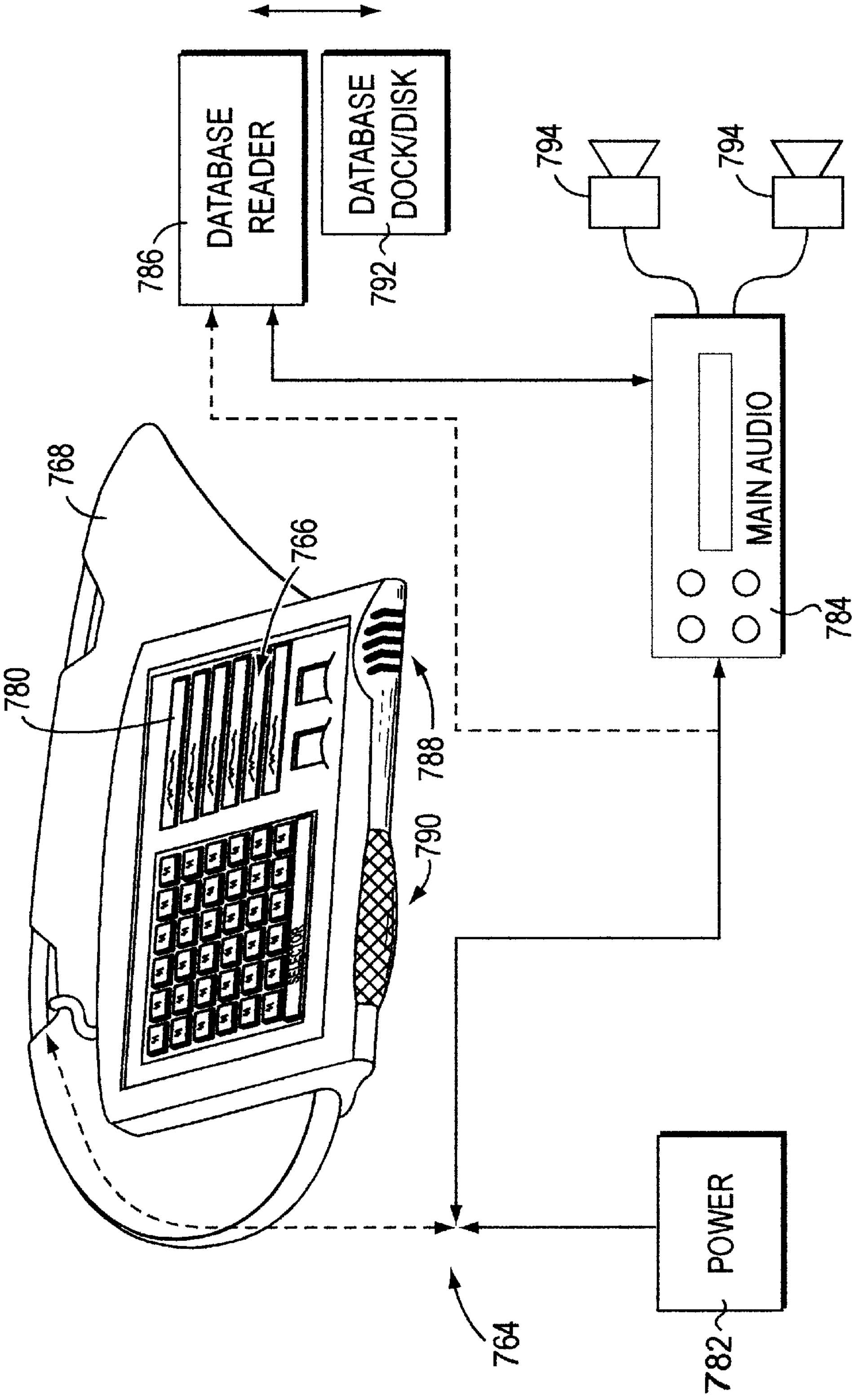

FIGS. 21 and 22 illustrate a mobile playback system according to this invention. The above described docking units in FIGS. 19 and 20 can be utilized in conjunction with this unit. In other words, an entire hard drive or unit can be interfaced with an onboard automotive base unit to enable music in the hard drive or docking unit to be played within a car or other vehicle. In this embodiment, the automotive interior 760 is provided with a main audio system 762. Various cords 764 interconnect the main system to a contact display unit 766 that, in this embodiment, is located on the sun visor 768 where the driver 770 can easily access it. It is contemplated that the display unit can be located at any acceptable location. Alternatively, the unit can be entirely operated by voice commands, with no display unit, and instead, a voice response system implementing conventional voice-generating software. With further reference to FIG. 22, the sun visor 768 is lowered to reveal the display 766 having a screen 780. The wires 764 interconnect the display with a power source 782, that can be part of the main audio systems 784 or can be separate. The wires also connect the display 780 with the main audio system 784, or alternatively, can be routed directly to the vehicle's onboard database reader 786. The database reader is any microprocessor-based system as described above. It can be exclusively a disc drive or other high-volume data reader or can include many of the processing functions performed by the center. Alternatively the processor functions can be performed within the display 766. The display 766 includes a microphone 788 for voice activation. As described above, conventional voice-recognition software can be used in conjunction with the center. A hand grip 790 is provided for moving the display to an acceptable position. The database reader interfaces with an onboard docking unit or disc 792, as described above. This can be removed when not in use for placement in another database reader, such as the base unit 730 shown in FIG. 20. Music is routed from the database reader 786 or the display 766 depending upon where the microprocessor are located, back to the main audio unit 784 where amplification occurs. The music is played back on appropriate speakers 794.

Figure 23:
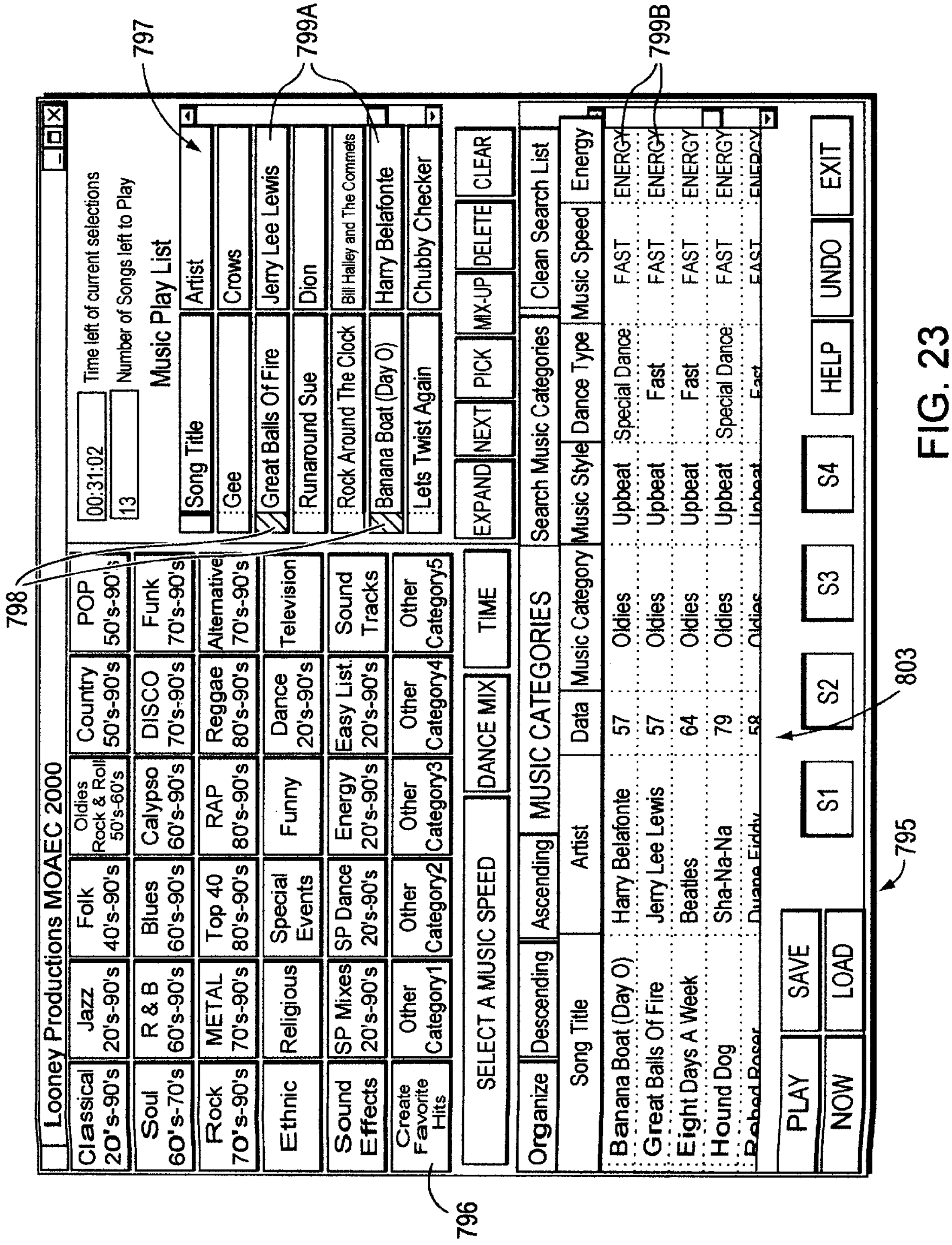
FIG. 23 is a plan view of the graphical user interface screen of FIG. 12 detailing a favorite hits function.

Reference is now made to additional features that can be implemented according to certain embodiments of the invention. FIG. 23 details a favorite hits function that can be applied to Screen2. The display 795 includes a favorite hits category creation button 796. Favorite hits, when identified by a user on the current play list 797 can be flagged by "clicking" on the individual titles. A colored flag 798 appears next to flagged songs. Unflagging can involve a second click on a flagged song or a separate delete button on the screen. The flagged songs 799A appear as top selections 799B on the current search music categories list 803. By clicking on the create favorite hits button 796, these favorites can be saved, so that they always appear at the top of the search categories list 803. In this manner, they can be retrieved to place on the play list within seconds. Again, any song on the search categories list 803 can be transferred to the play list for playback in a desired order (typically first-in-first-out) by simply clicking or-double clicking on the specific search list song entry.

Figure 24:
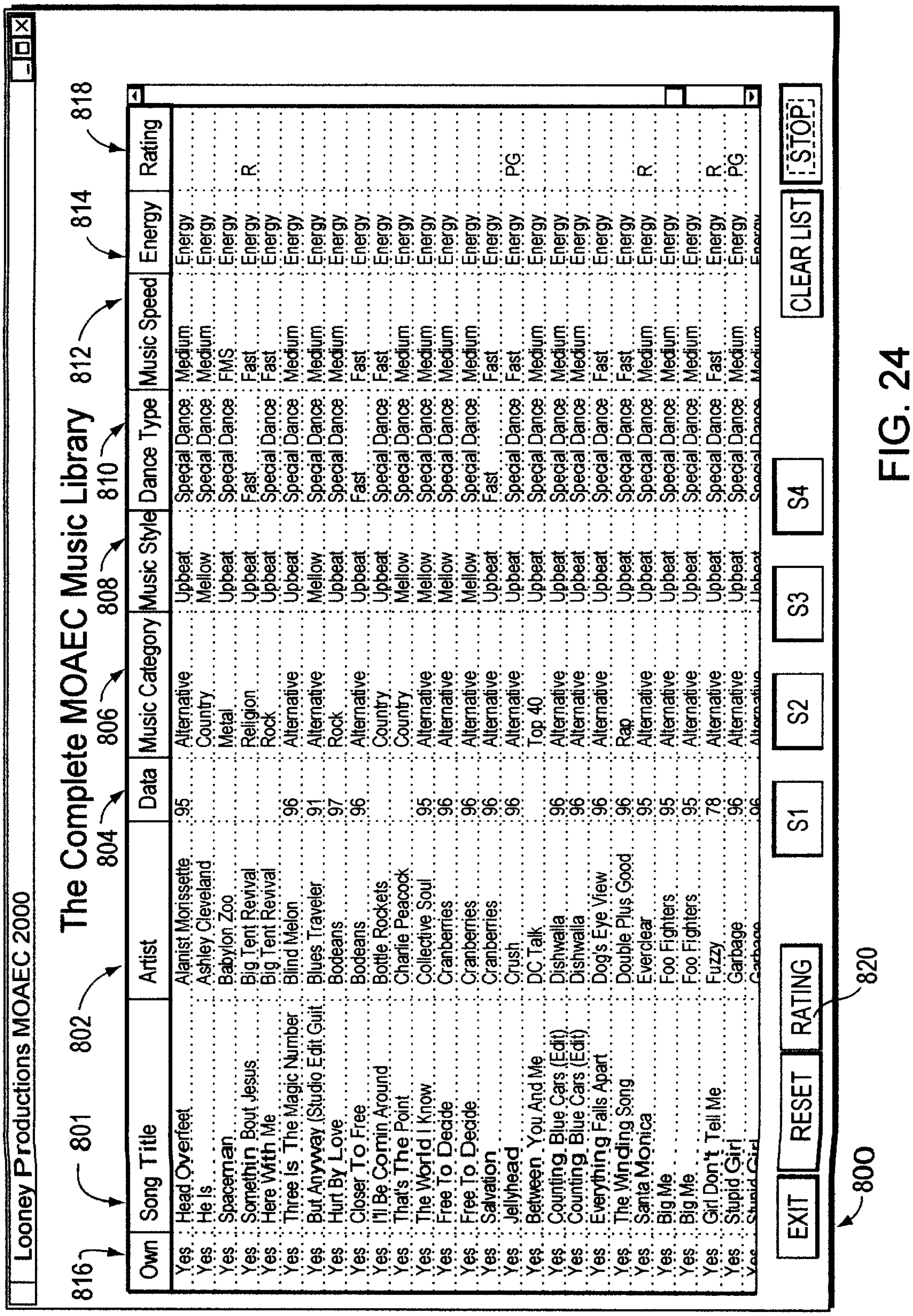
FIG. 24 is a plan view of the fourth graphical user interface screen showing a display of the service provider's available library.
Figure 25:
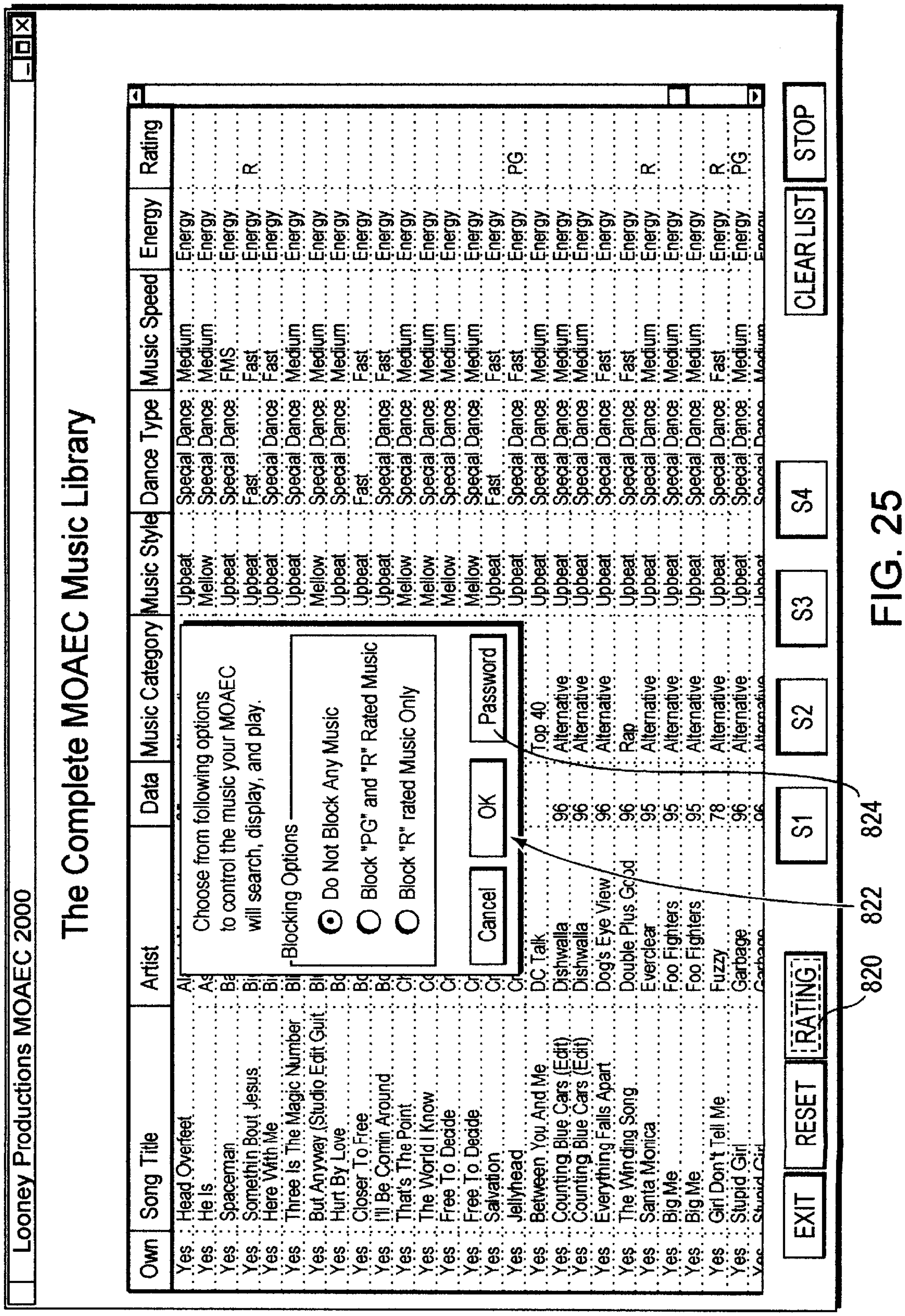
FIG. 25 is a plan view of the graphical user interface screen of FIG. 24 showing the use of a rating category.
Figure 26:
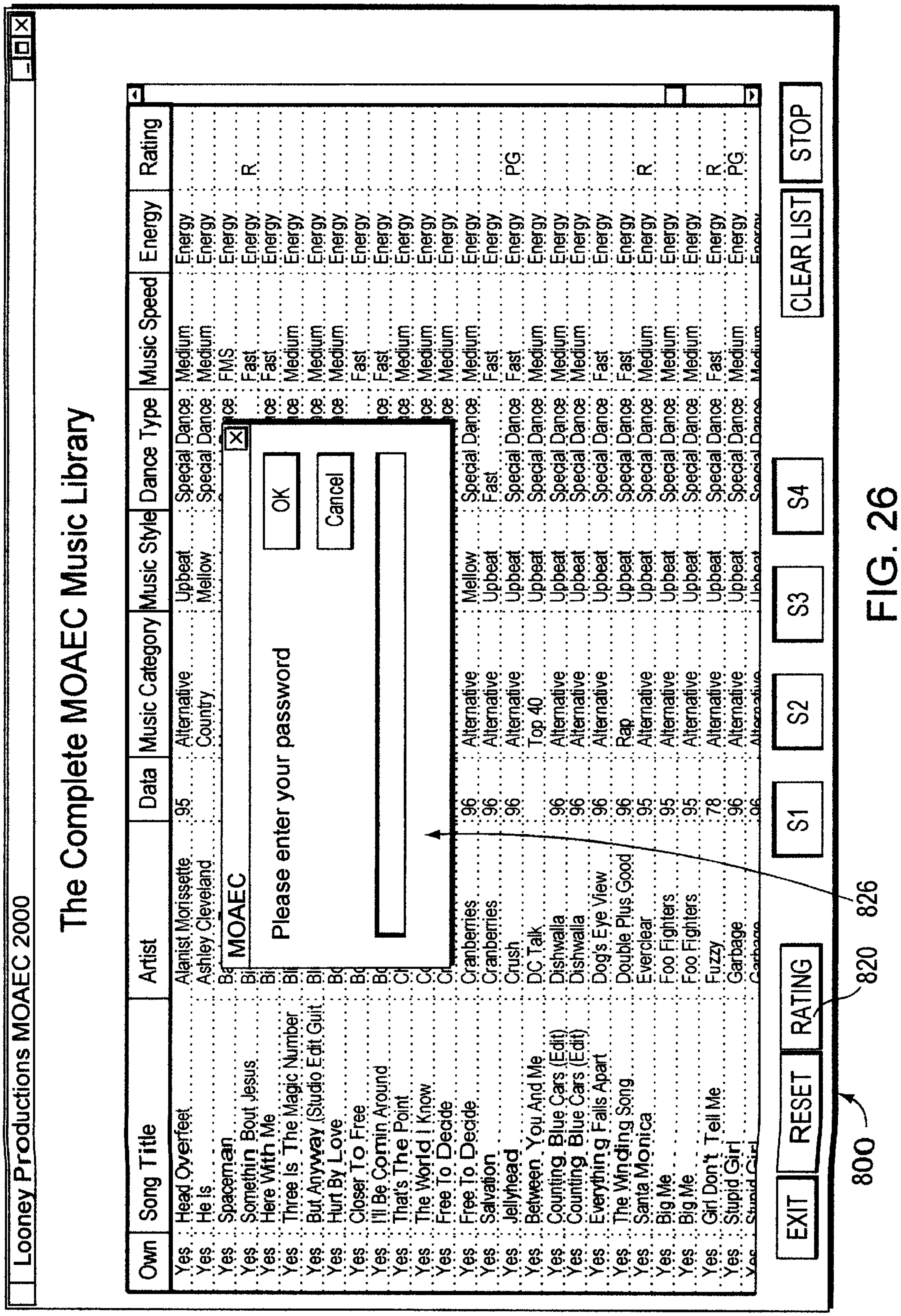
FIG. 26 is a plan view of the graphical user interface screen of FIG. 24 showing a password entry window for retrieving rated music.

FIGS. 24, 25 and 26 detail an alternate view of Screen4, as discussed above. The display 800 includes an overall listing of the selections available from the service provider. A list of over one hundred thousand titles can be included in the MyData database, as selections are delivered from the service provider. The category fields described above are provided for each title 801—namely, artist 802, date of publication 804, specific music category 806 (e.g. "rock," "jazz," "alternative," etc.), music style 808, dance type 810, music speed 812 and energy 814. In addition, an ownership column 816 is provided that indicates whether the music data accompanying the title is present in the users own database. If so, the entry states "yes," otherwise a "no" indication is provided to the column 816 next to the particular title. In addition a rating column 818 is now is provided with an appropriate entry field in the database. In this example songs that the service provider may not think are suitable for certain listeners due to content are appended with a rating, as appropriate. In this example, all songs not rates are acceptable to all. A specific rating letter such as "G" can also be placed next to such songs in the column 818. Higher rated songs can include the rating letter PG, or stronger rating letter R, on their particular title row. The depicted ratings are exemplary only. The actual song titles shown should not be taken to have these actual ratings. The music selection list of Screen2 would also display ratings when they are used. Note that a variety of levels of rating and rating criteria can be used. In general such ratings are defined and appended to individual songs be the service provider.

FIG. 25 illustrates the activation of Screen4's rating button 820. This button calls a window 822 that prompts the blocking of R and/or PG-rated songs. In this manner, higher rated song titles cannot be viewed or played. This function is enable and disabled using a password that is entered after striking the password button 824 in the window 822. This button calls a password-entry window 826, detailed in FIG. 26. Once an initial password is entered, it must be reentered to change the rating blocking function or to change the password itself.

Figure 27:
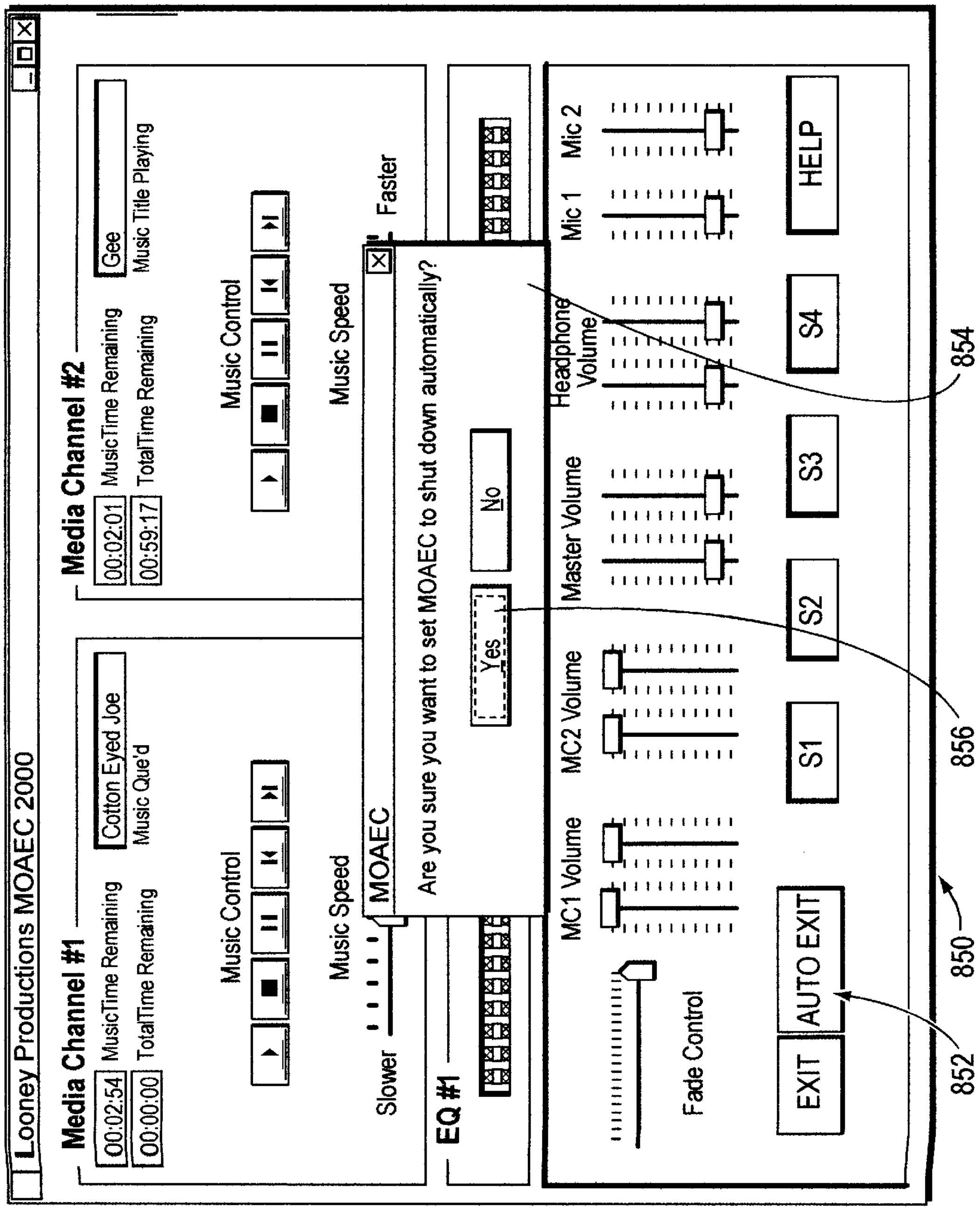
FIG. 27 is a plan view of a modified first graphical user interface screen according to another embodiment of the invention, including an auto-exit function.
Figure 28:
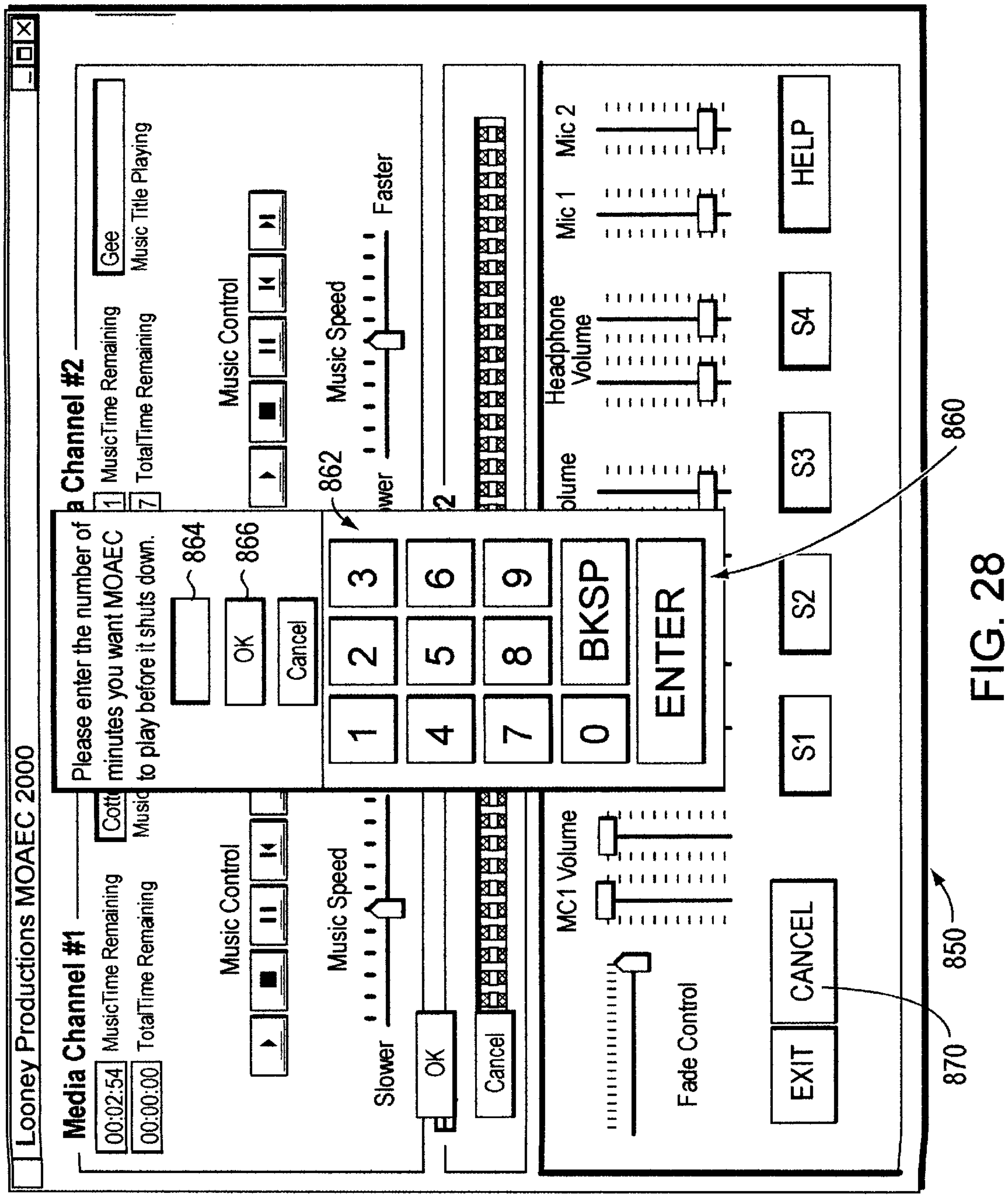
FIG. 28 is a plan view of the graphical user interface screen of FIG. 27 showing a shut-down time control window.

FIGS. 27 and 28, finally, illustrate an auto-exit option appended to the display 850 of Screen1 in this embodiment. An auto-exit button 852 can be clicked to call an automatic shut-down window 854. By clicking a "yes" button 856 in this window, the center calls another window (FIG. 28) with an auto-shutdown keyboard 860. The window 860 includes a numeric keyboard 862 for entering shutdown time in minutes. A time box 864 indicates the selected time. Pressing the "OK" button 866 causes the shutdown time to be acted upon. Playback will occur until the time has been elapsed. At any time, the cancel button 870 can be activated to cause the shutdown routine to cease and/or the window 860 to be removed from Screen1.

The architecture and database storage techniques, as well as the various graphical user interface functions described above can be readily adapted to handle images and full motion video as well. The primary addition to the above-described embodiments would be a screen capable of playing back video of appropriate size interconnected to the center's processor by an appropriate video driver card that is typically commercially available. In addition, appropriate data compression/decompression routines applicable to full motion video and/or images is desirable. In substance, the data for video packages is stored with various categories similar to or the same as those applicable to music described above. The graphical user interface is organized identically, as is control and manipulation of playback. In the case of music videos, most or all of the same categories as music can be used, with the addition, perhaps of certain video-specific categories.

A sufficiently large hard-drive can be used to store a large database of movies and/or other video data. Where storage is problematic, one example contemplates that the center's processor can interface with a commercially available, multi-disc CD-ROM or DVD (Digital Versatile/Video Disc) drive. The drive is interfaced to the processor using commercially available interface hardware. The raw video data can be retrieved as needed from the play-ready optical discs according to a request by the user entered via the MyData database which carries the underlying video category data associated with each video title in its list. Any titles not currently held in the optical unit, can trigger a load-optical-disc message, prompting the user to load-in the optical disc containing the desired date. Of course, this is only one example of a system that handles video data using the underlying interface and organizational structure of the present invention.

Note that the graphical user interface herein has been described in terms of its primary functions. Any buttons on the display screens detailed herein not expressly described can be assumed to perform functions that are straightforward, and particularly noted on the buttons themselves, such as "OK" and "Cancel." All functions not specifically described should be clear to those of ordinary skill.

The foregoing has been a detailed description of a preferred embodiment of the invention. Various modifications and additions can be made without departing from the spirit and scope of this invention. For example, a variety of colors can be used for different keys and buttons, categories can be identified based on certain colors. Voice recognition and voice-playback functions can be provided to any of the embodiments described herein. Various interface devices can be used, such as touch screens, light pens and alike. In addition, the database, data compression and playback systems and software described herein can be substituted for any other acceptable system or software. The particular layout the graphical displays and content of various buttons in the display can also be varied. Again, it is expressly contemplated that particular category buttons on Screen2 are displayed in different colors, and that specific colors can be used to highlight certain windows or underlying selections in a display, as well as the status of various functions. Accordingly, this description is meant to be taken only by way of example and not to otherwise limit the scope of the invention.

APPENDIX

MOAEC CODE
Updated 6/2/98
Author: Dale McMullin
Media: Microsoft Visual Basic V.5.0
Total Lines: 5,245

"Recorder.frm"

```
Sub UpdateList()
Dim i As Integer, final As Integer
Dim color As Long
Dim songdata(9) As Variant
On Error GoTo Stoploop
   MusicListing.Rows = 1
   Screen2.Data1.DatabaseName = App.Path & "\music.mdb"
   Screen2.Data2.DatabaseName = App.Path & "\music.mdb"
   Screen2.Data3.DatabaseName = App.Path & "\mydata.mdb"
   Screen2.Data3.RecordSource = "LP Complete Music Guide"
   Screen2.Data1.Refresh
   Screen2.Data2.Refresh
   Screen2.Data1.Recordset.MoveLast
   Screen2.Data1.Recordset.MoveFirst
   final = Screen2.Data1.Recordset.RecordCount
   Do While Not Screen2.Data1.Recordset.EOF And StoplistingList = False
LoopTop:
  DoEvents
     If PauseList = True Then NewPauseStartTime = Timer() - TimeSoFar
     MousePointer = 11
     Screen2.Data3.RecordSource = "LP Complete Music Guide"
     Screen2.Data1.Recordset.MoveNext
     i = Screen2.Data1.Recordset.AbsolutePosition
     If i < 0 Or StoplistingList = True Then Exit Do
     songdata(1) = Screen2.Data1.Recordset.Fields("Title")
     Screen2.Data3.Refresh
     Screen2.Data3.Recordset.FindFirst "Title = '" & songdata(1) & "'"
     If Screen2.Data3.Recordset.NoMatch Then
        songdata(9) = " "
        If DisplayLibrary = False Then GoTo LoopTop
     Else
        songdata(9) = "yes"
     End If
     songdata(2) = Screen2.Data1.Recordset.Fields("artist")
     songdata(3) = Screen2.Data1.Recordset.Fields("date")
     songdata(4) = Screen2.Data1.Recordset.Fields("main1")
     songdata(5) = Screen2.Data1.Recordset.Fields("Mstyle")
     songdata(6) = Screen2.Data1.Recordset.Fields("Dtype")
     songdata(7) = Screen2.Data1.Recordset.Fields("Speed")
     songdata(8) = Screen2.Data1.Recordset.Fields("Energy")
     Screen2.Data2.RecordSource = "Music Colors"
     Screen2.Data2.Refresh
     Screen2.Data2.Recordset.FindFirst "Main1 = '" & songdata(4) & "'"
     color = Val(Screen2.Data2.Recordset.Fields("colorID"))
     For X = 4 To 8
        DoEvents
        Screen2.Data2.RecordSource = X
```

```
        Screen2.Data2.Refresh
        Screen2.Data2.Recordset.FindFirst "tag = '" & songdata(X) & "'"
        songdata(X) = Screen2.Data2.Recordset.Fields("Label")
      Next X
      If DisplayLibrary = True Or (DisplayLibrary = False And songdata(9) = "yes") Then
        MusicListing.AddItem songdata(9) & Chr(9) & songdata(1) & Chr(9) & songdata(2) & Chr(9) & songdata(3) & Chr(9) &
songdata(4) & Chr(9) & songdata(5) & Chr(9) & songdata(6) & Chr(9) & songdata(7) & Chr(9) & songdata(8)

        MusicListing.row = MusicListing.Rows - 1

        For j = 0 To 9
          MusicListing.Col = j
          MusicListing.CellBackColor = color
        Next j
        MusicListing.Col = 0
      End If

    If StoplistingList = True Then GoTo Stoploop
    DoEvents
    Loop
  Stoploop:
    If Screen1.wp.LinkMode <> LINK_NONE And PauseList = True Then
      Screen1.wp.LinkExecute "pause"
      PauseList = False
    End If
    MousePointer = 0
    Screen2.Data1.DatabaseName = App.Path & "\mydata.mdb"
    Screen2.Data2.DatabaseName = App.Path & "\mydata.mdb"
    Screen2.Data3.DatabaseName = App.Path & "\mydata.mdb"
    Screen2.Data1.RecordSource = "LP Complete Music Guide"
    Screen2.Data2.RecordSource = "LP Complete Music Guide"
    Screen2.Data3.RecordSource = "Music Colors"
    Exit Sub
End Sub

Private Sub ClearList_Click()
  MusicListing.Rows = 1
  StoplistingList = True
  If RatingBox.Visible = True Then RatingBox.Visible = False

End Sub

Private Sub ExitSystem_Click()
  response = MsgBox("Are you sure you want to exit the system?", 4)
  If response = vbNo Then
    Exit Sub
  Else
    ExitButtonPushed = True
    EndItAll
  End If
End Sub

Private Sub Form_Activate()
```

MOAEC MASTER CODE (page 2)
Sunspot Software and Graphics
303-805-7637

```
    If MusicListing.Rows > 2 Or Screen.ActiveForm.Name <> "Recorder" Then Exit Sub
    If FirstLibrary = True Then
       answer = MsgBox("Are you sure you want to create the Library?" & Chr(13) & "Any music playing will be automatically paused.", 4)
       If answer = vbNo Then Exit Sub
       If SongPlaying = True And Screen1.wp.LinkMode <> LINK_NONE Then
          Screen1.wp.LinkExecute "pause"
          PauseList = True
       End If

       Load choices
       choices.Show 1

    End If
       If CancelLibrary = True Then
          CancelLibrary = False
          Screen2.Show
          Screen2.SetFocus
          Exit Sub
       Else
          FirstLibrary = False
       End If
       UpdateList

End Sub

Private Sub Form_Load()
   Recorder.WindowState = 2
   FirstLibrary = True
   StoplistingList = False
   RatingBlock = "none"
   RatingOption(0).Value = True
   password = "MOAEC"
End Sub

Private Sub Form_QueryUnload(Cancel As Integer, UnloadMode As Integer)
   Dim Msg ' Declare variable.

   If ExitButtonPushed = False Then
      Msg = "Do you really want to exit the application?"
   Else
      ExitButtonPushed = True
      EndItAll
   End If

End Sub

Private Sub Form_Resize()
   On Error Resume Next
   If WindowState = 2 Then
      For X = 1 To 3
```

```
        ScreenShow(X).Left = ScreenShow(X - 1).Left + 1200
      Next X
      For X = 0 To 3
        ScreenShow(X).Top = Screen.Height - 1155
      Next X
      MusicListing.Height = Screen.Height - 2300
    Else

      For X = 1 To 3
        ScreenShow(X).Left = ScreenShow(X - 1).Left + 1200
      Next X
      For X = 0 To 3
        ScreenShow(X).Top = Recorder.Height - 1155
      Next X
      MusicListing.Height = Recorder.Height - 2300
    End If
    Title.Left = (Recorder.Width / 2) - 3500
    ExitSystem.Top = ScreenShow(0).Top
    SearchAgain.Top = ScreenShow(0).Top
    Rating.Top = ScreenShow(0).Top
    SearchAgain.Height = ExitSystem.Height
    MusicListing.Left = (Recorder.Width / 2) - (MusicListing.Width / 2)
    StopListUpdate.Top = ScreenShow(0).Top
    StopListUpdate.Left = Recorder.Width - 1560
    ClearList.Top = ScreenShow(0).Top
    ClearList.Left = StopListUpdate.Left - 1815
End Sub

Private Sub Form_Unload(Cancel As Integer)
    EndItAll
End Sub

Private Sub MusicListing_Click()
    If RatingBox.Visible = True Then RatingBox.Visible = False
    MusicListing.SelectionMode = flexSelectionFree
    MusicListing.Sort = 1

End Sub

Private Sub MusicListing_DblClick()
    If RatingBox.Visible = True Then RatingBox.Visible = False
    MusicListing.SelectionMode = flexSelectionFree
    MusicListing.Sort = 1

End Sub

Private Sub Rating_Click()
    Dim answer As String
    answer = InputBox("Please enter your password.")
    If answer <> password Then
      MsgBox "The password was incorrect."
      Exit Sub
    Else
      RatingBox.Visible = True
```

```
    End If

  End Sub

  Private Sub RatingCancel_Click()
    RatingBox.Visible = False
    If RatingBlock = "none" Then
      RatingOption(0).Value = True
    ElseIf RatingBlock = "PG" Then
      RatingOption(1).Value = True
    ElseIf RatingBlock = "R" Then
      RatingOption(2).Value = True
    End If
  End Sub

  Private Sub RatingOK_Click()
    Dim message As String
    RatingBlock = RatingTemp
    If RatingBlock = "none" Then
      message = "No music "
    ElseIf RatingBlock = "PG" Then
      message = "PG and R rated music "
    ElseIf RatingBlock = "R" Then
      message = "R rated music "
    End If
    RatingBox.Visible = False
    MsgBox (message & "will be blocked from search. display, and play.")
  End Sub

  Private Sub RatingOption_Click(Index As Integer)
    If RatingOption(0).Value = True Then
      RatingTemp = "none"
    ElseIf RatingOption(1).Value = True Then
      RatingTemp = "PG"
    ElseIf RatingOption(2).Value = True Then
      RatingTemp = "R"
    Else
      RatingTemp = "none"
    End If
  End Sub

  Private Sub RatingPassword_Click()
    NewPassword1 = InputBox("Please type your new password.")
      If NewPassword1 = "" Then Exit Sub
    NewPassword2 = InputBox("Please confirm you new password.")
      If NewPassword2 = "" Then Exit Sub
    If NewPassword2 = NewPassword1 Then
      password = NewPassword1
      MsgBox "Password changed successfully."
    Else
      MsgBox "Error entering new password."
    End If
  End Sub
```

```
Private Sub ScreenShow_Click(Index As Integer)

Dim i As Integer
On Error Resume Next
If RatingBox.Visible = True Then RatingBox.Visible = False
If (SelCat1 = "" And Index = 2) Then
    MsgBox ("Please select a main category from screen 2 before viewing this screen !!!")
    Exit Sub
End If

For i = 0 To 3
    Screen2.ScreenShow(i).BackColor = &H8000000F
    ScreenShow(i).BackColor = &H8000000F
    ScreenShow(i).ForeColor = &H80000012
Next i

Select Case Index
    Case 0
        Screen2.DD.Group = "Screen1"
        Screen2.Hide
        Screen2.cat1screen.Visible = True
        Screen2.cat2screen.Visible = False
        Screen2.FavHitsScrn.Visible = False
        For i = 0 To 4
            Screen1.ScreenShow(i).BackColor = &H8000000F
            Screen1.ScreenShow(Index).ForeColor = &H80000012
        Next i
        Screen1.ScreenShow(Index).BackColor = &HC0&
        Screen1.ScreenShow(Index).ForeColor = &H8000000E
        Screen1.Show
        If Screen1.WindowState <> 2 Then Screen1.WindowState = 2
        Exit Sub
    Case 1
        Screen2.DD.Group = "Screen2"
        Screen2.cat1screen.Visible = True
        Screen2.cat2screen.Visible = False
        Screen2.FavHitsScrn.Visible = False
        For i = 0 To 4
            Screen2.ScreenShow(i).BackColor = &H8000000F
            Screen2.ScreenShow(Index).ForeColor = &H80000012
        Next i
        Screen2.ScreenShow(Index).BackColor = &HC0&
        Screen2.ScreenShow(Index).ForeColor = &H8000000E
        Screen2.Show
        If Screen2.WindowState <> 2 Then Screen2.WindowState = 2
        Exit Sub
    Case 2
        Screen2.DD.Group = "Screen2"
        SelCat1 = MemCat
        Screen2.cat1screen.Visible = False
        Screen2.cat2screen.Visible = True
        Screen2.FavHitsScrn.Visible = False
        For i = 0 To 4
            Screen2.ScreenShow(i).BackColor = &H8000000F
```

```
      Screen2.ScreenShow(Index).ForeColor = &H80000012
    Next i
    Screen2.ScreenShow(Index).BackColor = &HC0&
    Screen2.ScreenShow(Index).ForeColor = &H8000000E
    Screen2.Show
    If Screen2.WindowState <> 2 Then Screen2.WindowState = 2
    Exit Sub
  Case 3
    Screen2.DD.Group = "Screen4"
    Recorder.ScreenShow(Index).BackColor = &HC0&
    Recorder.ScreenShow(Index).ForeColor = &H8000000E
    Screen1.Hide
    Screen2.Hide
    Recorder.Show
        If Recorder.WindowState <> 2 Then Recorder.WindowState = 2

    Recorder.Refresh
    Screen2.cat1screen.Visible = True
    Screen2.cat2screen.Visible = False
    Screen2.FavHitsScrn.Visible = False


End Select
End Sub

Private Sub SearchAgain_Click()
  response = MsgBox("Are you sure you want to Reset the Library Display?" & Chr(13) & "Any music playing will be automatically paused.", 4)
  If response = vbNo Then
    Exit Sub
  Else
    If RatingBox.Visible = True Then RatingBox.Visible = False
    If SongPlaying = True And Screen1.wp.LinkMode <> LINK_NONE Then
      Screen1.wp.LinkExecute "pause"
      PauseList = True

    End If
    Load choices
    choices.Show 1
    If CancelLibrary = True Then
      CancelLibrary = False
      Screen2.Show
      Screen2.SetFocus
      Exit Sub

    End If
    StoplistingList = False
    UpdateList
  End If
End Sub

Private Sub StopListUpdate_Click()
  StoplistingList = True
  If RatingBox.Visible = True Then RatingBox.Visible = False
```

```
If Screen1.wp.LinkMode <> LINK_NONE And PauseList = True Then
   Screen1.wp.LinkExecute "pause"
   PauseList = False
End If

End Sub
```

"Loader.frm"

```
Private Sub Form_Activate()
   Dim ftime, wtime As Integer

   Loader.Refresh
   MousePointer = 11
   ftime = Timer()
   wtime = 0
   App.HelpFile = App.Path & "\mohelp.hlp"
   Load titlefrm
   titlefrm.Animation1.AutoPlay = True
   titlefrm.Animation2.AutoPlay = True
   titlefrm.Animation1.Open App.Path & "\cd1a.avi"
   titlefrm.Animation2.Open App.Path & "\cd1b.avi"
   titlefrm.Animation1.Play
   titlefrm.Animation2.Play
   titlefrm.MMControl1.fileName = App.Path & "\Intro.wav"
   Call titlefrm.Main

   touchscreen = True

   Do While wtime < 10
      wtime = Timer() - ftime
      DoEvents
   Loop
      titlefrm.Show
      Loader.Hide
      MousePointer = 0
      Unload Loader
End Sub
```

"choices.frm"

```
Private Sub Form_Load()
   DisplayLibrary = False

End Sub

Private Sub OKButton_Click(Index As Integer)

   If Index = 1 Then
      CancelLibrary = True
   End If
   Unload choices
End Sub

Private Sub Option1_Click()
   DisplayLibrary = False
```

```
  Recorder.Title.Caption = "    Current Music You Own"
End Sub

Private Sub Option2_Click()
  DisplayLibrary = True
    Recorder.Title.Caption = "The Complete MOAEC Music Library"
End Sub
```

"Screen1.frm"

```
Private Declare Function mciSendCommandA Lib "WinMM" _
    (ByVal wDeviceID As Long, ByVal message As Long, _
    ByVal dwParam1 As Long, dwParam2 As Any) As Long

  Private Declare Function mciSendStringA Lib "WinMM" _
    (ByVal mciCommand As String, ByVal returnStr As String, _
    ByVal returnLength As Integer, ByVal callBack As Integer) As Long

Private Declare Function GetProfileString Lib "kernel32" _
Alias "GetProfileStringA" (ByVal lpAppName As String, _
ByVal lpKeyName As String, ByVal lpDefault As String, _
ByVal lpReturnedString As String, ByVal nSize As Long) As Long

Const MCI_OPEN = &H803
Const MCI_CLOSE = &H804
Const MCI_PLAY = &H806
Const MCI_OPEN_TYPE = &H200&
Const MCI_OPEN_ELEMENT = &H200&
Const MCI_WAIT = &H2&

Private Type MCI_WAVE_OPEN_PARMS
  dwCallback As Long
  wDeviceID As Long
  lpstrDeviceType As String
  lpstrElementName As String
  lpstrAlias As String
  dwBufferSeconds As Long
End Type

Private Type MCI_PLAY_PARMS
  dwCallback As Long
  dwFrom As Long
  dwTo As Long
End Type

Private Function StartApp(appname As String) As Long
On Error Resume Next

  StartApp = (Shell(appname))
  DoEvents
```

```
    If StartApp = 0 Then
      MsgBox "Couldn't start " & appname
      'StartApp = 0
      'End
    End If
  End Function
  Private Function CreateLink() As Integer


   On Error Resume Next

   ' set DDE parameter
   wp.LinkMode = NONE
   wp.LinkItem = ""

   wp.LinkTopic = "WinPlay3 audio"
   wp.LinkMode = LINK_MANUAL
   tmp = Err

   If (tmp = 0) Then
     WinPlayConnected = 1
   Else
     WinPlayConnected = 0
   End If

   CreateLink = tmp

 End Function

 Sub AdjustVolume(SliderNum As Integer)

 Dim newvolume As Long
 Dim first As Integer
 Dim other As Integer
 Dim leftVol As Long
 Dim RightVol As Long
 Dim fadevalue As Variant

 If ((SliderNum = 0 Or SliderNum = 1) And channel = 1) Or ((SliderNum = 2 Or SliderNum = 3) And channel = 2) Then
 If (channel = 1 And mixerbar.Value < 0) Or (channel = 2 And mixerbar.Value > 0) Then
   fadevalue = Abs(mixerbar.Value) / 100
   If fadevalue < 0.5 Then fadevalue = 0
 End If
 If SliderNum = 0 Or SliderNum = 1 Then
   first = 1
   other = 0
 ElseIf SliderNum = 2 Or SliderNum = 3 Then
   first = 3
   other = 2
 End If

 If SliderNum = first Or SliderNum = other Then
```

```
    Text2.Text = oldvolume
    leftVol = CLng(Val("&H" & Hex(volumesldr(other).Value)) - 1)
    RightVol = CLng(Val("&H" & Hex(fadevalue * (65535 - volumesldr(first).Value)) & Hex(fadevalue * (65535 -
volumesldr(other).Value))))
    newvolume = RightVol
    Call waveOutSetVolume(VolumeID, newvolume)
End If
End If
End Sub


  Sub Playwave(WaveFile As Variant, songlength As Double)
    Dim Ltime As Long
    Dim Y As Long
    'Dim X As Long
    Dim errorCode As Integer
    Dim returnStr As Integer
    Dim errorStr As String * 255
    Dim MaxMsecs As Double
    Dim volumecode As Long
    Dim pitch As Long
    Dim mixinc As Integer
    Dim count As Double
    Dim PiggyBack As Double
    Dim checker As Integer

    On Error GoTo errorhandler

    play(channel).Enabled = True
    pause(channel).Enabled = True
    Screen1.stop(channel).Enabled = True
    Screen1.stop(OtherChannel).Enabled = False
    wp.LinkExecute "set PlayList " & WaveFile
    Ltime = Timer()
    X = 0
    Do While X < 5
      X = Timer() - Ltime
    Loop
    wp.LinkExecute "play"
    StopList = False
    If channel = 1 Then other = 0
    If channel = 2 Then other = 3

    PlayLab(channel).Visible = True
    Quelab(channel).Visible = False
    If channel = 1 Then mixerbar.Value = -100
    If channel = 2 Then mixerbar.Value = 100
    NewPauseStartTime = Timer()
    X = 0
    Do While X < TimeSerial(0, 0, songlength)
      DoEvents
      If Timer() > AutoExitTime - 30 And Timer() < AutoExitTime - 27 And AutoExitEvent = True Then
        MsgBox ("MOAEC WILL SHUT DOWN IN 30 SECONDS !!!" & Chr(13) & "    Press CANCEL to prevent auto exit.")
      End If
```

```
If Timer() > AutoExitTime And AutoExitEvent = True Then
   'SendKeys "{enter}"
   EndItAll
   'Call ExitWindows(&H0, &H0)
End If
If PauseList = True Then
   NewPauseStartTime = Timer() - TimeSoFar
End If
If PauseList = False Then
   nexttrack(1).Enabled = True
   prevtrack(1).Enabled = True
   nexttrack(2).Enabled = True
   prevtrack(2).Enabled = True
   TimeSoFar = Timer() - NewPauseStartTime
   Let X = TimeSerial(0, 0, (TimeSoFar))
   TimeElapsed(channel).Text = Format(TimeSerial(0, 0, SongsTime + songlength) - X, "hh:mm:ss")
   Text1(channel).Text = Format(TimeSerial(0, 0, songlength) - X, "hh:mm:ss")
   Screen2.timebox.Text = Format(TimeSerial(0, 0, SongsTime + songlength) - X, "hh:mm:ss")
End If

If StopList = True Then
   X = TimeSerial(0, 0, 0)
   NewPauseStartTime = Timer()
   If PrevTrackVar = True Then
      PrevTrackVar = False
      StopList = False
      wp.LinkExecute "play"
   End If
End If
If NextTrackVar = True Then
   X = TimeSerial(0, 0, songlength)
   NextTrackVar = False
End If

Loop

PlayLab(channel).Visible = False
Quelab(channel).Visible = True

 Exit Sub
errorhandler:
 MsgBox ("Sorry....There was a problem playing this music selection.")
End Sub


Private Sub eject_Click()
 Dim files As String
 Dim n As Integer

 If wp.LinkMode <> LINK_NONE Then
  On Error Resume Next
  fileopendlg.Action = 1
 End If
```

```
End Sub

Private Sub Command1_Click()
 If wp.LinkMode <> LINK_NONE Then
   wp.LinkExecute "dialog options output"
 End If
End Sub

Private Sub AutoExit_Click()

  On Error GoTo endsub
  If AutoExit.Caption = "CANCEL" Then
     response = MsgBox("Are you sure you want to cancel auto shutdown?", 4)
     If response = vbNo Then
        Exit Sub
     Else
        AutoExitEvent = False
        AutoExit.Caption = "AUTO EXIT"
     End If
  Else
     If SongPlaying = False Then Exit Sub
     response = MsgBox("Are you sure you want to set MOAEC to shut down automatically?", 4)
     If response = vbNo Then
        Exit Sub
     Else
        AutoExit.Caption = "CANCEL"
        TimeFrame.Visible = True
        keyboard.Visible = True
        TimeInput.SetFocus
     End If
  End If
endsub:
End Sub

Private Sub backup_Click()
If TimeInput.Visible = True Then

   TimeInput.SetFocus
   SendKeys "{end}"
   SendKeys "{backspace}"
   SendKeys "{tab}"
End If
End Sub

Private Sub CurrentSongExpanded_Click(Index As Integer)
   CurrentSongExpanded(Index).Visible = False
End Sub

Private Sub cursong_click(Index As Integer)
```

```
CurrentSongExpanded(Index).Visible = True
End Sub

Private Sub ENTERKEY_Click()
If TimeInput.Visible = True Then

  TimeOK.SetFocus
  SendKeys "{enter}"
End If
End Sub

Private Sub ExitSystem_Click()
  response = MsgBox("Are you sure you want to exit the system?", 4)
  If response = vbNo Then
    Exit Sub
  Else
    ExitButtonPushed = True
    EndItAll
  End If
End Sub

Private Sub Form_GotFocus()
  On Error Resume Next
  Screen2.DD.Group = "Screen1"
End Sub

Public Sub Form_Load()
  Dim oldvolume As Long
  Dim oldrate As Long
Dim newvolume As Long
Dim VolumePoint As Long
Dim volumeID As Long
Dim volumecode As Long

Dim tmp As String * 256
Dim WinPlay3Name As String
Dim n As Integer
  StoplistingList = True
  Screen1.WindowState = 2
  automix = True
  NextTrackVar = False
  AutoExitEvent = False
  volinc(0) = Master(0).Value
  volinc(1) = Master(1).Value
' Open DDE connection with WinPlay3
If CreateLink() <> NONE Then

 ' get path to winplay3 from win.ini
 n = GetProfileString("WinPlay3", "ProgramFile", "WinPlay3.Exe", tmp, 256)
 WinPlay3Name = Left$(tmp, n)
 If StartApp(WinPlay3Name & " /DDE") Then
   Select Case CreateLink()
    Case 0
     ' dde server started
```

```
      Case NO_APP_RESPONDED
        MsgBox "Sorry, still can't connect."
      End Select
    End If

  End If

   Call waveOutGetID(VolumeHandle, VolumeID)
   Call waveOutGetVolume(VolumeID, oldvolume)

   PlaySpeed(0).Value = oldvolume
   PlaySpeed(1).Value = oldvolume

   Master(0).Value = 49000
   Master(1).Value = 49000
   volumesldr(8).Value = 49000
   volumesldr(9).Value = 49000
   For i = 4 To 5
     volumesldr(i).Value = 49000
   Next i
   For i = 0 To 3
     volumesldr(i).Value = 49000
   Next i
   mixerbar.Value = 100
   Call waveOutSetVolume(VolumeID, CLng(Val("&H" & Hex(16000) & Hex(16000))))
   PlaySpeed(0).Value = 5
   PlaySpeed(1).Value = 5

End Sub


Private Sub Form_Resize()
  On Error Resume Next
  If WindowState = 2 Then
    For X = 1 To 4
      ScreenShow(X).Left = ScreenShow(X - 1).Left + 1200
    Next X
    For X = 0 To 4
      ScreenShow(X).Top = Screen.Height - 1155
    Next X
    ExitSystem.Top = Screen.Height - 1155
    Label10.Top = Screen.Height - 1155

  Else
    For X = 1 To 4
      ScreenShow(X).Left = ScreenShow(X - 1).Left + 1200
    Next X
    For X = 0 To 4
      ScreenShow(X).Top = Screen1.Height - 1155
    Next X
    ExitSystem.Top = Screen1.Height - 1155
    Label10.Top = Screen1.Height - 1155
```

```
End If
Label10.Left = Screen1.Width - 1455
ExitSystem.Left = 120
Channel1(1).Left = (Screen1.Width / 2) + 8
Channel1(3).Left = (Screen1.Width / 2) + 8
Picture1.Width = Screen1.Width - 460
Picture1.Top = Screen1.Height - 3255
For X = 0 To 3
   Channel1(X).Width = (Screen1.Width / 2) - 353
Next X
For X = 0 To 1
   PlaySpeed(X).Left = (Channel1(0).Width / 2) - 1200
Next X
Label3(0).Left = PlaySpeed(0).Left + 720
Label3(1).Left = PlaySpeed(0).Left - 600
Label3(3).Left = PlaySpeed(0).Left + 720
Label3(4).Left = PlaySpeed(0).Left - 600
Label3(2).Left = PlaySpeed(0).Left + 2520
Label3(5).Left = PlaySpeed(0).Left + 2520
Label4(0).Left = PlaySpeed(0).Left + 720
Label4(1).Left = PlaySpeed(0).Left + 720


For X = 1 To 2
   play(X).Left = ((Channel1(0).Width / 2) - 1425)
   Screen1.stop(X).Left = ((Channel1(0).Width / 2) - 1425) + 570
   pause(X).Left = ((Channel1(0).Width / 2) - 1425) + 1140
   prevtrack(X).Left = ((Channel1(0).Width / 2) - 1425) + 1710
   nexttrack(X).Left = ((Channel1(0).Width / 2) - 1425) + 2280
   cursong(X).Left = Channel1(1).Width - 2175
   Quelab(X).Left = cursong(1).Left
   PlayLab(X).Left = cursong(1).Left
Next X
For X = 2 To 3
   Channel1(X).Height = Screen1.Height - Channel1(0).Height - Picture1.Height - 1600
Next X
volumesldr(0).Left = 0.209 * Picture1.Width
volumesldr(1).Left = 0.267 * Picture1.Width
volumesldr(2).Left = 0.36 * Picture1.Width
volumesldr(3).Left = 0.418 * Picture1.Width
volumesldr(4).Left = 0.6734 * Picture1.Width
volumesldr(5).Left = 0.7315 * Picture1.Width
volumesldr(8).Left = 0.8128 * Picture1.Width
volumesldr(9).Left = 0.894 * Picture1.Width
Master(0).Left = 0.5225 * Picture1.Width
Master(1).Left = 0.5806 * Picture1.Width
Label1(1).Left = volumesldr(0).Left + 120
Label1(2).Left = volumesldr(2).Left + 120
Label1(4).Left = volumesldr(4).Left + 120
Label1(5).Left = volumesldr(8).Left + 120
Label1(6).Left = volumesldr(9).Left + 120
Label1(3).Left = Master(0).Left + 120
```

```
    AutoExit.Top = ExitSystem.Top
    For X = 1 To 2
      CurrentSongExpanded(X).Left = (Screen1.Width / 2) - 5408
    Next X
    EQ1(0).Top = (Channel1(2).Height / 2) - 100
    EQ1(1).Top = (Channel1(2).Height / 2) - 100
    EQ1(0).Left = (Channel1(2).Width / 2) - 2280
    EQ1(1).Left = (Channel1(2).Width / 2) - 2280
  End Sub

  Private Sub Form_Unload(Cancel As Integer)
    If wp.LinkMode <> LINK_NONE Then
    wp.LinkExecute "stop"
    wp.LinkExecute "exit"
    End If
    WinPlay3Connected = 0
    wp.LinkMode = LINK_NONE

    EndItAll

  End Sub

Private Sub Label10_Click()
  SendKeys "{F1}"
End Sub

Private Sub Letters_Click(Index As Integer)
  'type the letter pressed in the text field
If TimeInput.Visible = True Then
  TimeInput.SetFocus
  SendKeys LCase(Letters(Index).Caption)
  SendKeys "{tab}"
End If

End Sub

Private Sub Master_Click(Index As Integer)

volinc(0) = Master(0).Value
volinc(1) = Master(1).Value

End Sub

Private Sub Master_Scroll(Index As Integer)

Dim volinc2(2) As Long
volinc2(Index) = Master(Index).Value - volinc(Index)

Select Case Index
Case 0
  volumesldr(0).Value = OrigVol(0) + volinc2(0)
  volumesldr(2).Value = OrigVol(2) + volinc2(0)
  volumesldr(4).Value = OrigVol(4) + volinc2(0)
```

```
Case 1
    volumesldr(1).Value = OrigVol(1) + volinc2(1)
    volumesldr(3).Value = OrigVol(3) + volinc2(1)
    volumesldr(5).Value = OrigVol(5) + volinc2(1)

End Select
volinc(Index) = Master(Index).Value

End Sub


Private Sub mixerbar_Change()

    If (mixerbar.Value <= 0 And channel = 1) Then
        AdjustVolume (1)
    ElseIf (mixerbar.Value >= 0 And channel = 2) Then
        AdjustVolume (2)
    End If

End Sub

Private Sub mixerbar_Scroll()


    If (mixerbar.Value <= 0 And channel = 1) Then
        AdjustVolume (1)
    ElseIf (mixerbar.Value >= 0 And channel = 2) Then
        AdjustVolume (2)
    End If

End Sub

Private Sub MixFade_Click()
  If MixFade.Caption = "AUTO MIX OFF" Then
      MixFade.Caption = "AUTO MIX ON"
      automix = True
  Else
      MixFade.Caption = "AUTO MIX OFF"
      automix = False
  End If
End Sub

Private Sub nexttrack_Click(Index As Integer)
If Index = channel Then
  If wp.LinkMode <> LINK_NONE Then
      response = MsgBox("Are you sure you want to skip to the next song?", 4)
      If response = vbNo Then
          Exit Sub
      Else
          NextTrackVar = True
      End If
  End If
End If
End Sub
```

```
Private Sub pause_Click(Index As Integer)
If channel = Index Then
If StoplistingList = False Then
   MsgBox ("Your library is still updating!" & Chr(13) & "Please switch to Screen 4 to resume play.")
   Exit Sub
End If
If wp.LinkMode <> LINK_NONE Then
   wp.LinkExecute "pause"
   If PauseList = True Then
      PauseList = False
   Else
      PauseList = True
   End If
 End If
End If
End Sub

Private Sub play_Click(Index As Integer)

If wp.LinkMode <> LINK_NONE Then
If Index = OtherChannel And StopList = True Then
   NextTrackVar = True
ElseIf Index = channel Then
   PauseList = False
   wp.LinkExecute "play"
   StopList = False
 End If
End If
End Sub

Private Sub PlaySpeed_Scroll(Index As Integer)
Dim oldrate As Long
Dim volumecode As Long
Dim newrate As Long


End Sub

Private Sub RestartMus_Click()
Dim SoundCom As Long

SoundCom = waveOutRestart(VolumeID)
Text2.Text = SoundCom

End Sub

Private Sub prevtrack_Click(Index As Integer)
If channel = Index Then
   If wp.LinkMode <> LINK_NONE Then
      wp.LinkExecute "stop"
      StopList = True
      PauseList = False
      PrevTrackVar = True
```

```
    End If
   End If
End Sub


Private Sub ScreenShow_Click(Index As Integer)
Dim i As Integer
On Error Resume Next
If (SelCat1 = "" And Index = 2) Then
    MsgBox ("Please select a main category from screen 2 before viewing this screen !!!")
    Exit Sub
End If
    Screen2.Category(1).Visible = False
    cat1count = 0
    'disable speed buttons since switching to screen 3
    For i = 0 To Screen2.SongSpeed.count - 1
        Screen2.SongSpeed(i).Enabled = False
        Screen2.SongSpeed(i).BackColor = &H8000000F
    Next i
    Screen2.Mix.Enabled = False
    Screen2.PlayTime.Enabled = False
    Screen2.Mix.BackColor = &H8000000F
    Screen2.PlayTime.BackColor = &H8000000F
 For i = 0 To 4
    Screen2.ScreenShow(i).BackColor = &H8000000F
    ScreenShow(i).BackColor = &H8000000F
    ScreenShow(i).ForeColor = &H80000012
 Next i

 Select Case Index
   Case 0

       Screen2.DD.Group = "Screen1"
       Screen2.Hide
       Screen2.cat2screen.Visible = False
       Screen2.FavHitsScrn.Visible = False
       Exit Sub
   Case 1
       Screen2.DD.Group = "Screen2"
      Screen2.cat2screen.Visible = False
      Screen2.FavHitsScrn.Visible = False
     For i = 0 To 4
         Screen2.ScreenShow(i).BackColor = &H8000000F
         Screen2.ScreenShow(Index).ForeColor = &H80000012
     Next i
     Screen2.ScreenShow(Index).BackColor = &HC0&
     Screen2.ScreenShow(Index).ForeColor = &H8000000E
     Screen2.Show
         If Screen2.WindowState <> 2 Then Screen2.WindowState = 2
      Exit Sub
  Case 2
    If IsDDWinRunning() Then Screen2.DD.Group = "Screen2"
```

```
SelCat1 = MemCat
Screen2.cat2screen.Visible = True
Screen2.FavHitsScrn.Visible = False
For i = 0 To 4
   Screen2.ScreenShow(i).BackColor = &H8000000F
   Screen2.ScreenShow(Index).ForeColor = &H80000012
Next i
Screen2.ScreenShow(Index).BackColor = &HC0&
Screen2.ScreenShow(Index).ForeColor = &H8000000E
Screen2.Show
      If Screen2.WindowState <> 2 Then Screen2.WindowState = 2

Exit Sub
Case 3
  Screen2.DD.Group = "Screen4"
  Recorder.ScreenShow(Index).BackColor = &HC0&
  Recorder.ScreenShow(Index).ForeColor = &H8000000E
  Screen1.Hide
  Screen2.Hide
  Recorder.Show
      If Recorder.WindowState <> 2 Then Recorder.WindowState = 2

  Recorder.Refresh
  Screen2.cat2screen.Visible = False
  Screen2.FavHitsScrn.Visible = False

End Select

'make the button pressed the right color


End Sub

Private Sub stop_Click(Index As Integer)
  If channel = Index Then
   If wp.LinkMode <> LINK_NONE Then
  wp.LinkExecute "stop"
  StopList = True
  play(OtherChannel).Enabled = True
 End If
 End If
End Sub

Private Sub undo_Click()

End Sub

Private Sub TimeCancel_Click()
   TimeFrame.Visible = False
   keyboard.Visible = False
End Sub

Private Sub TimeOK_Click()
   Dim Timer1 As Long
```

```
    Dim timer2 As Long
    On Error GoTo endsub
    If Val(TimeInput.Text) <> 0 Then
       AutoExitStart = Timer()
       AutoExitTime = AutoExitStart + (Val(TimeInput.Text) * 60)
       AutoExitEvent = True
    End If
    TimeFrame.Visible = False
    keyboard.Visible = False

endsub:
End Sub

Private Sub volumesldr_Change(Index As Integer)
AdjustVolume (Index)
OrigVol(Index) = volumesldr(Index).Value

End Sub

Private Sub volumesldr_Scroll(Index As Integer)
   On Error Resume Next
   AdjustVolume (Index)

End Sub
Private Sub wp_LinkClose()
 If WinPlayConnected <> 0 Then

 End If
 wp.LinkMode = LINK_NONE
End Sub

Private Sub wp_LinkError(LinkErr As Integer)
 MsgBox ("Link error")
End Sub
```

"screen2.frm"

```
Sub DD_SpeechRecognized(Word As String, WordValue As String)
   Dim CurControl As Control
   Dim VoiceFlag As Boolean
   Dim SavedName As String

   On Error GoTo errorhandler


   If Word = "[classical]" Then Category1(0).SetFocus
   If Word = "[jazz]" Then Category1(1).SetFocus
   If Word = "[folk]" Then Category1(2).SetFocus
   If Word = "[oldies]" Then Category1(3).SetFocus
   If Word = "[country]" Then Category1(4).SetFocus
   If Word = "[pop]" Then Category1(5).SetFocus
   If Word = "[soul]" Then Category1(6).SetFocus
   If Word = "[R and B]" Then Category1(7).SetFocus
```

```
If Word = "[blues]" Then Category1(8).SetFocus
If Word = "[calypso]" Then Category1(9).SetFocus
If Word = "[disco]" Then Category1(10).SetFocus
If Word = "[funk]" Then Category1(11).SetFocus
If Word = "[rock]" Then Category1(12).SetFocus
If Word = "[metal]" Then Category1(13).SetFocus
If Word = "[top 40]" Then Category1(14).SetFocus
If Word = "[rap]" Then Category1(15).SetFocus
If Word = "[reggae]" Then Category1(16).SetFocus
If Word = "[alternative]" Then Category1(17).SetFocus
If Word = "[ethnic]" Then Category1(18).SetFocus
If Word = "[religion]" Then Category1(19).SetFocus
If Word = "[special events]" Then Category1(20).SetFocus
If Word = "[funny]" Then Category1(21).SetFocus
If Word = "[easy listening]" Then Category1(22).SetFocus
If Word = "[favorite hits]" Then Category1(23).SetFocus
If Word = "[special dance]" Then Category1(24).SetFocus
If Word = "[special mixes]" Then Category1(25).SetFocus
If Word = "[dance]" Then Category1(26).SetFocus
If Word = "[energy]" Then Category1(27).SetFocus
If Word = "[sound effects]" Then Category1(28).SetFocus
If Word = "[sound tracks]" Then Category1(29).SetFocus
If Word = "[television]" Then Category1(30).SetFocus

If Word = "[Dance Mix]" Then Mix.SetFocus
If Word = "[Clear]" Then ClrSrch.SetFocus
If Word = "[Undo]" Then undo.SetFocus

If Word = "[Search List]" Then searchlist.SetFocus
If Word = "[Play List]" Then Playlist(0).SetFocus
If Word = "[Search]" Then search.SetFocus
If Word = "[Expand]" And ExpandList.Caption = "EXPAND" Then
   ExpandList.SetFocus
ElseIf Word = "[Shrink]" And ExpandList.Caption = "SHRINK" Then
   ExpandList.SetFocus
End If

If Word = "[Load]" Then LoadPlay.SetFocus
If Word = "[Save]" Then SavePlay.SetFocus
If Word = "[Next]" Then AddList(0).SetFocus
If Word = "[Pick]" Then AddList(1).SetFocus
If Word = "[Delete]" Then delete.SetFocus

If Word = "[Title]" Then SearchCat(1).SetFocus
If Word = "[Artist]" Then SearchCat(2).SetFocus
If Word = "[Date]" Then SearchCat(3).SetFocus
If Word = "[Song Category]" Then SearchCat(4).SetFocus
If Word = "[Dance Type]" Then SearchCat(6).SetFocus
If Word = "[Music Style]" Then SearchCat(5).SetFocus
If Word = "[Speed]" And SearchCat(1).Enabled = True Then SearchCat(7).SetFocus
If Word = "[Energy]" Then SearchCat(8).SetFocus

If Word = "[Speed]" And AllSpeeds.Enabled = True Then AllSpeeds.SetFocus
If Word = "[Fast]" And SongSpeed(0).Enabled = True Then SongSpeed(0).SetFocus
```

```
'If Word = "[Fast]" Then SongSpeed(0).SetFocus
If Word = "[Medium]" And SongSpeed(1).Enabled = True Then SongSpeed(1).SetFocus
If Word = "[Slow]" And SongSpeed(2).Enabled = True Then SongSpeed(2).SetFocus
If Word = "[Time]" And PlayTime.Enabled = True Then PlayTime.SetFocus
If Word = "[30]" Then
   TimeInput.SetFocus
   TimeInput.Text = 30
End If
If Word = "[OK]" And timebox.Visible = True Then TimeOK.SetFocus
If Word = "[Begin Search]" And SearchScreen.Visible = True Then BeginSearch.SetFocus
If Word = "[Cancel]" And timebox.Visible = True Then TimeCancel.SetFocus
If Word = "[Cancel]" And SearchScreen.Visible = True Then Cancel.SetFocus
If Word = "[Cancel]" And cat2screen.Visible = True Then CancelSubScreen.SetFocus
'If word = "[minutes]" Then Text2.SetFocus
If Word = "[Play]" Then PlayButton.SetFocus
If Word = "[Now]" Then Now.SetFocus

'If word = "[screen 1]" Then ScreenShow(0).SetFocus
'If word = "[screen 2]" Then ScreenShow(1).SetFocus
'If word = "[screen 3]" Then ScreenShow(2).SetFocus
'If word = "[screen 4]" Then ScreenShow(3).SetFocus
SendKeys " "

errorhandler:
  Exit Sub
End Sub
Sub GrayOut()
  'disable and gray out speed, mix, and time buttons
  Mix.Enabled = False
  AllSpeeds.Visible = True
  AllSpeeds.Enabled = False
  PlayTime.Enabled = False
  Mix.BackColor = &H8000000F
  AllSpeeds.BackColor = &H8000000F
  PlayTime.BackColor = &H8000000F
  For i = 0 To SongSpeed.count - 1
    SongSpeed(i).Enabled = False
    SongSpeed(i).BackColor = &H8000000F
  Next i
End Sub
Sub LoadNewSong(Songfile As String)
  Dim memHandle As Long
  Dim memPointer As Long
  Dim fileName As String
  Dim retValue As Long
  Dim nBytes As Long
  Dim fileSize As Long

  Dim origStr As String
  Dim strSize As Long
  Dim textStr As String


  On Error GoTo noFilename
```

```
    fileName = Songfile
    FilePointer = CreateFile(fileName, GENERIC_READ Or GENERIC_WRITE, 0&, 0&, OPEN_EXISTING,
FILE_ATTRIBUTE_NORMAL, 0&)
    fileSize = GetFileSize(FilePointer, 0)
    memHandle = GlobalAlloc(GMEM_MOVEABLE Or GMEM_ZEROINIT, fileSize)
    memPointer = GlobalLock(memHandle)
    retValue = ReadFile(FilePointer, ByVal memPointer, fileSize, nBytes, 0&)

    Call Screen1.Playwave(fileName, songlength)
    CloseHandle (FilePointer)
    GlobalUnlock (memHandle)
    GlobalFree (memHandle)
    Exit Sub

noFilename:

End Sub
Sub StartPlay(row As Integer, list As Integer)
Dim song, songlength2 As String
Dim i, j As Integer
Dim CurControl As MSFlexGrid
'Dim OtherChannel As Integer
On Error GoTo errorhandler

If list = 1 Then

  Set CurControl = searchlist

ElseIf list = 2 Then

  Set CurControl = Playlist(0)

End If
StopList = False
If (CurControl.Name = Playlist(0).Name And Playlist(0).Rows > 1) Or CurControl.Name = searchlist.Name Then
If SongPlaying = True Then
    answer = MsgBox("Are you sure you want to interrupt the current song ?", 4, "Interrupt Song Playing")
    If answer = vbNo Then
      Exit Sub
    Else
      If channel = 1 Then
        channel = 2
        OtherChannel = 1
      ElseIf channel = 2 Then
        channel = 1
        OtherChannel = 2
      End If

  End If
End If

Mix.Enabled = False
'switch to s1
Screen1.Show
```

```
        Screen1.Refresh
        Screen2.Hide


        If Playlist(0).Rows > 1 Then
            Playlist(0).Col = 1
            Playlist(1).Col = 1
            Playlist(0).ColSel = 2
            Playlist(1).ColSel = 8
        End If
    'build the songlist array from the play list

    'find the song from the play list

    'disable mix button
    If CurControl.Name = searchlist.Name Then
    If searchlist.RowSel > 0 Then
        searchlist.BackColorSel = searchlist.CellBackColor
        searchlist.ForeColorSel = searchlist.CellForeColor
        For i = 0 To 8
            selsong(i) = searchlist.TextMatrix(searchlist.row, i)
        Next i
        Playlist(0).AddItem selsong(0) & Chr(9) & selsong(1) & Chr(9) & selsong(2)
        Playlist(1).AddItem selsong(0) & Chr(9) & selsong(1) & Chr(9) & selsong(2)

        'Add a song to the total to be played
        NumSongs.Text = PlaySongs

        'Add the song time to the play time box
    End If
    End If
    'begin playing song list
    Do Until Playlist(0).Rows < 2
        undo.Enabled = False
        For j = 0 To 4
                ScreenShow(j).BackColor = &H8000000F
                ScreenShow(j).ForeColor = &H80000012
                Screen1.ScreenShow(j).BackColor = &H8000000F
                Screen1.ScreenShow(j).ForeColor = &H80000012
            Next j
            Screen1.ScreenShow(0).BackColor = &HC0&
            Screen1.ScreenShow(0).ForeColor = &H8000000E

    Screen1.Refresh


    If Playlist(0).Rows > 1 Then
        CurControl.row = row
        If channel = 1 Then OtherChannel = 2
        If channel = 2 Then OtherChannel = 1
        Screen1.PlayLab(OtherChannel).Visible = False
    Screen1.Quelab(OtherChannel).Visible = True
    'find the first song to be played
```

```
'if the song was already on deck then play it
  Data1.Refresh
  Data1.Recordset.MoveLast
  Data1.Recordset.MoveFirst
  Data1.Recordset.FindFirst "Title = '" & CurControl.TextMatrix(row, 1) & "' and Artist = '" & CurControl.TextMatrix(row, 2) &
"'"

    If IsNull(Data1.Recordset.Fields("ID")) Then
      MsgBox ("There was a problem finding your song file on disk.")

    Else
      songlist = "c:\Progra~1\moaec\895.mpg"
      'songlist = "C:\Progra~1\moaec\" & Data1.Recordset.Fields("ID") & ".mpg"
      'songlist = "c:\windows\media\tada.wav"
      songlist = "e:\" & Data1.Recordset.Fields("ID") & ".mpg"

    End If

    songlength = Val(CurControl.TextMatrix(row, 0)) + 2
    Screen1.cursong(channel).Text = CurControl.TextMatrix(row, 1)
    CurControl.Col = 1
    Screen1.cursong(channel).BackColor = CurControl.CellBackColor
    Screen1.Text1(channel).Text = Format(TimeSerial(0, 0, songlength), "hh:mm:ss")
    If CurControl.Name = Playlist(0).Name Then
      For X = 0 To 8
        Screen1.CurrentSongExpanded(channel).TextMatrix(1, X) = Playlist(1).TextMatrix(row, X)
        Screen1.CurrentSongExpanded(channel).CellBackColor = Playlist(1).CellBackColor
        Screen1.CurrentSongExpanded(channel).BackColorSel = Playlist(1).CellBackColor
        Screen1.CurrentSongExpanded(channel).ForeColorSel = Playlist(1).CellForeColor

      Next X
    Else
      For X = 0 To 8
        Screen1.CurrentSongExpanded(channel).TextMatrix(1, X) = CurControl.TextMatrix(row, X)
        Screen1.CurrentSongExpanded(channel).CellBackColor = CurControl.CellBackColor
        Screen1.CurrentSongExpanded(channel).BackColorSel = CurControl.CellBackColor
        Screen1.CurrentSongExpanded(channel).ForeColorSel = CurControl.CellForeColor
      Next X
    End If
    Data1.Recordset.Close
If (CurControl.Name = Playlist(0).Name And Playlist(0).Rows > 2) Or CurControl.Name = searchlist.Name Then
  If (CurControl.Name = Playlist(0).Name And row <> 1) Or CurControl.Name = searchlist.Name Then
    Playlist(0).row = 1
    Playlist(1).row = 1
  Else
    Playlist(0).row = 2
    Playlist(1).row = 2
  End If
    songlength2 = Val(Playlist(0).TextMatrix(Playlist(0).row, 0))
    Screen1.cursong(OtherChannel).Text = Playlist(0).TextMatrix(Playlist(0).row, 1)
    Playlist(0).Col = 1
    Screen1.cursong(OtherChannel).BackColor = Playlist(0).CellBackColor
    Screen1.Text1(OtherChannel).Text = Format(TimeSerial(0, 0, songlength2), "hh:mm:ss")
    Screen1.TimeElapsed(OtherChannel).Text = Format(TimeSerial(0, 0, 0), "hh:mm:ss")
```

```
        For X = 0 To 8
            Screen1.CurrentSongExpanded(OtherChannel).TextMatrix(1, X) = Playlist(1).TextMatrix(Playlist(0).row, X)
            Screen1.CurrentSongExpanded(OtherChannel).CellBackColor = Playlist(1).CellBackColor
            Screen1.CurrentSongExpanded(OtherChannel).BackColorSel = Playlist(1).CellBackColor
            Screen1.CurrentSongExpanded(OtherChannel).ForeColorSel = Playlist(1).CellForeColor
        Next X

    Else
        songlist2 = ""
        Screen1.cursong(OtherChannel).Text = ""
        Screen1.cursong(OtherChannel).BackColor = &H80000009
        Screen1.Text1(OtherChannel).Text = Format(TimeSerial(0, 0, 0), "hh:mm:ss")
        Screen1.TimeElapsed(OtherChannel).Text = Format(TimeSerial(0, 0, 0), "hh:mm:ss")
    End If


    If CurControl.Name = searchlist.Name Then SongsTime = SongsTime + CLng(Val(CurControl.TextMatrix(row, 0)))
    SongsTime = SongsTime - CLng(Val(CurControl.TextMatrix(row, 0)))
    timebox.Text = Format(TimeSerial(0, 0, CLng(SongsTime)), "hh:mm:ss")


    If Playlist(0).Rows > 2 Then
        If CurControl.Name = Playlist(0).Name And row <> 1 Then
            Playlist(0).row = row
            Playlist(1).row = row
        ElseIf CurControl.Name = searchlist.Name Then
            Playlist(0).row = Playlist(0).Rows - 1
            Playlist(1).row = Playlist(0).Rows - 1
        Else
            Playlist(0).row = 1
            Playlist(1).row = 1

        End If
        Playlist(1).RemoveItem (Playlist(0).row)
        Playlist(0).RemoveItem (Playlist(0).row)
    Else
        Playlist(0).Clear
        Playlist(1).Clear
        Playlist(0).Rows = 1
        Playlist(1).Rows = 1
        Playlist(0).Col = 1
        Playlist(1).Col = 1
        Playlist(0).ColSel = 2
        Playlist(1).ColSel = 8
        Playlist(0).CellBackColor = Playlist(0).BackColorFixed
        Call FormatHeaders
    End If
    If CurControl.Name = searchlist.Name Then PlaySongs = PlaySongs + 1
    PlaySongs = PlaySongs - 1
    NumSongs.Text = PlaySongs
    Playlist(0).Col = 1
    Playlist(1).Col = 1
    Playlist(0).ColSel = 2
    Playlist(1).ColSel = 8
```

```
Playlist(0).BackColorSel = Playlist(0).CellBackColor
Playlist(0).ForeColorSel = Playlist(0).CellForeColor
Playlist(1).BackColorSel = Playlist(0).CellBackColor
Playlist(1).ForeColorSel = Playlist(0).CellForeColor
SongPlaying = True
Call Screen1.Playwave(songlist, songlength)
If CurControl.Name = searchlist.Name Then Set CurControl = Playlist(0)
row = 1

If channel = 1 Then
     channel = 2
     OtherChannel = 1
  Else
     channel = 1
     OtherChannel = 2
  End If
SongPlaying = False

End If
Loop
Else
  StopList = True
End If

clearall:
 SongsTime = 0
      Playlist(0).Col = 1
      Playlist(1).Col = 1
      Playlist(0).ColSel = 2
      Playlist(1).ColSel = 8
      timebox.Text = Format(TimeSerial(0, 0, CLng(SongsTime)), "hh:mm:ss")
      Playlist(0).Clear
      Playlist(0).Rows = 1
      Call FormatHeaders
      Playlist(0).BackColorSel = Playlist(0).BackColorFixed
      Playlist(0).ForeColorSel = Playlist(0).ForeColorFixed
      Playlist(1).Clear
      Playlist(1).Rows = 1
      Playlist(1).BackColorSel = Playlist(1).BackColorFixed
      Playlist(1).ForeColorSel = Playlist(1).ForeColorFixed
      searchlist.BackColorSel = &H80000008
      searchlist.ForeColorSel = &H8000000E
      PlaySongs = 0
      NumSongs.Text = "0"
      Screen1.cursong(channel).Text = ""
      Screen1.cursong(channel).BackColor = &H80000009

      Screen1.Text1(channel).Text = Format(TimeSerial(0, 0, 0), "hh:mm:ss")
      Screen1.TimeElapsed(channel).Text = Format(TimeSerial(0, 0, 0), "hh:mm:ss")
      Screen1.cursong(OtherChannel).Text = ""
      Screen1.cursong(OtherChannel).BackColor = &H80000009

      Screen1.Text1(OtherChannel).Text = Format(TimeSerial(0, 0, 0), "hh:mm:ss")
      Screen1.TimeElapsed(OtherChannel).Text = Format(TimeSerial(0, 0, 0), "hh:mm:ss")
```

```
        Now.Enabled = False
        PlayButton.Enabled = False
        Now.BackColor = &H8000000F
        PlayButton.BackColor = &H8000000F

Exit Sub

errorhandler:

   MsgBox "There was a problem finding your selected song file."
   SongPlaying = False


End Sub
Sub RestoreSearchList()
   CurRow2 = 1
   CurRow1 = 1
   CurCol = 0
   undo.Enabled = False
      'clear the playlists
      SearchSongs = 0

      searchlist.AllowBigSelection = True

      searchlist.Rows = numRows

      If numRows = 0 Then
         ClearSearchList
         ClrSrch.Enabled = False
      Else
         ClrSrch.Enabled = True
         searchlist.row = 1
      searchlist.Col = 0
      searchlist.RowSel = numRows - 1

      searchlist.ColSel = 8
      searchlist.Clip = allCells1

      For i = 1 To numRows - 1
         searchlist.row = i
         For k = 0 To 8
            searchlist.Col = k
            searchlist.CellBackColor = FileColors(i)
         Next k
         SearchSongs = SearchSongs + 1
      Next i
      searchlist.AllowBigSelection = False

      searchlist.row = 1

      searchlist.Col = 0

      delete.Enabled = True
      End If
```

```
        Exit Sub

End Sub
Sub RestorePlayList()
    If numRows = 0 Then
        ClearPlayList
    Else
        CurRow2 = 1
        CurRow1 = 1
        CurCol = 0
        undo.Enabled = False
        'clear the playlists
        PlaySongs = 0
        SongsTime = 0
        NumSongs.Text = 0
        timebox.Text = Format(TimeSerial(0, 0, CLng(SongsTime)), "hh:mm:ss")
        SinglePlayTime.Text = "00:00:00"
        Playlist(0).AllowBigSelection = True
        Playlist(1).AllowBigSelection = True
        Playlist(0).Rows = numRows
        Playlist(0).row = 1
        Playlist(0).Col = 0
        Playlist(0).RowSel = numRows - 1
        Playlist(0).ColSel = 2
        Playlist(1).Rows = numRows
        Playlist(1).row = 1
        Playlist(1).Col = 0
        Playlist(1).RowSel = numRows - 1
        Playlist(1).ColSel = 8
        Playlist(0).Clip = allCells1
        Playlist(1).Clip = allCells2
        For i = 1 To numRows - 1
            Playlist(0).row = i
            For j = 0 To 2
                Playlist(0).Col = j
                Playlist(0).CellBackColor = FileColors(i)
            Next j
            Playlist(1).row = i
            For k = 0 To 8
                Playlist(1).Col = k
                Playlist(1).CellBackColor = FileColors(i)
            Next k
            SongsTime = SongsTime + CLng(Val(Playlist(0).TextMatrix(i, 0)))
            timebox.Text = Format(TimeSerial(0, 0, SongsTime), "hh:mm:ss")
            PlaySongs = PlaySongs + 1
            NumSongs.Text = PlaySongs
        Next i
        Playlist(0).AllowBigSelection = False
        Playlist(1).AllowBigSelection = False
        Playlist(0).row = 1
        Playlist(1).row = 1
        Playlist(0).Col = 0
        Playlist(1).Col = 0
        ExpandList.Enabled = True
```

```
delete.Enabled = True
Command1.Enabled = True
Now.Enabled = True
Now.BackColor = &HFF&
PlayButton.Enabled = True
PlayButton.BackColor = &HFF8080
RndMix.Enabled = True
SavePlay.Enabled = True
Call CheckOnDeck
End If
Exit Sub


End Sub
Sub SaveSearchList()

   CurRow1 = searchlist.row
   CurCol = 0
   undo.Enabled = True
On Error GoTo errorhandler

      searchlist.AllowBigSelection = True
      searchlist.row = 1
      searchlist.Col = 0
      searchlist.RowSel = searchlist.Rows - 1
      searchlist.ColSel = 8
      allCells1 = searchlist.Clip

      numRows = searchlist.Rows
      ReDim FileColors(searchlist.Rows - 1)
      For i = 1 To searchlist.Rows - 1
         searchlist.row = i
         FileColors(i) = searchlist.CellBackColor
         'Write #FileNum, FileColors(i)
      Next i
      searchlist.AllowBigSelection = False
      searchlist.row = CurRow1
      searchlist.Col = 0

      Exit Sub

errorhandler:
Exit Sub
End Sub
Sub SavePlayList()

   CurRow2 = Playlist(1).row
   CurRow1 = Playlist(0).row
   CurCol = 0
   undo.Enabled = True
On Error GoTo errorhandler

      Playlist(0).AllowBigSelection = True
      Playlist(0).row = 1
```

```
        Playlist(0).Col = 0
        Playlist(0).RowSel = Playlist(0).Rows - 1
        Playlist(0).ColSel = 2
        allCells1 = Playlist(0).Clip
        Playlist(1).AllowBigSelection = True
        Playlist(1).row = 1
        Playlist(1).Col = 0
        Playlist(1).RowSel = Playlist(1).Rows - 1
        Playlist(1).ColSel = 8
        allCells2 = Playlist(1).Clip
        numRows = Playlist(0).Rows
        ReDim FileColors(Playlist(0).Rows + 1)
        For i = 1 To Playlist(0).Rows - 1
           Playlist(0).row = i
           FileColors(i) = Playlist(0).CellBackColor
           'Write #FileNum, FileColors(i)
        Next i
        Playlist(1).AllowBigSelection = False
        Playlist(0).AllowBigSelection = False
        Playlist(0).row = CurRow1
        Playlist(1).row = CurRow2
        Playlist(0).Col = 1
        Playlist(1).Col = 1
        Exit Sub

errorhandler:
Exit Sub
End Sub

Sub ListFavHits()
   If PlayedSongs(1, 1, 1) <> "" Then
         Organize.Enabled = True
         For z = 1 To zed
            searchlist.AddItem PlayedSongs(1, z, 0) & Chr(9) & PlayedSongs(1, z, 1) & Chr(9) & PlayedSongs(1, z, 2) & Chr(9) &
PlayedSongs(1, z, 3) & Chr(9) & PlayedSongs(1, z, 4) & Chr(9) & PlayedSongs(1, z, 5) & Chr(9) & PlayedSongs(1, z, 6) & Chr(9) &
PlayedSongs(1, z, 7) & Chr(9) & PlayedSongs(1, z, 8)
            SearchSongs = SearchSongs - 1
            searchlist.row = SearchSongs
            For X = 0 To 8
               searchlist.Col = X
               searchlist.CellBackColor = PlayedSongs(1, z, 9)
            Next X
            ClrSrch.Enabled = True
            searchlist.BackColorSel = searchlist.CellBackColor
         Next z
      Else

         MsgBox ("Sorry...You have no song selections defined as favorite hits.")
      End If
End Sub
Sub ClearPlayList()
   Dim i As Integer
   'reset the song variables
```

```
SongsTime = 0
PlaySongs = 0
'clear the fields associated with song count and time
timebox.Text = Format(TimeSerial(0, 0, CLng(SongsTime)), "hh:mm:ss")
SinglePlayTime.Text = "00:00:00"
NumSongs.Text = "0"
'purge the contents of the playlist
For i = 0 To 1
   Playlist(i).Clear
   Playlist(i).Rows = 1
   Playlist(i).BackColorSel = Playlist(0).BackColorFixed
   Playlist(i).ForeColorSel = Playlist(0).ForeColorFixed
Next i
'reset column widths and make the smallest list visible
Call FormatHeaders
Playlist(0).Visible = True
Playlist(1).Visible = False
'reset the buttons
SavePlay.Enabled = False
RndMix.Enabled = False
Mix.Enabled = False
Now.Enabled = False
Now.BackColor = &H8000000F
PlayButton.BackColor = &H8000000F
PlayButton.Enabled = False
AddList(0).Enabled = False
Command1.Enabled = False
ExpandList.Enabled = False
'reset button colors and return selection to searchlist
Now.BackColor = &H8000000F
Mix.BackColor = &H8000000F
searchlist.BackColorSel = &H80000008
searchlist.ForeColorSel = &H8000000E
End Sub
Sub ClearSearchList()
Dim i As Integer
'reset caption of main search button and text fields
search.Caption = "Search Music Categories"

For i = 0 To 9
   csearch(i).Caption = ""
Next i
'remove all rows of the list
searchlist.Clear
searchlist.Rows = 1
Call FormatHeaders
'reset the searchlist colors
searchlist.BackColorSel = searchlist.BackColorFixed
searchlist.ForeColorSel = searchlist.ForeColorFixed
searchlist.BackColor = &H8000000E
'reset the main search flag and flag label
csearch(0).Caption = "none"
searchflag = 0
'reset searchlist variables and reset buttons
```

```
    SearchSongs = 0
    AddList(0).Enabled = False
    AddList(1).Enabled = False
    ClrSrch.Enabled = False
    Organize.Enabled = False
    Now.Enabled = False
    Now.BackColor = &H8000000F
End Sub
Sub DeletePlay(RowNum As Integer)
    If Playlist(0).Rows <= 2 Then
        Playlist(1).row = 1
        For i = 0 To 8
            UndoText(i) = Playlist(1).TextMatrix(1, i)
        Next i
        ClearPlayList

    Else

        PlaySongs = PlaySongs - 1
        SongsTime = SongsTime - CLng(Val(Playlist(0).TextMatrix(RowNum, 0)))
        timebox.Text = Format(TimeSerial(0, 0, SongsTime), "hh:mm:ss")
        NumSongs.Text = PlaySongs
        Playlist(0).RemoveItem RowNum
        Playlist(1).RemoveItem RowNum

    End If
End Sub

Sub ExpandListButs()
    On Error Resume Next
    Dim X As Integer
    Dim ButWidth(9) As Integer
    Dim ButLeft(8) As Integer
    ButWidth(1) = 2450
    ButWidth(2) = 1960
    ButWidth(3) = 690
    ButWidth(4) = 1630
    ButWidth(5) = 1000
    ButWidth(6) = 1450
    ButWidth(7) = 1150
    ButWidth(8) = 1080
    ButLeft(2) = 4410
    ButLeft(3) = 5100
    ButLeft(4) = 6730
    ButLeft(5) = 7730
    ButLeft(6) = 9180
    ButLeft(7) = 10330
    ButLeft(8) = 11410

    For X = 1 To 8
        SearchCat(X).Width = ButWidth(X) + (HeadExpand * 44.5)
    Next X
    For X = 2 To 8
        SearchCat(X).Left = SearchCat(X - 1).Left + SearchCat(X - 1).Width - 15
```

```
    Next X
  End Sub
  Sub FormatHeaders()
    'Expands the headers of the spreadsheets to match screen width
    On Error Resume Next
    Playlist(0).FormatString = "|<Song Title                    " & Space(5 * HeadExpand) & "|<Artist                    " &
Space(5 * HeadExpand)
    Playlist(1).FormatString = "|<Song Title                    " & Space(HeadExpand) & "|<Artist                    " &
Space(HeadExpand) & "|^Date    " & Space(HeadExpand) & "|^Music Category        " & Space(HeadExpand) & "|^Music Style  "
& Space(HeadExpand) & "|^Dance Type        " & Space(HeadExpand) & "|^Music Speed   " & Space(HeadExpand) & "|^Energy
" & Space(HeadExpand)
    searchlist.FormatString = "|<Song Title                    " & Space(HeadExpand) & "|<Artist                    " &
Space(HeadExpand) & "|^Date    " & Space(HeadExpand) & "|^Music Category        " & Space(HeadExpand) & "|^Music Style  "
& Space(HeadExpand) & "|^Dance Type        " & Space(HeadExpand) & "|^Music Speed   " & Space(HeadExpand) & "|^Energy
" & Space(HeadExpand)
  End Sub
  Sub CheckSub(checker As String)
    If checker = "Sub1" Then
      SubCol = "Sub2"
      SubCount = 0
    ElseIf checker = "Sub2" Then
      SubCol = "Sub3"
    ElseIf checker = "Sub3" Then
      SubCol = "Sub4"
    ElseIf checker = "Sub4" Then
      SubCol = "Sub5"
    ElseIf checker = "Sub5" Then
      SubCol = "Sub6"
    ElseIf checker = "Sub6" Then
      SubCol = "Sub7"
    ElseIf checker = "Sub7" Then
      SubCol = "Sub8"
    ElseIf checker = "Sub8" Then
      SubCol = "Sub9"
    ElseIf checker = "Sub9" Then
      SubCol = "Sub10"
    ElseIf checker = "Sub10" Then
      SubCol = "Sub11"
    ElseIf checker = "Sub11" Then
      SubCol = "Sub1"

    End If
    SubCount = SubCount + 1
End Sub

'Option Compare Text
Sub CheckMain(checker2 As String)
  If checker2 = "Main" Then
    Cat1 = "Main1"
  ElseIf checker2 = "Main1" Then
    Cat1 = "Main2"
    MainCount = 0
  ElseIf checker2 = "Main2" Then
    Cat1 = "Main3"
```

```
    ElseIf checker2 = "Main3" Then
      Cat1 = "Main4"
    ElseIf checker2 = "Main4" Then
      Cat1 = "Main5"
    ElseIf checker2 = "Main5" Then
      Cat1 = "Main6"
    ElseIf checker2 = "Main6" Then
      Cat1 = "Main7"
    ElseIf checker2 = "Main7" Then
      Cat1 = "Main8"
    ElseIf checker2 = "Main8" Then
      Cat1 = "Main1"

    End If
    MainCount = MainCount + 1
  End Sub
  Sub CheckOnDeck()
  Dim songlist2 As String
  Dim songlength2 As Integer
  On Error GoTo errorhandler
  If Playlist(0).Rows > 1 Then

       songlength2 = Val(Playlist(0).TextMatrix(1, 0))

       Playlist(0).row = 1
       Playlist(1).row = 1
       Playlist(0).BackColorSel = Playlist(0).CellBackColor
       Playlist(0).ForeColorSel = Playlist(0).CellForeColor
       Playlist(1).BackColorSel = Playlist(1).CellBackColor
       Playlist(1).ForeColorSel = Playlist(1).CellForeColor

       Screen1.cursong(OtherChannel).Text = Playlist(0).TextMatrix(1, 1)
       Screen1.cursong(OtherChannel).BackColor = Playlist(0).CellBackColor
       Screen1.Text1(OtherChannel).Text = Format(TimeSerial(0, 0, songlength2), "hh:mm:ss")
       Screen1.TimeElapsed(OtherChannel).Text = Format(TimeSerial(0, 0, 0), "hh:mm:ss")
       For X = 0 To 8
         Screen1.CurrentSongExpanded(OtherChannel).TextMatrix(1, X) = Playlist(1).TextMatrix(1, X)
         Screen1.CurrentSongExpanded(OtherChannel).CellBackColor = Playlist(1).CellBackColor
         Screen1.CurrentSongExpanded(OtherChannel).BackColorSel = Playlist(1).CellBackColor
         Screen1.CurrentSongExpanded(OtherChannel).ForeColorSel = Playlist(1).CellForeColor

       Next X
       Data1.Recordset.Close
     Else
       Screen1.cursong(OtherChannel).Text = ""
       Screen1.cursong(OtherChannel).BackColor = &H80000009
       Screen1.Text1(OtherChannel).Text = Format(TimeSerial(0, 0, 0), "hh:mm:ss")
       Screen1.TimeElapsed(OtherChannel).Text = Format(TimeSerial(0, 0, 0), "hh:mm:ss")
     End If
     Screen1.PlayLab(OtherChannel).Visible = False
     Screen1.Quelab(OtherChannel).Visible = True
     Exit Sub

errorhandler:
```

```
        Exit Sub

    End Sub

    Private Sub AllSpeeds_Click()
       AllSpeeds.Visible = False
       AllSpeeds.Enabled = False
    End Sub

    Private Sub CancelSubScreen_Click()
       CancelSearch = True
    End Sub

    Private Sub ENTERKEY_Click()
       If searchfield.Visible = True Then
       BeginSearch.SetFocus
       'SendKeys "{end}"
       SendKeys "{enter}"
    Else
       TimeOK.SetFocus
       SendKeys "{enter}"
    End If

    End Sub

    Private Sub ExitSystem_Click()
      response = MsgBox("Are you sure you want to exit the system?", 4)
      If response = vbNo Then
         Exit Sub
      Else
         ExitButtonPushed = True
         EndItAll
      End If
    End Sub

    Private Sub Form_GotFocus()
      On Error Resume Next
      Screen2.DD.Group = "Screen2"
    End Sub

    Private Sub Form_QueryUnload(Cancel As Integer, UnloadMode As Integer)
      Dim Msg ' Declare variable.
      If ExitButtonPushed = False Then

         Msg = "Do you really want to exit the application?"

      Else
         EndItAll
         ExitButtonPushed = True
      End If

    End Sub

    Private Sub Form_Resize()
```

```
If WindowState = 2 Then
   Screen1.WindowState = 2
   Recorder.WindowState = 2
   HeadExpand = 0
   Call FormatHeaders
   Call ExpandListButs
   HeadExpand = (Screen2.Width - 11565) / 443
   Call FormatHeaders
   Call ExpandListButs
   If ExpandList.Caption = "EXPAND" Then
      Picture1.Left = 6720
      Picture1.Width = Screen.Width - 6830
      SinglePlayTime.Left = Screen.Width + 100
      Label5.Left = Screen.Width + 100
      Label1.Left = 1440
   Else
      Picture1.Left = 0
      Picture1.Width = Screen2.Width - 195
      Playlist(1).Left = 0
      SinglePlayTime.Left = 4800
      Label5.Left = 6240
      Label1.Left = 0.41 * Picture1.Width
   End If
   Picture1.Top = 0

   Picture4.Height = Screen.Height - 6290
   Picture4.Width = Screen2.Width - 195
   searchlist.Width = Picture4.Width - 100
   searchlist.Height = Picture4.Height - 600
   For X = 0 To 4
      ScreenShow(X).Top = Screen.Height - 1155
   Next X
   undo.Top = Screen.Height - 1155
   Help.Top = Screen.Height - 1155
   SavePlay.Top = Screen.Height - 1490
   PlayButton.Top = Screen.Height - 1490
   LoadPlay.Top = Screen.Height - 995
   Now.Top = Screen.Height - 995

   ScreenShow(0).Left = 0.311 * Screen.Width
   For X = 1 To 4
      ScreenShow(X).Left = ScreenShow(X - 1).Left + 1200
   Next X
   undo.Left = Screen.Width - 2025
   Help.Left = Screen.Width - 2985
   Label2.Left = 0.4 * Screen.Width
   search.Left = Screen.Width - 4575
   ClrSrch.Left = Screen.Width - 2175
   Playlist(0).Width = Picture1.Width - 240
   Playlist(1).Width = Screen.Width

Else
   HeadExpand = 0
   maxed = True
```

```
Call FormatHeaders
Call ExpandListButs
HeadExpand = (Screen2.Width - 11565) / 340
Call ExpandListButs
Call FormatHeaders
If ExpandList.Caption = "EXPAND" Then
   Picture1.Left = 6720
   Picture1.Width = 4815
   Playlist(1).Left = 120
   Playlist(0).Left = 120
   Label1.Left = 1440
Else
   Picture1.Left = 0
   Picture1.Width = 11535
   Playlist(1).Left = 0
   Playlist(0).Left = 0
   Label1.Left = 4200
End If
SinglePlayTime.Left = 4800
Label5.Left = 6240
Picture1.Top = 0
Picture4.Height = 2775
Picture4.Width = 11535
searchlist.Width = 11435
searchlist.Top = 480
searchlist.Height = 2175
For X = 0 To 4
   ScreenShow(X).Top = 7800
Next X
undo.Top = 7800
Help.Top = 7800
LoadPlay.Top = 7560
Now.Top = 8040
SavePlay.Top = 8040
PlayButton.Top = 7560
Label2.Left = 4080
ScreenShow(0).Left = 3600
For X = 1 To 4
   ScreenShow(X).Left = ScreenShow(X - 1).Left + 1200
Next X
undo.Left = 9540
Help.Left = 8580
search.Left = 6840
ClrSrch.Left = 9240
Playlist(0).Width = Picture1.Width - 240
Playlist(1).Width = 11535
End If
ExitSystem.Left = undo.Left + 975
ExitSystem.Top = undo.Top
End Sub
Private Sub AddList_Click(Index As Integer)
Dim i As Integer
Dim j As Integer
Dim oldcolor, oldcolor2, oldcolor3 As Long
```

```
Dim oldtime As Integer
On Error GoTo errorhandler
delete.Enabled = True
ExpandList.Enabled = True
SavePlay.Enabled = True
Command1.Enabled = True
RndMix.Enabled = True
If IsNull(channel) Then
   channel = 1
   OtherChannel = 2
End If
MousePointer = 11
'select the text from the search list
Now.BackColor = &HFF&
Now.Enabled = True
PlayButton.Enabled = True
PlayButton.BackColor = &HFF8080
undo.Enabled = True
   UndoEvent = 0
   If Playlist(0).Rows = 1 Then
      numRows = 0
   Else
      SavePlayList
   End If
If searchlist.Rows >= 1 Then

      'if the PICK button is pushed
      If Index = 1 Then
         If SelList = 1 Then
            PlaySongs = PlaySongs + 1
            zed = zed + 1
            For i = 0 To 8
               selsong(i) = searchlist.TextMatrix(searchlist.row, i)
               PlayedSongs(1, zed, i) = searchlist.TextMatrix(searchlist.row, i)

            Next i
            PlayedSongs(1, zed, 9) = searchlist.CellBackColor
            Playlist(0).AddItem selsong(0) & Chr(9) & selsong(1) & Chr(9) & selsong(2)
            Playlist(1).AddItem selsong(0) & Chr(9) & selsong(1) & Chr(9) & selsong(2) & Chr(9) & selsong(3) & Chr(9) &
selsong(4) & Chr(9) & selsong(5) & Chr(9) & selsong(6) & Chr(9) & selsong(7) & Chr(9) & selsong(8)
            'add a song to the total to be played

            NumSongs.Text = PlaySongs
            Playlist(0).row = Playlist(0).Rows - 1
            Playlist(1).row = Playlist(1).Rows - 1
            'add the song time to the play time box
            SongsTime = SongsTime + CLng(Val(searchlist.TextMatrix(searchlist.row, 0)))
            timebox.Text = Format(TimeSerial(0, 0, SongsTime), "hh:mm:ss")
            For z = 0 To 2
               Playlist(0).Col = z
               Playlist(0).CellBackColor = searchlist.CellBackColor
               Playlist(0).BackColorSel = searchlist.CellBackColor
               Playlist(0).ForeColorSel = searchlist.CellForeColor
            Next z
```

```
      For z = 0 To 8
        Playlist(1).Col = z
        Playlist(1).CellBackColor = searchlist.CellBackColor
        Playlist(1).BackColorSel = searchlist.CellBackColor
        Playlist(1).ForeColorSel = searchlist.CellForeColor
      Next z
    End If
    'if the NEXT button is pushed
  ElseIf Index = 0 Then

    'if the searchlist is selected
    If SelList = 1 Then
      zed = zed + 1
      For i = 0 To 8
        selsong(i) = searchlist.TextMatrix(searchlist.row, i)
        PlayedSongs(1, zed, i) = searchlist.TextMatrix(searchlist.row, i)
      Next i
      PlayedSongs(1, zed, 9) = searchlist.CellBackColor
      'if the is only one row in the playlist (fixed top)
      If Playlist(0).Rows = 1 Then
        Playlist(0).Rows = Playlist(0).Rows + 1
        Playlist(1).Rows = Playlist(1).Rows + 1
        NumSongs.Text = PlaySongs
        time = CLng(Val(searchlist.TextMatrix(searchlist.row, 0)))
        SongsTime = SongsTime + CLng(Val(searchlist.TextMatrix(searchlist.row, 0)))
        timebox.Text = Format(TimeSerial(0, 0, SongsTime), "hh:mm:ss")
        For j = 0 To 2
          Playlist(0).TextMatrix(1, j) = selsong(j)
          Playlist(0).row = 1
          Playlist(0).Col = j
          Playlist(0).CellBackColor = searchlist.CellBackColor
          Playlist(0).BackColorSel = searchlist.CellBackColor
          Playlist(0).ForeColorSel = searchlist.CellForeColor
        Next j
        For j = 0 To 8
          Playlist(1).TextMatrix(1, j) = selsong(j)
          Playlist(1).row = 1
          Playlist(1).Col = j
          Playlist(1).CellBackColor = searchlist.CellBackColor
          Playlist(1).BackColorSel = searchlist.CellBackColor
          Playlist(1).ForeColorSel = searchlist.CellForeColor
        Next j
      Else
        'if the is more than one row in the playlist
        Playlist(0).Rows = Playlist(0).Rows + 1
        Playlist(1).Rows = Playlist(1).Rows + 1
        PlaySongs = PlaySongs + 1
        NumSongs.Text = PlaySongs

        For i = Playlist(0).Rows - 2 To 1 Step -1
          For X = 0 To 1
            Playlist(X).row = i
            oldcolor = Playlist(X).CellBackColor
            Playlist(X).RowPosition(i) = i + 1
```

```
                Playlist(X).row = j + 1
              Next X
              For j = 0 To 2
                  Playlist(0).Col = j
                  'change color
                  Playlist(0).CellBackColor = oldcolor
                  Playlist(0).BackColorSel = searchlist.CellBackColor
                  Playlist(0).ForeColorSel = searchlist.CellForeColor
              Next j
              For j = 0 To 8
                 Playlist(1).Col = j
                  'change color
                  Playlist(1).CellBackColor = oldcolor
                  Playlist(1).BackColorSel = searchlist.CellBackColor
                  Playlist(1).ForeColorSel = searchlist.CellForeColor
              Next j

           Next i
           For i = 0 To 8
              selsong(i) = searchlist.TextMatrix(searchlist.row, i)
           Next i
           For j = 0 To 2
              Playlist(0).TextMatrix(1, j) = selsong(j)
              Playlist(0).row = 1
              Playlist(0).Col = j
              Playlist(0).CellBackColor = searchlist.CellBackColor
              Playlist(0).BackColorSel = searchlist.CellBackColor
              Playlist(0).ForeColorSel = searchlist.CellForeColor
           Next j
           For j = 0 To 8
              Playlist(1).TextMatrix(1, j) = selsong(j)
              Playlist(1).row = 1
              Playlist(1).Col = j
              Playlist(1).CellBackColor = searchlist.CellBackColor
              Playlist(1).BackColorSel = searchlist.CellBackColor
              Playlist(1).ForeColorSel = searchlist.CellForeColor
           Next j
           SongsTime = SongsTime - CLng(Val(searchlist.TextMatrix(searchlist.row, 0)))
           timebox.Text = Format(TimeSerial(0, 0, SongsTime), "hh:mm:ss")
        End If
     Else
        'if the playlist is selected then just move the song to the top
        If Playlist(0).Rows = 1 Then
           MsgBox "the Song you want to move is already next!"

        Else

           X = Playlist(0).row
           For Y = 0 To 8
              selsong(Y) = Playlist(1).TextMatrix(X, Y)
           Next Y
           oldcolor2 = Playlist(0).CellBackColor
           oldcolor3 = Playlist(0).CellForeColor
```

```
            For i = X - 1 To 1 Step -1
              Playlist(0).row = i
              Playlist(1).row = i
              oldcolor = Playlist(0).CellBackColor
              For j = 0 To 2
                Playlist(0).TextMatrix(i + 1, j) = Playlist(0).TextMatrix(i, j)
                Playlist(0).row = i + 1
                Playlist(0).Col = j
                'change color
                Playlist(0).CellBackColor = oldcolor
                Next j
              For j = 0 To 8
                Playlist(1).TextMatrix(i + 1, j) = Playlist(1).TextMatrix(i, j)
                Playlist(1).row = i + 1
                Playlist(1).Col = j
                'change color
                Playlist(1).CellBackColor = oldcolor
              Next j
            Next i
            For j = 0 To 2
              Playlist(0).TextMatrix(1, j) = selsong(j)
              Playlist(0).row = 1
              Playlist(0).Col = j
              Playlist(0).CellBackColor = oldcolor2
              Playlist(0).BackColorSel = oldcolor2
              Playlist(0).ForeColorSel = oldcolor3
            Next j
            For j = 0 To 8
              Playlist(1).TextMatrix(1, j) = selsong(j)
              Playlist(1).row = 1
              Playlist(1).Col = j
              Playlist(1).CellBackColor = oldcolor2
              Playlist(1).BackColorSel = oldcolor2
              Playlist(1).ForeColorSel = oldcolor3
            Next j
          End If
        End If
        'searchlist.RemoveItem searchlist.RowPosition
      End If
    End If
    MousePointer = 0
    UndoRow = Playlist(0).row
    Call CheckOnDeck
    Exit Sub

errorhandler:
    MsgBox ("Sorry, there was a problem with the song data...unable to add to playlist")
    MousePointer = 0
End Sub

Private Sub backup_Click()
If searchfield.Visible = True Then
    searchfield.SetFocus
    SendKeys "{end}"
```

```
SendKeys "{backspace}"
SendKeys "{tab}"
Else
TimeInput.SetFocus
SendKeys "{end}"
SendKeys "{backspace}"
SendKeys "{tab}"
End If
End Sub

Private Sub BeginSearch_Click()
'loop to search the Access database
Dim position, final As Long
Dim flag As Boolean
Dim selection As String
Dim Mcat1 As String
Dim string2 As String * 255
Dim SelTag As String
Dim tempfield(9) As String
Dim finalfield(10) As String
'SaveSearchList
On Error GoTo errorhandler
keyboard.Visible = False
delete.Enabled = False
AddList(1).Enabled = False
AddList(0).Enabled = False
CancelSearch = False
If searchflag >= 10 Then
    MsgBox "Sorry, you have already narrowed your search to ten categories !!!"
    MousePointer = 0

    searchfield.Text = ""
    search.Enabled = True
    For i = 1 To 8
        SearchCat(i).Enabled = False
    Next i
    AddList(0).Enabled = True
    AddList(1).Enabled = True
    ClrSrch.Enabled = True
    Organize.Enabled = True
    Exit Sub
End If
UndoEvent = 1
SaveSearchList
undo.Enabled = True
flag = True
SearchCats(0, searchflag) = colnum
SearchCats(1, searchflag) = searchfield.Text
csearch(searchflag).Caption = searchfield.Text
MousePointer = 11
'search data base for first search
If searchflag = 0 Then
  selection = "'*" & Trim(searchfield.Text) & "*'"
  If colnum >= 4 Then
```

```
        Data2.RecordSource = Trim(Str(colnum))
        Data2.Refresh
        Data3.Refresh
        Data2.Recordset.MoveLast
        Data3.Recordset.MoveLast
        Data2.Recordset.MoveFirst
        Data3.Recordset.MoveFirst
        Data2.Recordset.FindFirst "Label LIKE " & selection
        If Data2.Recordset.NoMatch Then
           MsgBox ("Sorry...Could not find that entry.")
           flag = False

        Else
           SelTag = Data2.Recordset.Fields("Tag")
           selection = """" & SelTag & """"
        End If
    End If

MainLoop:
    DoEvents
    Data1.RecordSource = "LP Complete Music Guide"
    Data1.Refresh
    Data2.Refresh
    Data3.Refresh
    Data1.Recordset.MoveLast
    Data3.Recordset.MoveLast
    Data1.Recordset.MoveFirst
    Data3.Recordset.MoveFirst

    Data1.Recordset.FindLast Cat1 & " LIKE " & selection
    If Data1.Recordset.NoMatch Then flag = False
    final = Data1.Recordset.AbsolutePosition
    Data1.Recordset.MoveFirst
    If flag = True Then
    SearchSongs = searchlist.Rows - 1
    Do Until position = final
       DoEvents
       Data1.Recordset.FindNext Cat1 & " LIKE " & selection
       If Data1.Recordset.NoMatch Then

          position = Data1.Recordset.AbsolutePosition

       Else
          position = Data1.Recordset.AbsolutePosition
          'assign song color to tracking array
          Data3.Recordset.MoveFirst
          If IsNull(Data1.Recordset.Fields("Main1")) Then
             Mcat1 = "none found"
             MnCatColor(SearchSongs) = &H80000005
          Else
             Mcat1 = Data1.Recordset.Fields("Main1")
             Data3.Recordset.FindFirst "Main1 = '" & Mcat1 & "'"
             MnCatColor(SearchSongs) = Val(Data3.Recordset.Fields("colorID"))
          End If
```

```
'find the abbreviations for each category
finalfield(9) = Val(Data3.Recordset.Fields("colorID"))
If IsNull(Data1.Recordset.Fields("time")) Then
   finalfield(0) = 300
Else
   finalfield(0) = Data1.Recordset.Fields("time")
End If
If IsNull(Data1.Recordset.Fields("Title")) Then
   finalfield(1) = "NL"
Else
   finalfield(1) = Data1.Recordset.Fields("Title")
End If
If IsNull(Data1.Recordset.Fields("Artist")) Then
   finalfield(2) = "NL"
Else
   finalfield(2) = Data1.Recordset.Fields("Artist")
End If
If IsNull(Data1.Recordset.Fields("Date")) Then
   finalfield(3) = "NL"
Else
   finalfield(3) = Data1.Recordset.Fields("Date")
End If
If IsNull(Data1.Recordset.Fields("Main1")) Then
   tempfield(4) = "NL"
Else
   tempfield(4) = Data1.Recordset.Fields("Main1")
End If
If IsNull(Data1.Recordset.Fields("Mstyle")) Then
   tempfield(5) = "NL"
Else
   tempfield(5) = Data1.Recordset.Fields("Mstyle")
End If
If IsNull(Data1.Recordset.Fields("Dtype")) Then
   tempfield(6) = "NL"
Else
   tempfield(6) = Data1.Recordset.Fields("Dtype")
End If
If IsNull(Data1.Recordset.Fields("Speed")) Then
   tempfield(7) = "NL"
Else
   tempfield(7) = Data1.Recordset.Fields("Speed")
End If
If IsNull(Data1.Recordset.Fields("Energy")) Then
   tempfield(8) = ""
Else
   tempfield(8) = Data1.Recordset.Fields("Energy")
End If
   For X = 4 To 8
   Data2.RecordSource = X
   Data2.Refresh
   Data2.Recordset.MoveLast
   Data2.Recordset.MoveFirst
   Data2.Recordset.FindFirst "Tag = '" & tempfield(X) & "'"
   finalfield(X) = Data2.Recordset.Fields("Label")
```

```
            Next X
            searchlist.AddItem finalfield(0) & Chr(9) & finalfield(1) & Chr(9) & finalfield(2) & Chr(9) & finalfield(3) & Chr(9) &
finalfield(4) & Chr(9) & finalfield(5) & Chr(9) & finalfield(6) & Chr(9) & finalfield(7) & Chr(9) & finalfield(8)
            If IsNull(finalfield(0)) Then
               searchlist.TextMatrix(searchlist.row, 0) = 300
            End If

            searchlist.row = SearchSongs + 1
            For z = 0 To 8
               searchlist.Col = z
               searchlist.CellBackColor = MnCatColor(SearchSongs)
            Next z
            searchlist.BackColorSel = MnCatColor(SearchSongs)
            searchlist.ForeColorSel = searchlist.ForeColor
            SearchSongs = SearchSongs + 1
            search.Caption = "Narrow Search Results"
            searchflag = 1

         End If
         'move to the next data row in data base
         If CancelSearch = True Then
            Data1.Recordset.Close
            Data2.Recordset.Close
            Data3.Recordset.Close
            MousePointer = 0
            SearchScreen.Visible = False
            searchfield.Text = ""
            search.Enabled = True
            For i = 1 To 8
               SearchCat(i).Enabled = False
            Next i
            AddList(0).Enabled = True
            AddList(1).Enabled = True
            ClrSrch.Enabled = True
            Organize.Enabled = True
            Exit Sub
         End If
      Loop
      If colnum = 4 Then
         Call CheckMain(Cat1)
         If MainCount < 8 Then GoTo MainLoop
      End If
      MainCount = 0

   End If
   If SearchSongs > 0 Then flag = True
stoppoint:
   If flag = False Then
      MsgBox "Your entry was either mispelled or is not found in your current Music Library, Please go to Screen 4 and review and
select music from the LP MOAEC Music Library."
      MousePointer = 0
      Data1.Recordset.Close
      Data2.Recordset.Close
```

```
        Data3.Recordset.Close
        keyboard.Visible = True
        searchfield.Text = ""
        searchfield.SetFocus
        Exit Sub
      End If
      Data1.Recordset.Close
      Data2.Recordset.Close
      Data3.Recordset.Close


  ElseIf searchflag < 10 And searchflag <> 0 Then
    'if searchlist is already full, narrow the field

      For j = 1 To searchflag
      i = 1
      Do While i <= searchlist.Rows - 1
      If searchlist.Rows <= 2 Then Exit Do
        If SearchCats(0, j) <> 9 Then
          result = InStr(1, searchlist.TextMatrix(i, SearchCats(0, j)), SearchCats(1, j), 1)
          If result = 0 Then
            searchlist.row = i
            searchlist.RemoveItem searchlist.row
            SearchSongs = SearchSongs - 1

          Else
            i = i + 1
          End If
        ElseIf SearchCats(0, j) = 9 Then
          result = InStr(1, searchlist.TextMatrix(i, SearchCats(0, j)), SearchCats(1, j), 1)
          If result = 0 Then
            searchlist.row = i
            searchlist.RemoveItem searchlist.row
            SearchSongs = SearchSongs - 1

          Else
            i = i + 1
          End If
        End If

      Loop
      Next j
      searchflag = searchflag + 1

  End If

'once the search is complete, hide the screen

MousePointer = 0
SearchScreen.Visible = False
searchfield.Text = ""
search.Enabled = True
  For i = 1 To 8
    SearchCat(i).Enabled = False
```

```
    Next i
  AddList(0).Enabled = True
  AddList(1).Enabled = True
  ClrSrch.Enabled = True
  Organize.Enabled = True
  Exit Sub

  errorhandler:
    MsgBox "Sorry. There was an error accessing music database." & Chr(13) & "Please make sure the database is properly installed
  or" & Chr(13) & "contact Looney Productions."
    MousePointer = 0

  SearchScreen.Visible = False
  searchfield.Text = ""
  search.Enabled = True
    For i = 1 To 8
      SearchCat(i).Enabled = False
    Next i
  AddList(0).Enabled = True
  AddList(1).Enabled = True
  ClrSrch.Enabled = True
  Organize.Enabled = True
  Exit Sub
  End Sub

  Private Sub Cancel_Click()
    keyboard.Visible = False
    SearchScreen.Visible = False
    searchfield.Text = ""
    search.Enabled = True
    For i = 1 To 8
      SearchCat(i).Enabled = False
    Next i
    CancelSearch = True
  End Sub

  Private Sub Category1_Click(Index As Integer)
  Dim i As Integer
  Dim j As Integer
  Dim flag As Boolean
  Dim TempCat, TempCat2 As String
  Dim c As Integer

  Mix.BackColor = &H8000000F
  PlayTime.BackColor = &H8000000F
  Mix.BackColor = &H8000000F
  For i = 0 To 3
    SongSpeed(i).BackColor = &H8000000F
    AllSpeeds.BackColor = &H8000000F


  Next i

  For i = 0 To 2
```

```
    csearch(i).Caption = ""
  Next i
  csearch(0).Caption = "none"
  searchflag = 0
  SelList = 0
  SelCat1 = Category1(Index).Tag
  If Index = 24 Then
    Cat1 = "Dtype"
  ElseIf Index = 25 Then
    Cat1 = "Main1"
  Else
    Cat1 = "Main1"
  End If
  SubCol = "Sub1"
  'if clicked twice, goto category 2 screen and clear time options
  If Index = 23 Then
    Call ListFavHits
    Exit Sub
  End If
  If (cat1count = 1) And (Index = cliktrak) Then
    Call titlefrm.Main
    CatColor = Category1(Index).BackColor

    Category(0).BackColor = CatColor
    Category(1).BackColor = CatColor
    Category(0).Caption = Category1(Index).Tag
    FavHitsLab1.Caption = Category1(Index).Tag
    FavHitsLab1.BackColor = CatColor
    FavHitsLab2.BackColor = CatColor
    Category(1).Visible = False
    cat1count = 0
    For X = 0 To 23
      Category2(X).Caption = ""
      Category2(X).BackColor = &H8000000F
      i = i - 1
    Next X
    'disable speed buttons since switching to screen 3
    For i = 0 To SongSpeed.count - 1
      AllSpeeds.Enabled = False
      SongSpeed(i).Enabled = False
      SongSpeed(i).BackColor = &H8000000F
      AllSpeeds.BackColor = &H8000000F

    Next i
    For i = 0 To 5
      FavHits(i).BackColor = CatColor
    Next i
    Mix.Enabled = False
    PlayTime.Enabled = False
    Mix.BackColor = &H8000000F
    PlayTime.BackColor = &H8000000F
    'change screen lights to screen 3 red
    For i = 0 To 4
      Screen2.ScreenShow(i).BackColor = &H8000000F
```

```
Screen2.ScreenShow(i).ForeColor = &H80000012
Next i
If Index <> 23 Then
   Screen2.ScreenShow(2).BackColor = &HC0&
   Screen2.ScreenShow(2).ForeColor = &H8000000E
   cat1screen.Visible = False
   FavHitsScrn.Visible = False
   cat2screen.Visible = True
End If
For i = 0 To 8
   searchdate(i).BackColor = CatColor
Next i
'Make sure the static categories match the button
If Index = 20 Then
   subcatcount = 9
   subcattotal = 9
   FinalCats(7) = StaticCats(9)
   FinalCats(8) = StaticCats(10)
   FinalCats(9) = StaticCats(11)
ElseIf Index = 18 Then
   subcatcount = 8
   subcattotal = 8
   FinalCats(7) = StaticCats(8)
   FinalCats(8) = StaticCats(11)
ElseIf Index = 1 Then
   subcatcount = 7
   subcattotal = 7
   FinalCats(7) = StaticCats(7)
Else
   subcatcount = 6
   subcattotal = 6
End If
'make the temporary subcats array with tags
For X = 1 To subcattotal
DoEvents
If CancelSearch = True Then GoTo stopme
   Data2.RecordSource = "Subs"
     Data2.Refresh
     Data3.Refresh
     Data2.Recordset.MoveLast
     Data3.Recordset.MoveLast
     Data2.Recordset.MoveFirst
     Data3.Recordset.MoveFirst
     Data2.Recordset.FindFirst "Label = '" & FinalCats(X) & "'"
     If Data2.Recordset.NoMatch Then
        flag = True

     Else
        SubCats(X) = Data2.Recordset.Fields("Tag")

     End If
Next X
```

```
'FIND THE SONG CATEGORY TAG THAT MATCHES THE BUTTON
For X = 1 To subcattotal
DoEvents
If CancelSearch = True Then GoTo stopme
  If SelCat1 = "Energy" Then
    SelCat1 = "EN"
  Else
    Data2.RecordSource = 4
    Data2.Refresh
    Data3.Refresh
    Data2.Recordset.MoveLast
    Data3.Recordset.MoveLast
    Data2.Recordset.MoveFirst
    Data3.Recordset.MoveFirst
    Data2.Recordset.FindFirst "Label = '" & SelCat1 & "'"
    If Data2.Recordset.NoMatch Then
      flag = True

    Else
      SelTag = Data2.Recordset.Fields("Tag")
      SelCat1 = SelTag
      MemCat = SelTag
    End If
  End If
Next X

 'fill secondary category buttons with text from data
MainSubLoop:
  DoEvents
  If CancelSearch = True Then GoTo stopme
  Data1.Refresh
  Data1.Recordset.MoveLast
  Data1.Recordset.MoveFirst
  MousePointer = 11
LoopReset:

  i = 0
    For j = 1 To Data1.Recordset.RecordCount
      'if cat1 matches the first button, type cat2 in the screen3 buttons

      'that is if cat2 is not blank
      If UCase(Data1.Recordset.Fields("Main1")) = UCase(Trim(SelCat1)) And (Data1.Recordset.Fields(SubCol) <> "") Then
        If IsNull(Data1.Recordset.Fields(SubCol)) Then
          j = j + 1
          GoTo LoopReset
        End If
        'and if it isn't already on a button
        flag = False
        'find new subcategories not default from database
          subcatcount = subcattotal
          For l = 1 To subcatcount
            If Data1.Recordset.Fields(SubCol) = SubCats(l) Then
              flag = True
            End If
```

```
            Next l
            If flag = False Then
               SubCats(subcatcount + 1) = Data1.Recordset.Fields(SubCol)
               subcattotal = subcattotal + 1

            End If
        End If
     Data1.Recordset.MoveNext
     Next j

     Call CheckSub(SubCol)
     If SubCount < 11 Then GoTo MainSubLoop
     SubCount = 0
     For X = 1 To subcattotal
        Data2.RecordSource = "Subs"
        Data2.Refresh
        Data3.Refresh
        Data2.Recordset.MoveLast
        Data3.Recordset.MoveLast
        Data2.Recordset.MoveFirst
        Data3.Recordset.MoveFirst
        Data2.Recordset.FindFirst "Tag = '" & SubCats(X) & "'"

     Next X
     'sort subcats array
     For t = subcattotal To 1 Step -1
        DoEvents
        If CancelSearch = True Then GoTo stopme
        TempCat = FinalCats(t - 1)
        TempCat2 = SubCats(t - 1)
        c = StrComp(TempCat, FinalCats(t))
           If c = 1 Then
              FinalCats(t - 1) = FinalCats(t)
              SubCats(t - 1) = SubCats(t)
              FinalCats(t) = TempCat
              SubCats(t) = TempCat2
              t = subcattotal - 1
           End If
     Next t

     'fill buttons with the finalcats array
     For X = 0 To subcattotal - 1
        Category2(X).Caption = FinalCats(X - 1)
        Category2(X).BackColor = Category1(Index).BackColor
        i = i + 1
     Next X



     'make the last of the buttons (if any) blank
     Do While i <= 23
        Category2(i).Caption = " "
        Category2(i).BackColor = &H8000000F
        i = i + 1
```

```
      Loop
  stopme:

     Data2.Recordset.Close
     Data3.Recordset.Close
     cat1screen.Visible = False
     cat2screen.Visible = True
     MousePointer = 0
     'reset color of speed buttons
     CancelSearch = False
     Exit Sub
  End If

'otherwise assign button caption to primary category variable
cliktrak = Index
'enable speed selection buttons
CatColor = Category1(Index).BackColor
PlayTime.BackColor = CatColor
PlayTime.Enabled = True
Mix.Enabled = True
Mix.BackColor = CatColor
   For i = 0 To SongSpeed.count - 1
      AllSpeeds.Enabled = True
      SongSpeed(i).Enabled = True
      SongSpeed(i).BackColor = CatColor
      AllSpeeds.BackColor = CatColor
   Next i
   cat1count = 1
End Sub

Private Sub Category2_Click(Index As Integer)
   Dim flag As Boolean
   Dim i As Integer
   Dim tempfield(9) As String
   Dim finalfield(10) As String

   If Category2(Index).Caption = ButMem Then
      MsgBox ("You just picked that button...Please pick another.")
      Exit Sub
   End If
   ButMem = Category2(Index).Caption

   Cat1 = "Main1"
   flag = False
   Category(1).Caption = Category2(Index).Caption
   Category(1).Visible = True

   If Category2(Index).Caption = "Favorite Hits" Then
      ListFavHits
      Exit Sub
   End If
   If Category2(Index).Caption = "ENERGY" Then SubCol = "Energy"
   'fill search screen with selections from the categories
   MousePointer = 11
```

```
If SelCat1 = "SPMIX" Or SelCat1 = "Special Mixes" Then
    Cat1 = "Main3"
    SelCat1 = "SPMIX"

ElseIf SelCat1 = "EN" Or SelCat1 = "Energy" Then
    Cat1 = "Main2"
    SelCat1 = "EN"
ElseIf SelCat1 = "EL" Or SelCat1 = "Easy Listening" Then
    Cat1 = "Mstyle"
    SelCat1 = "EL"
ElseIf SelCat1 = "Special Dance" Or SelCat1 = "SPD" Then
    Cat1 = "Dtype"
    SelCat1 = "SPD"
End If
MainLoop:
    DoEvents
    Data1.Refresh
    Data3.Refresh
    Data1.Recordset.MoveLast
    Data3.Recordset.MoveLast
    Data1.Recordset.MoveFirst
    Data3.Recordset.MoveFirst

  For i = 1 To Data1.Recordset.RecordCount

    'if the data base field matches search criteria. write it to the searchlist
    If UCase(Data1.Recordset.Fields(Cat1)) = SelCat1 And UCase(Data1.Recordset.Fields(SubCol)) = UCase(Trim(SubCats(Index
- 1))) Then
      Data3.Recordset.MoveFirst
      If IsNull(Data1.Recordset.Fields("Main1")) Then
        Mcat1 = "none listed"
        MnCatColor(SearchSongs) = &H80000005
      Else
        Mcat1 = Data1.Recordset.Fields("Main1")
        Data3.Recordset.FindFirst "Main1 = '" & Mcat1 & "'"
        MnCatColor(SearchSongs) = Val(Data3.Recordset.Fields("colorID"))
        finalfield(9) = Val(Data3.Recordset.Fields("colorID"))
        If IsNull(Data1.Recordset.Fields("time")) Then
          finalfield(0) = 300
        Else
          finalfield(0) = Data1.Recordset.Fields("time")
        End If
        If IsNull(Data1.Recordset.Fields("Title")) Then
          finalfield(1) = "NL"
        Else
          finalfield(1) = Data1.Recordset.Fields("Title")
        End If
        If IsNull(Data1.Recordset.Fields("Artist")) Then
          finalfield(2) = "NL"
        Else
          finalfield(2) = Data1.Recordset.Fields("Artist")
        End If
        If IsNull(Data1.Recordset.Fields("Date")) Then
          finalfield(3) = "NL"
```

```
Else
  finalfield(3) = Data1.Recordset.Fields("Date")
End If
If IsNull(Data1.Recordset.Fields("Main1")) Then
  tempfield(4) = "NL"
Else
  tempfield(4) = Data1.Recordset.Fields("Main1")
End If
If IsNull(Data1.Recordset.Fields("Mstyle")) Then
  tempfield(5) = "NL"
Else
  tempfield(5) = Data1.Recordset.Fields("Mstyle")
End If
If IsNull(Data1.Recordset.Fields("Dtype")) Then
  tempfield(6) = "NL"
Else
  tempfield(6) = Data1.Recordset.Fields("Dtype")
End If
If IsNull(Data1.Recordset.Fields("Speed")) Then
  tempfield(7) = "NL"
Else
  tempfield(7) = Data1.Recordset.Fields("Speed")
End If
If IsNull(Data1.Recordset.Fields("Energy")) Then
  tempfield(8) = ""
Else
  tempfield(8) = Data1.Recordset.Fields("Energy")
End If
  For X = 4 To 8
  Data2.RecordSource = X
  Data2.Refresh
  Data2.Recordset.MoveLast
  Data2.Recordset.MoveFirst
  Data2.Recordset.FindFirst "Tag = '" & tempfield(X) & "'"
  finalfield(X) = Data2.Recordset.Fields("Label")
  Data2.Recordset.Close
Next X
searchlist.AddItem finalfield(0) & Chr(9) & finalfield(1) & Chr(9) & finalfield(2) & Chr(9) & finalfield(3) & Chr(9) &
finalfield(4) & Chr(9) & finalfield(5) & Chr(9) & finalfield(6) & Chr(9) & finalfield(7) & Chr(9) & finalfield(8)
Stime(searchlist.row) = Data1.Recordset.Fields("time")
flag = True
SearchSongs = SearchSongs + 1
search.Caption = "Narrow Search Results"
searchflag = 1
End If

  searchlist.row = SearchSongs
  For z = 0 To 8
    searchlist.Col = z
    searchlist.CellBackColor = finalfield(9)
  Next z
  searchlist.BackColorSel = finalfield(9)
  searchlist.ForeColorSel = searchlist.ForeColor
```

```
      End If

      'move to the next data row in data base
      Data1.Recordset.MoveNext
    Next i
    If Category2(Index).Caption <> "ENERGY" Then
      Call CheckSub(SubCol)
      If SubCount < 11 Then GoTo MainLoop
    End If
    SubCount = 0
    SubCol = "Sub1"
    Data1.Recordset.Close
    Data3.Recordset.Close
    MousePointer = 0
    AddList(0).Enabled = True
    AddList(1).Enabled = True
    ClrSrch.Enabled = True
    Organize.Enabled = True
    If flag = False Then
      MsgBox "No matches were found for your search.  Please try again."
      Exit Sub
    End If

End Sub

Private Sub ClrSrch_Click()

'clear all items off the search list
  UndoEvent = 1
  SaveSearchList
  Call ClearSearchList

End Sub

Public Sub Command1_Click()
Dim answer As Variant
answer = MsgBox("Are you sure you want to delete the current play list?", 4, "Clear Play List")
If answer = vbNo Then
  Exit Sub
Else
  UndoEvent = 0
  SavePlayList
  ClearPlayList
  RndMix.Enabled = False
  If maxed = True Then
    Picture1.Left = 6720
    Picture1.Width = Screen2.Width - 6830
    SinglePlayTime.Left = Screen.Width - 100
    Label5.Left = Screen.Width - 100
    Label1.Left = 1440

  Else
    Picture1.Width = 4695
    Picture1.Left = 6720
```

```
      SinglePlayTime.Left = 4680
      Label5.Left = 6240
      Label1.Left = 1440

    End If
      ExpandList.Left = 120
      ExpandList.Caption = "EXPAND"
      AddList(0).Left = 1020
      AddList(1).Left = 1730
      RndMix.Left = 2430
      delete.Left = 3070
      Command1.Left = 3840

      Playlist(0).Width = Picture1.Width - 240
      Playlist(0).Left = 120
      Playlist(1).Visible = False
    End If
    cat1screen.Visible = True
    Call CheckOnDeck

End Sub

Private Sub DataCreate_Click()
'user creates his own song lists and databases
'show a new form
End Sub

Private Sub datalock_Click()
Dim password As String

   password = InputBox("Please enter the database access password:")
   Datalocked = False
End Sub

Private Sub delete_Click()
Dim answer As String
On Error GoTo errorhandler
If SongSelected = False Then
   MsgBox ("No song has been selected for deletion!!!")
   Exit Sub
End If
answer = MsgBox("Are you sure you want to delete the selected song?", 4, "Remove Song")
If answer = vbYes Then

  If SelList = 2 Then
    UndoEvent = 0
    SavePlayList
    For i = 0 To 8
      UndoText(i) = Playlist(1).TextMatrix(1, i)
    Next i
    If ExpandList.Caption = "EXPAND" Then
      Playlist(1).row = Playlist(0).row
      UndoRow = Playlist(0).row
      For i = 0 To 8
```

```
                UndoText(i) = Playlist(1).TextMatrix(Playlist(0).row, i)
            Next i
            Call DeletePlay(Playlist(0).row)
        Else
            Playlist(0).row = Playlist(1).row
            UndoRow = Playlist(1).row
            For i = 0 To 8
                UndoText(i) = Playlist(1).TextMatrix(Playlist(0).row, i)
            Next i
            Call DeletePlay(Playlist(1).row)
        End If

        SongSelected = False
    ElseIf SelList = 1 Then
        UndoEvent = 1
        SaveSearchList
        If searchlist.Rows <= 2 Then
            search.Caption = "Search Music Categories"
            For i = 0 To 2
                csearch(i).Caption = ""
            Next i
            searchlist.Rows = 1
            Call FormatHeaders
            searchlist.BackColorSel = searchlist.BackColorFixed
                    searchlist.ForeColorSel = searchlist.ForeColorFixed
            csearch(0).Caption = "none"

            SearchSongs = 0
            searchflag = 0
            searchlist.Clear
            searchlist.BackColor = &H8000000E
            searchlist.Rows = 1
            AddList(0).Enabled = False
            AddList(1).Enabled = False
            ClrSrch.Enabled = False
            Organize.Enabled = False
        Else
            UndoEvent = 1
            X = searchlist.row
            'For i = x To searchlist.Rows - 1
            '  Stime(i) = Stime(i + 1)
            'Next i
            For i = 0 To 8
                UndoText(i) = searchlist.TextMatrix(X, i)
            Next i
            searchlist.RemoveItem searchlist.row
            SearchSongs = SearchSongs - 1
        End If
    End If
    Call CheckOnDeck
    undo.Enabled = True
    SongSelected = False
    Exit Sub
ElseIf answer = vbNo Then
```

```
    Exit Sub
  End If

errorhandler:
    Now.BackColor = &H8000000F
    Now.Enabled = False
    PlayButton.Enabled = False
    PlayButton.BackColor = &H8000000F
    MsgBox "You have no songs to delete!"
    delete.Enabled = False
End Sub


Private Sub ExpandList_Click()
    'expand the playlist to display all information

    If ExpandList.Caption = "EXPAND" Then
        cat1screen.Visible = False
        Playlist(1).Visible = True
        ExpandList.Caption = "SHRINK"
        If maxed = True Then
            Picture1.Left = 0
            Picture1.Width = Screen2.Width - 195
            SinglePlayTime.Left = 4680
            Label5.Left = 6240
            Playlist(0).Left = 0
            Playlist(1).Left = 0
            Label1.Left = 0.41 * Picture1.Width
        Else
            Picture1.Width = 11550
            Picture1.Left = 0
            SinglePlayTime.Left = 4680
            Label5.Left = 6240
            Playlist(0).Left = 0
            Playlist(1).Left = 0
            Label1.Left = 4200
        End If

        ExpandList.Left = 120 - 6720
        AddList(0).Left = 1020 + 6720
        AddList(1).Left = 1730 - 6720
        RndMix.Left = 2430 - 6720
        delete.Left = 3070 + 6720
        Command1.Left = 3840 - 6720
        Playlist(1).RowSel = Playlist(0).RowSel


    Else
        If maxed = True Then
            Picture1.Left = 6720
            Picture1.Width = Screen.Width - 6830
            SinglePlayTime.Left = Screen.Width - 100
            Label5.Left = Screen.Width + 100
```

```
        Else
            Picture1.Width = 4815
            Picture1.Left = 6720
            SinglePlayTime.Left = 4800
            Label5.Left = 6500

        End If
        Playlist(0).Left = 120
        Playlist(1).Left = 120
        cat1screen.Visible = True
        Playlist(1).Visible = False
        ExpandList.Caption = "EXPAND"
        ExpandList.Left = 120
        AddList(0).Left = 1020
        AddList(1).Left = 1730
        RndMix.Left = 2430
        delete.Left = 3070
        Command1.Left = 3840
        Playlist(0).RowSel = Playlist(1).RowSel
        Label1.Left = 1440
    End If

    AddList(0).Enabled = False
    AddList(1).Enabled = False
End Sub

Private Sub FavHits_Click(Index As Integer)
    ButMem = FavHits(Index).Caption
    FavHitsFrm2.Visible = True
    FavHitsLab2.Visible = True
    FavHitsLab2.BackColor = FavHitsLab1.BackColor
    FavHitsLab2.Caption = FavHits(Index).Caption
    If PlayedSongs(1, 1, 1) <> "" Then
    Organize.Enabled = True
    For z = 1 To zed

        searchlist.AddItem PlayedSongs(1, z, 0) & Chr(9) & PlayedSongs(1, z, 1) & Chr(9) & PlayedSongs(1, z, 2) & Chr(9) &
PlayedSongs(1, z, 3) & Chr(9) & PlayedSongs(1, z, 4) & Chr(9) & PlayedSongs(1, z, 5) & Chr(9) & PlayedSongs(1, z, 6) & Chr(9) &
PlayedSongs(1, z, 7) & Chr(9) & PlayedSongs(1, z, 8)
        SearchSongs = SearchSongs + 1
        searchlist.row = SearchSongs
        For X = 0 To 8
            searchlist.Col = X
            searchlist.CellBackColor = PlayedSongs(1, z, 9)
        Next X

        ClrSrch.Enabled = True
    Next z
    Else

    MsgBox ("Sorry...You have no song selections defined as favorite hits.")
    End If
End Sub
```

```
Private Sub Form_Load()
Dim i As Integer
Dim running As Boolean
    Screen2.WindowState = 2
    maxed = True
    Data1.DatabaseName = App.Path & "\mydata.mdb"
    Data2.DatabaseName = App.Path & "\mydata.mdb"
    Data3.DatabaseName = App.Path & "\mydata.mdb"
    For i = 0 To 9
        csearch(i).Caption = ""
    Next i
    zed = 0
    Speed = ""
    channel = 1
    SearchSongs = 0
    PlaySongs = 0
    Speed = "Any"
    Datalocked = True
    SongSelected = False
    ScreenShow(1).BackColor = &HC0&
    'assign buttons to color array for reference
    For i = 0 To 35
        MnCatColor(i) = Category1(i).BackColor
    Next i
If VoiceActivation = True Then
    If Not IsDDWinRunning() Then
        running = StartDDWin()
        If Not running Then
            MsgBox "Could not start dragon dictate", vbExclamation
            End
        End If
    End If
    DD.Attach = True
    If FindVocabulary("Moaec") And Not FindGroup("Moaec", "ver1.0") Then
        On Error GoTo VocabAdd
        DeleteVocabulary ("Moaec")
    End If
VocabAdd:
    If Not FindVocabulary("Moaec") Then
        AddVocabulary "Moaec"
        Call AddGroup("Moaec", "ver1.0")
        Call AddGroup("Moaec", "Screen1")
        Call AddGroup("Moaec", "Screen2")
    Call AddGroup("Moaec", "Screen3")
    Call AddGroup("Moaec", "Screen4")
    Call AddWord("Moaec", "Screen2", "[classical]", "")
    Call AddWord("Moaec", "Screen2", "[jazz]", "")
    Call AddWord("Moaec", "Screen2", "[folk]", "")
    Call AddWord("Moaec", "Screen2", "[oldies]", "")
    Call AddWord("Moaec", "Screen2", "[country]", "")
    Call AddWord("Moaec", "Screen2", "[pop]", "")
    Call AddWord("Moaec", "Screen2", "[soul]", "")
    Call AddWord("Moaec", "Screen2", "[R and B]", "")
```

```
Call AddWord("Moaec", "Screen2", "[blues]", "")
Call AddWord("Moaec", "Screen2", "[calypso]", "")
Call AddWord("Moaec", "Screen2", "[disco]", "")
Call AddWord("Moaec", "Screen2", "[funk]", "")
Call AddWord("Moaec", "Screen2", "[rock]", "")
Call AddWord("Moaec", "Screen2", "[metal]", "")
Call AddWord("Moaec", "Screen2", "[top 40]", "")
Call AddWord("Moaec", "Screen2", "[rap]", "")
Call AddWord("Moaec", "Screen2", "[reggae]", "")
Call AddWord("Moaec", "Screen2", "[alternative]", "")
Call AddWord("Moaec", "Screen2", "[ethnic]", "")
Call AddWord("Moaec", "Screen2", "[religion]", "")
Call AddWord("Moaec", "Screen2", "[special events]", "")
Call AddWord("Moaec", "Screen2", "[funny]", "")
Call AddWord("Moaec", "Screen2", "[easy listening]", "")
Call AddWord("Moaec", "Screen2", "[favorite hits]", "")
Call AddWord("Moaec", "Screen2", "[special dance]", "")
Call AddWord("Moaec", "Screen2", "[special mixes]", "")
Call AddWord("Moaec", "Screen2", "[dance]", "")
Call AddWord("Moaec", "Screen2", "[energy]", "")
Call AddWord("Moaec", "Screen2", "[sound effects]", "")
Call AddWord("Moaec", "Screen2", "[sound tracks]", "")
Call AddWord("Moaec", "Screen2", "[television]", "")

Call AddWord("Moaec", "Screen2", "[Dance Mix]", "")
Call AddWord("Moaec", "Screen2", "[Clear]", "")
Call AddWord("Moaec", "Screen2", "[Undo]", "")

Call AddWord("Moaec", "Screen2", "[Search List]", "")
Call AddWord("Moaec", "Screen2", "[Play List]", "")
Call AddWord("Moaec", "Screen2", "[Search]", "")
Call AddWord("Moaec", "Screen2", "[Expand]", "")

Call AddWord("Moaec", "Screen2", "[Shrink]", "")

Call AddWord("Moaec", "Screen2", "[Load]", "")
Call AddWord("Moaec", "Screen2", "[Save]", "")
Call AddWord("Moaec", "Screen2", "[Next]", "")
Call AddWord("Moaec", "Screen2", "[Pick]", "")
Call AddWord("Moaec", "Screen2", "[Delete]", "")

Call AddWord("Moaec", "Screen2", "[Title]", "")
Call AddWord("Moaec", "Screen2", "[Artist]", "")
Call AddWord("Moaec", "Screen2", "[Date]", "")
Call AddWord("Moaec", "Screen2", "[Song Category]", "")
Call AddWord("Moaec", "Screen2", "[Dance Type]", "")
Call AddWord("Moaec", "Screen2", "[Music Style]", "")
Call AddWord("Moaec", "Screen2", "[Speed]", "")
Call AddWord("Moaec", "Screen2", "[Energy]", "")

Call AddWord("Moaec", "Screen2", "[Speed]", "")
Call AddWord("Moaec", "Screen2", "[Fast]", "")
Call AddWord("Moaec", "Screen2", "[Medium]", "")
Call AddWord("Moaec", "Screen2", "[Slow]", "")
```

```
Call AddWord("Moaec", "Screen2", "[Time]", "")

Call AddWord("Moaec", "Screen2", "[OK]", "")
Call AddWord("Moaec", "Screen2", "[Begin Search]", "")
Call AddWord("Moaec", "Screen2", "[Cancel]", "")
Call AddWord("Moaec", "Screen2", "[Cancel]", "")
Call AddWord("Moaec", "Screen2", "[Cancel]", "")
Call AddWord("Moaec", "Screen2", "[minutes]", "")
Call AddWord("Moaec", "Screen2", "[Play]", "")
Call AddWord("Moaec", "Screen2", "[Now]", "")

Call AddWord("Moaec", "Screen2", "[screen 1]", "")
Call AddWord("Moaec", "Screen2", "[screen 2]", "")
Call AddWord("Moaec", "Screen2", "[screen 3]", "")
Call AddWord("Moaec", "Screen2", "[screen 4]", "")
End If
DD.Vocabulary = "Moaec"
DD.Group = "Screen2"
End If
End Sub

Private Sub Form_Unload(Cancel As Integer)

  EndItAll
  End
End Sub

Private Sub Help_Click()
  SendKeys "{F1}"
End Sub

Private Sub Letters_Click(Index As Integer)
'type the letter pressed in the text field
If searchfield.Visible = True Then
  searchfield.SetFocus
  SendKeys LCase(Letters(Index).Caption)
  SendKeys "{tab}"
Else
  TimeInput.SetFocus
  SendKeys LCase(Letters(Index).Caption)
  SendKeys "{tab}"
End If

End Sub


Private Sub LoadPlay_Click()
Dim allCells1, allCells2 As String
Dim FileNum As Integer
Dim CurRow1, CurRow2, CurCol As Integer
Dim FileColors() As Variant
On Error GoTo errorhandler
GrayOut
```

```
If Playlist(0).Rows > 1 Then
   CurRow2 = Playlist(1).row
   CurRow1 = Playlist(0).row
   CurCol = 0
End If
   response = MsgBox("Are you sure you want to replace the current Music Playlist?", 4, "Load Play List")
   If response = vbNo Then
      Exit Sub
   ElseIf response = vbYes Then
      'clear the playlists
      CommonDialog1.DefaultExt = "GDT"
      CommonDialog1.ShowOpen
      FileNum = FreeFile
      Open CommonDialog1.fileName For Input As #FileNum
      Input #FileNum, numRows
      ReDim FileColors(numRows + 1)
      Input #FileNum, allCells1
      Input #FileNum, allCells2
      ClearPlayList
      PlaySongs = 0
      SongsTime = 0
      NumSongs.Text = 0
      timebox.Text = Format(TimeSerial(0, 0, CLng(SongsTime)), "hh:mm:ss")
      SinglePlayTime.Text = "00:00:00"
      Playlist(0).AllowBigSelection = True
      Playlist(1).AllowBigSelection = True
      Playlist(0).Rows = numRows
      Playlist(0).row = 1
      Playlist(0).Col = 0
      Playlist(0).RowSel = numRows - 1
      Playlist(0).ColSel = 2
      Playlist(1).Rows = numRows
      Playlist(1).row = 1
      Playlist(1).Col = 0
      Playlist(1).RowSel = numRows - 1
      Playlist(1).ColSel = 8
      Playlist(0).Clip = allCells1
      Playlist(1).Clip = allCells2
      For i = 1 To numRows - 1
         Input #FileNum, FileColors(i)
         Playlist(0).row = i
         For j = 0 To 2
            Playlist(0).Col = j
            Playlist(0).CellBackColor = FileColors(i)
         Next j
         Playlist(1).row = i
         For k = 0 To 8
            Playlist(1).Col = k
            Playlist(1).CellBackColor = FileColors(i)
         Next k
         SongsTime = SongsTime + CLng(Val(Playlist(0).TextMatrix(i, 0)))
         timebox.Text = Format(TimeSerial(0, 0, SongsTime), "hh:mm:ss")
         PlaySongs = PlaySongs + 1
         NumSongs.Text = PlaySongs
```

```
            Next i

            Close #FileNum
            Playlist(0).AllowBigSelection = False
            Playlist(1).AllowBigSelection = False
            Playlist(0).row = CurRow1
            Playlist(1).row = CurRow2
            Playlist(0).Col = 0
            Playlist(1).Col = 0
            ExpandList.Enabled = True
            delete.Enabled = True
            Command1.Enabled = True
            RndMix.Enabled = True
            Now.Enabled = True
            Now.BackColor = &HFF&
            PlayButton.Enabled = True
            PlayButton.BackColor = &HFF8080
            SavePlay.Enabled = True
            If SongPlaying = True Then
               Call CheckOnDeck
            End If
            CommonDialog1.fileName = ""
            Exit Sub
         End If

      errorhandler:
         If Err.Number = cdlCancel Then
            CommonDialog1.fileName = ""
            Exit Sub
         End If
         MsgBox "Unknown error while loading file " & CommonDialog1.fileName


      End Sub

      Private Sub Mix_Click()
      Dim RanPlace, RanPlace2 As Integer
      Dim TempTime, TempTime2 As integer
      Dim MixCount As Integer
      Dim TestSpeed As String
      Dim LoopStop As Boolean
      Dim slowcount, midcount, fastcount As Boolean
      Dim FirstMedCount, medcount As Integer
      'mix up the selected song list by categories
      Mix.Enabled = False
      If Playlist(0).Rows > 1 Then
         Playlist(0).Col = 0
         Playlist(1).Col = 0
         Playlist(0).ColSel = 2
         Playlist(1).ColSel = 8
      End If
      If SelList = 2 And Playlist(0).Rows > 1 Then

         MixCount = 0
```

```
medcount = 0
'disable once clicked
Mix.Enabled = False
Mix.BackColor = &H8000000F
AddList(0).Enabled = False
AddList(1).Enabled = False
FastSpeed = "FAST"
MidSpeed = "MEDIUM"
SlowSpeed = "SLOW"
fastcount = False
midcount = False
slowcount = False
For i = 1 To Playlist(0).Rows - 1
   TestSpeed = Playlist(1).TextMatrix(i, 7)
   If TestSpeed = "FAST" Then
      fastcount = True
   ElseIf TestSpeed = "MEDIUM" Then
      midcount = True
   ElseIf TestSpeed = "SLOW" Then
      slowcount = True
   End If
Next i
   If slowcount = False Then
      If midcount = False Then
         MidSpeed = "FAST"
         SlowSpeed = "FAST"
      ElseIf fastcount = False Then
         FastSpeed = "MEDIUM"
         MidSpeed = "MEDIUM"
         SlowSpeed = "MEDIUM"
      Else
         FastSpeed = "FAST"
         MidSpeed = "FAST"
         SlowSpeed = "MEDIUM"
      End If
   ElseIf midcount = False Then
      If fastcount = False Then
         FastSpeed = "SLOW"
         MidSpeed = "SLOW"
      End If
   ElseIf fastcount = False Then
      If slowcount = False Then
         FastSpeed = "MEDIUM"
         SlowSpeed = "MEDIUM"
      End If
   End If


For i = 1 To Playlist(0).Rows - 1
   TestSpeed = Playlist(1).TextMatrix(i, 7)
   If TestSpeed = MidSpeed Then
      medcount = medcount + 1
   End If
Next i
```

```
Do Until LoopStop = True
i = 1
MixCount = 0
LoopStop = True

For i = 1 To Playlist(0).Rows - 1
   If MixCount > 4 Then MixCount = 0
   Playlist(1).row = i
   TestSpeed = Playlist(1).TextMatrix(i. 7)
     If TestSpeed = FastSpeed And MixCount < 3 Then
        MixCount = MixCount + 1
     ElseIf TestSpeed = SlowSpeed And MixCount >= 3 Then
        MixCount = MixCount + 1
     Else
        Playlist(0).RowPosition(i) = Playlist(0).Rows - 1
        Playlist(1).RowPosition(i) = Playlist(1).Rows - 1
        medcount = medcount + 1
        LoopStop = False
     End If
     If i >= Playlist(1).Rows - medcount Then
        LoopStop = True
     End If


   Next i
 Loop
   For j = 0 To 1
      Playlist(j).row = 1
      Playlist(j).BackColorSel = Playlist(j).CellBackColor
      Playlist(j).ForeColorSel = Playlist(j).CellForeColor
   Next j
   delete.Enabled = False
 Else
   Speed = "MIXED"
   Mix.Enabled = False
   Mix.BackColor = &H8000000F
   For i = 0 To 3
      SongSpeed(i).BackColor = &H8000000F
      SongSpeed(i).Enabled = False
      AllSpeeds.BackColor = &H8000000F
      AllSpeeds.Enabled = False
   Next i
End If
If SongPlaying = True Then
   Call CheckOnDeck
End If
End Sub

Private Sub Now_Click()

Dim CurControl As Integer
```

```
If SelList = 1 Then CurControl = searchlist.row
If SelList = 2 Then CurControl = Playlist(0).row

Call StartPlay(CurControl. SelList)



End Sub

Private Sub Organize_Click()
   'enable the sorting buttons
   sortstat = True
   search.Enabled = False
   For i = 1 To 8
      SearchCat(i).Enabled = True
   Next i
End Sub

Private Sub OrgLst_Click(Index As Integer)
'sort the searchlist by category
   OrgLst(0).Enabled = False
   OrgLst(1).Enabled = False
   Organize.Enabled = True
   search.Enabled = True
   sortstat = False
   searchlist.Sort = Index + 1
   For i = 1 To 8
      SearchCat(i).Enabled = False
   Next i
End Sub

Private Sub PlayButton_Click()

   Call StartPlay(1. 2)

End Sub

Private Sub Playlist_Click(Index As Integer)
If Playlist(Index).Rows > 1 Then
SelList = 2
SongSelected = True
If Playlist(0).Rows = 1 Then Exit Sub
SinglePlayTime.Text = Format(TimeSerial(0. 0, Val(Playlist(Index).TextMatrix(Playlist(Index).row, 0))), "hh:mm:ss")
AddList(1).Enabled = False
AddList(0).Enabled = True

If Index = 0 Then
   Playlist(1).row = Playlist(0).row
   Playlist(1).Col = Playlist(0).Col
End If
If Playlist(1).Col = 0 And Playlist(1).CellBackColor <> &HC0& Then  ' if the song is flagged add it to the top of the favhits list
   Playlist(0).SelectionMode = flexSelectionFree
   Playlist(1).SelectionMode = flexSelectionFree
   Playlist(0).CellBackColor = &H80000008
```

```
For i = 1 To zed
    If PlayedSongs(1, i, 1) = Playlist(Index).TextMatrix(Playlist(Index).row, 1) Then
        FavHitsFinder = i
    End If
Next i
For i = (FavHitsFinder - 1) To 1 Step -1
    For j = 0 To 9
        PlayedSongs(1, i + 1, j) = PlayedSongs(1, i, j)
    Next j
Next i
Playlist(0).Col = 1
Playlist(0).BackColorSel = Playlist(0).CellBackColor
Playlist(0).ForeColorSel = Playlist(0).CellForeColor
Playlist(1).Col = 1
Playlist(1).BackColorSel = Playlist(1).CellBackColor
Playlist(1).ForeColorSel = Playlist(1).CellForeColor
For i = 0 To 8
    selsong(i) = Playlist(1).TextMatrix(Playlist(1).row, i)
    PlayedSongs(1, 1, i) = Playlist(1).TextMatrix(Playlist(1).row, i)
Next i
Playlist(1).Col = 1
Playlist(0).Col = 1
PlayedSongs(1, 1, 9) = Playlist(1).CellBackColor
Else
    Playlist(Index).SetFocus
    delete.Enabled = True
    Playlist(0).Col = 1
    Playlist(0).ColSel = 2
    Playlist(1).Col = 1
    Playlist(1).ColSel = 8
    For i = 0 To 1
        Playlist(i).BackColorSel = &H80000008
        Playlist(i).ForeColorSel = &H8000000E
    Next i
    If Index = 1 Then
        Playlist(0).row = Playlist(1).row
        'Playlist(0).RowSel = Playlist(1).RowSel
        Playlist(0).Col = 1
        Playlist(0).ColSel = 2
    Else
        Playlist(1).row = Playlist(0).row
        'Playlist(1).RowSel = Playlist(0).RowSel
        Playlist(1).Col = 1
        Playlist(1).ColSel = 8
    End If
    Now.Enabled = True
    Now.BackColor = &HFF&
    If searchlist.Rows = 1 Then
        Exit Sub
    End If
    searchlist.BackColorSel = searchlist.CellBackColor
    searchlist.ForeColorSel = searchlist.CellForeColor

End If
```

```
End If
End Sub

Private Sub Playlist_DblClick(Index As Integer)
Dim X As Integer
If Index = 0 Then
   Playlist(1).row = Playlist(0).row
   Playlist(1).Col = Playlist(0).Col

End If
If Playlist(1).Rows > 1 And Playlist(1).Col <> 0 Then
If Index = 1 Then
   Playlist(0).row = Playlist(1).row

End If

If Playlist(0).row = 1 Then
   MsgBox "the Song you want to move is already next!"

Else

      X = Playlist(0).row
      For Y = 0 To 8
         selsong(Y) = Playlist(1).TextMatrix(X, Y)
      Next Y
      oldcolor2 = Playlist(0).CellBackColor
      oldcolor3 = Playlist(0).CellForeColor
      undo.Enabled = True
      UndoEvent = 0
      SavePlayList
      For i = X - 1 To 1 Step -1
         Playlist(0).row = i
         Playlist(1).row = i
         oldcolor = Playlist(0).CellBackColor
         For j = 0 To 2
            Playlist(0).TextMatrix(i + 1, j) = Playlist(0).TextMatrix(i, j)
            Playlist(0).row = i + 1
            Playlist(0).Col = j
            'change color
            Playlist(0).CellBackColor = oldcolor
         Next j
         For j = 0 To 8
            Playlist(1).TextMatrix(i + 1, j) = Playlist(1).TextMatrix(i, j)
            Playlist(1).row = i + 1
            Playlist(1).Col = j
            'change color
            Playlist(1).CellBackColor = oldcolor
         Next j
      Next i
      For j = 0 To 2
         Playlist(0).TextMatrix(1, j) = selsong(j)
         Playlist(0).row = 1
         Playlist(0).Col = j
         Playlist(0).CellBackColor = oldcolor2
```

```
                Playlist(0).BackColorSel = oldcolor2
                Playlist(0).ForeColorSel = oldcolor3
              Next j
              For j = 0 To 8
                Playlist(1).TextMatrix(1, j) = selsong(j)
                Playlist(1).row = 1
                Playlist(1).Col = j
                Playlist(1).CellBackColor = oldcolor2
                Playlist(1).BackColorSel = oldcolor2
                Playlist(1).ForeColorSel = oldcolor3
              Next j
        End If
        Playlist(0).SelectionMode = flexSelectionFree
        Playlist(1).SelectionMode = flexSelectionFree
        Call CheckOnDeck
  End If
End Sub

Private Sub Playlist_Scroll(Index As Integer)
   'make the playlists scroll equally
   Select Case Index
   Case 0
      Playlist(1).TopRow = Playlist(0).TopRow
   Case 1
      Playlist(0).TopRow = Playlist(1).TopRow
   End Select
End Sub

Private Sub PlayTime_Click()
Dim boxcaption As String
On Error GoTo errorhandler
'show the keyboard
TimeFrame.Visible = True
keyboard.Visible = True
AllSpeeds.Visible = True
GrayOut
'pop up the time selection query box
   CurScreen = "Time"
   If Speed <> "Any" Then
      boxcaption = "Please enter the number of minutes you would like " & Speed & " " & SelCat1 & " " & "music to play:"
   Else
      boxcaption = "Please enter the number of minutes you would like " & SelCat1 & " music to play:"
   End If
   TimeLabel.Caption = boxcaption
   TimeInput.SetFocus
Exit Sub
'write the variables to the play boxes with colors
'disable button once clicked

errorhandler:
   MsgBox "You did not enter a valid time."
   Exit Sub

End Sub
```

```
Private Sub RndMix_Click()
   Dim color As Long
   If Playlist(0).Rows > 1 Then
   Randomize
   Playlist(0).SelectionMode = flexSelectionFree
   For i = 1 To Playlist(0).Rows - 1
         k = Rnd()
         Y = Int(Playlist(0).Rows * k)
         If Y <> 0 Then
            Playlist(0).RowPosition(i) = Y
            Playlist(1).RowPosition(i) = Y
         End If

   Next i
   Playlist(0).row = 1
   Playlist(1).row = 1
   Playlist(0).Col = 1
   Playlist(1).Col = 1
   Playlist(0).BackColorSel = Playlist(0).CellBackColor
   Playlist(1).BackColorSel = Playlist(0).CellBackColor
   CheckOnDeck
   End If
End Sub

Private Sub SavePlay_Click()
Dim allCells1, allCells2, colors As String
Dim FileNum, numRows As Integer
Dim CurRow1, CurRow2, CurCol As Integer
Dim FileColors() As Variant

CurRow2 = Playlist(1).row
CurRow1 = Playlist(0).row
CurCol = 0
On Error GoTo errorhandler
   response = MsgBox("Are you Sure you want to save the current Music Play List as a file", 4, "Save Play List")
   If response = vbNo Then
      Exit Sub
   ElseIf response = vbYes Then
      GrayOut
      CommonDialog1.DefaultExt = "GDT"

      CommonDialog1.ShowSave
      Playlist(0).AllowBigSelection = True
      Playlist(0).row = 1
      Playlist(0).Col = 0
      Playlist(0).RowSel = Playlist(0).Rows - 1
      Playlist(0).ColSel = 2
      allCells1 = Playlist(0).Clip
      Playlist(1).AllowBigSelection = True
      Playlist(1).row = 1
      Playlist(1).Col = 0
      Playlist(1).RowSel = Playlist(1).Rows - 1
      Playlist(1).ColSel = 8
```

```
        allCells2 = Playlist(1).Clip
        numRows = Playlist(0).Rows
        ReDim FileColors(Playlist(0).Rows + 1)
        FileNum = FreeFile
        Open CommonDialog1.fileName For Output As #FileNum
        Write #FileNum, numRows
        Write #FileNum, allCells1
        Write #FileNum, allCells2
        For i = 1 To Playlist(0).Rows - 1
          Playlist(0).row = i
          FileColors(i) = Playlist(0).CellBackColor
          Write #FileNum, FileColors(i)
        Next i

        Close #FileNum
        Playlist(1).AllowBigSelection = False
        Playlist(0).AllowBigSelection = False
        Playlist(0).row = CurRow1
        Playlist(1).row = CurRow2
        Playlist(0).Col = 0
        Playlist(1).Col = 0
        Exit Sub
    End If

    errorhandler:
      If Err.Number = cdlCancel Then Exit Sub
      MsgBox "Unknow error while saving file " & CommonDialog1.fileName

    End Sub

    Private Sub ScreenShow_Click(Index As Integer)
    Dim i As Integer
    On Error Resume Next
    If (SelCat1 = "" And Index = 2) Then
      MsgBox ("Please select a main category from screen 2 before viewing this screen !!!")
      Exit Sub
    End If
      Category(1).Visible = False
      cat1count = 0
      'disable speed buttons since switching to screen 3
      For i = 0 To SongSpeed.count - 1
        AllSpeeds.Enabled = False
        SongSpeed(i).Enabled = False
        SongSpeed(i).BackColor = &H8000000F
        AllSpeeds.BackColor = &H8000000F
      Next i
      Mix.Enabled = False
      PlayTime.Enabled = False
      Mix.BackColor = &H8000000F
      PlayTime.BackColor = &H8000000F
   For i = 0 To 4
     Screen1.ScreenShow(i).BackColor = &H8000000F
     ScreenShow(i).BackColor = &H8000000F
     ScreenShow(i).ForeColor = &H80000012
```

```
Next i
If Index <> 0 And Index <> 3 Then
   ScreenShow(Index).BackColor = &HC0&
   ScreenShow(Index).ForeColor = &H8000000E
End If
Select Case Index
   Case 0

     On Error Resume Next
     Screen2.DD.Group = "Screen1"
     Screen1.Show
          If Screen1.WindowState <> 2 Then Screen1.WindowState = 2

     Screen2.Hide
     cat1screen.Visible = True
     cat2screen.Visible = False
     For i = 0 To 4
        Screen1.ScreenShow(i).BackColor = &H8000000F
        Screen1.ScreenShow(i).ForeColor = &H80000012
     Next i
     Screen1.ScreenShow(Index).BackColor = &HC0&
     Screen1.ScreenShow(Index).ForeColor = &H8000000E
     Exit Sub
   Case 1
     Screen2.DD.Group = "Screen2"
     Screen1.Hide
     Screen2.Show
          If Screen2.WindowState <> 2 Then Screen2.WindowState = 2

     cat1screen.Visible = True
     cat2screen.Visible = False
     FavHitsScrn.Visible = False
   Case 2
     Screen2.DD.Group = "Screen2"
     SelCat1 = MemCat
     Screen1.Hide
     Screen2.Show
     If Screen2.WindowState <> 2 Then Screen2.WindowState = 2
     cat1screen.Visible = False
     cat2screen.Visible = True
     FavHitsScrn.Visible = False
   Case 3
     Screen2.DD.Group = "Screen4"
     Recorder.ScreenShow(Index).BackColor = &HC0&
     Recorder.ScreenShow(Index).ForeColor = &H8000000E
     Screen1.Hide
     Screen2.Hide
     Recorder.Show
          If Recorder.WindowState <> 2 Then Recorder.WindowState = 2

     Recorder.Refresh
     cat1screen.Visible = True
     cat2screen.Visible = False
     FavHitsScrn.Visible = False
```

```
End Select

'make the button pressed the right color


End Sub

Private Sub search_Click()
   search.Enabled = False
   GrayOut
   For i = 1 To 8
      SearchCat(i).Enabled = True
   Next i
End Sub

Private Sub SearchCat_Click(Index As Integer)
Dim QuestCat As String
If sortstat = False Then
   'assign the search button caption to the primary search variable

   colnum = Index
   keyboard.Visible = True
   Cat1 = SearchCat(Index).Tag
   QuestCat = SearchCat(Index).Caption
   CurScreen = "SearchCat"
   'Load search screen to begin search

   SearchScreen.Visible = True
      SearchQuiry.Caption = "Please enter the " & QuestCat & " you would like to search for:"
      searchfield.SetFocus
Else
   searchlist.Col = Index
   For i = 1 To 8
      SearchCat(i).Enabled = False
   Next i
   OrgLst(0).Enabled = True
   OrgLst(1).Enabled = True
   Organize.Enabled = False
End If

End Sub

Private Sub searchdate_Click(Index As Integer)
Dim finalfield(10) As String
Dim tempfield(9) As String
If searchdate(Index).Caption = ButMem Then
      MsgBox ("You just picked that button...Please pick another.")
      Exit Sub
   End If
   ButMem = searchdate(Index).Caption

Cat1 = "Main1"
AddList(0).Enabled = True
```

```
AddList(1).Enabled = True
ClrSrch.Enabled = True
Organize.Enabled = True
    Category(1).Caption = searchdate(Index).Caption
    Category(1).Visible = True
    'fill search screen with selections from the categories
    MousePointer = 11
    SearchSongs = searchlist.Rows - 1
    Data1.Refresh
    Data3.Refresh
    Data1.Recordset.MoveLast
    Data1.Recordset.MoveFirst
    Data3.Recordset.MoveLast
    Data3.Recordset.MoveFirst
    If SelCat1 = "SPMIX" Or SelCat1 = "Special Mixes" Then
       Cat1 = "Main3"
       SelCat1 = "SPMIX"

    ElseIf SelCat1 = "EN" Or SelCat1 = "Energy" Then
       Cat1 = "Main2"
       SelCat1 = "EN"
    ElseIf SelCat1 = "EL" Or SelCat1 = "Easy Listening" Then
       Cat1 = "Mstyle"
       SelCat1 = "EL"
    ElseIf SelCat1 = "Special Dance" Or SelCat1 = "SPD" Then
       Cat1 = "Dtype"
       SelCat1 = "SPD"
    End If
    For i = 1 To Data1.Recordset.RecordCount
       DoEvents
       'if the data base field matches search criteria, write it to the searchlist
       If UCase(Data1.Recordset.Fields(Cat1)) = UCase(Trim(SelCat1)) And Data1.Recordset.Fields("date") >=
searchdate(Index).Tag And Data1.Recordset.Fields("date") <= (searchdate(Index).Tag + 9) Then
          Data3.Recordset.MoveFirst
       If IsNull(Data1.Recordset.Fields("Main1")) Then
          Mcat1 = "none listed"
          MnCatColor(SearchSongs) = &H80000005
       Else
          Mcat1 = Data1.Recordset.Fields("Main1")
          Data3.Recordset.FindFirst "Main1 = '" & Mcat1 & "'"
          MnCatColor(SearchSongs) = Val(Data3.Recordset.Fields("colorID"))
          finalfield(9) = Val(Data3.Recordset.Fields("colorID"))
          End If
          If IsNull(Data1.Recordset.Fields("time")) Then
             finalfield(0) = 300
          Else
             finalfield(0) = Data1.Recordset.Fields("time")
          End If
          If IsNull(Data1.Recordset.Fields("Title")) Then
             finalfield(1) = "NL"
          Else
             finalfield(1) = Data1.Recordset.Fields("Title")
          End If
          If IsNull(Data1.Recordset.Fields("Artist")) Then
```

```
        finalfield(2) = "NL"
    Else
        finalfield(2) = Data1.Recordset.Fields("Artist")
    End If
    If IsNull(Data1.Recordset.Fields("Date")) Then
        finalfield(3) = "NL"
    Else
        finalfield(3) = Data1.Recordset.Fields("Date")
    End If
    If IsNull(Data1.Recordset.Fields("Main1")) Then
        tempfield(4) = "NL"
    Else
        tempfield(4) = Data1.Recordset.Fields("Main1")
    End If
    If IsNull(Data1.Recordset.Fields("Mstyle")) Then
        tempfield(5) = "NL"
    Else
        tempfield(5) = Data1.Recordset.Fields("Mstyle")
    End If
    If IsNull(Data1.Recordset.Fields("Dtype")) Then
        tempfield(6) = "NL"
    Else
        tempfield(6) = Data1.Recordset.Fields("Dtype")
    End If
    If IsNull(Data1.Recordset.Fields("Speed")) Then
        tempfield(7) = "NL"
    Else
        tempfield(7) = Data1.Recordset.Fields("Speed")
    End If
    If IsNull(Data1.Recordset.Fields("Energy")) Then
        tempfield(8) = ""
    Else
        tempfield(8) = Data1.Recordset.Fields("Energy")
    End If
    For X = 4 To 8
        Data2.RecordSource = X
        Data2.Refresh
        Data2.Recordset.MoveLast
        Data2.Recordset.MoveFirst
        Data2.Recordset.FindFirst "Tag = '" & tempfield(X) & "'"
        finalfield(X) = Data2.Recordset.Fields("Label")
        Data2.Recordset.Close
    Next X
    searchlist.AddItem finalfield(0) & Chr(9) & finalfield(1) & Chr(9) & finalfield(2) & Chr(9) & finalfield(3) & Chr(9) &
finalfield(4) & Chr(9) & finalfield(5) & Chr(9) & finalfield(6) & Chr(9) & finalfield(7) & Chr(9) & finalfield(8)
    SearchSongs = SearchSongs + 1
    Data3.Recordset.MoveFirst

    searchlist.row = SearchSongs
    For z = 0 To 8
        searchlist.Col = z
        searchlist.CellBackColor = finalfield(9)
    Next z
    searchlist.BackColorSel = finalfield(9)
```

```
            searchlist.ForeColorSel = searchlist.ForeColor
            search.Caption = "Narrow Search Results"
            searchflag = 1
        End If
        flag = True
        'move to the next data row in data base
        Data1.Recordset.MoveNext
    Next i
    Data1.Recordset.Close
    Data3.Recordset.Close


    MousePointer = 0

End Sub

Private Sub searchfield_Change()
    'SendKeys "{tab}"
End Sub

Private Sub searchlist_Click()
If searchlist.RowSel > 0 Then
Now.BackColor = &HFF&
Now.Enabled = True
SelList = 1
SongSelected = True
If searchlist.Rows = 1 Then Exit Sub
FavHitsLab1.BackColor = searchlist.CellBackColor
FavHitsLab2.BackColor = searchlist.CellBackColor
For i = 0 To 5
    FavHits(i).BackColor = searchlist.CellBackColor
Next i
If searchlist.Col = 0 And searchlist.CellBackColor <> &HC0& Then ' if the song is flagged add it to the top of the favhits list
    searchlist.SelectionMode = flexSelectionFree
    searchlist.CellBackColor = &H80000008
    For i = 1 To zed
        If PlayedSongs(1, i, 1) = searchlist.TextMatrix(searchlist.row, 1) Then
            FavHitsFinder = i
        End If
    Next i
    If FavHitsFinder = zed Then FavHitsFinder = FavHitsFinder + 1
    For i = (FavHitsFinder - 1) To 1 Step -1
        For j = 0 To 9
            PlayedSongs(1, i + 1, j) = PlayedSongs(1, i, j)
        Next j
    Next i
    searchlist.Col = 1
    searchlist.BackColorSel = searchlist.CellBackColor
    searchlist.ForeColorSel = searchlist.CellForeColor
    For i = 0 To 8
        selsong(i) = searchlist.TextMatrix(searchlist.row, i)
        PlayedSongs(1, 1, i) = searchlist.TextMatrix(searchlist.row, i)
    Next i
    searchlist.Col = 1
```

```
    PlayedSongs(1, 1, 9) = searchlist.CellBackColor
  Else
    searchlist.SetFocus
    AddList(0).Enabled = True
    AddList(1).Enabled = True
    delete.Enabled = True
    searchlist.Col = 1
    searchlist.ColSel = 8
    searchlist.BackColorSel = &H80000008
    searchlist.ForeColorSel = &H8000000E

    If Playlist(0).Rows > 1 Then
      Playlist(0).BackColorSel = Playlist(0).CellBackColor
      Playlist(0).ForeColorSel = Playlist(0).CellForeColor
      Playlist(1).BackColorSel = Playlist(1).CellBackColor
      Playlist(1).ForeColorSel = Playlist(1).CellForeColor
    End If
End If
End If
End Sub

Private Sub searchlist_DblClick()
Dim flag As Boolean
flag = False
undo.Enabled = True
UndoEvent = 0
If Playlist(0).Rows = 1 Then
  numRows = 0
Else
  SavePlayList
End If


If searchlist.Rows > 1 And searchlist.Col <> 0 Then

  FavHitsLab1.BackColor = searchlist.CellBackColor
  For i = 0 To 5
    FavHits(i).BackColor = searchlist.CellBackColor
  Next i
  PlaySongs = PlaySongs + 1

  For i = 1 To zed
    If searchlist.TextMatrix(searchlist.row, 1) = PlayedSongs(1, i, 1) Then
      flag = True
    End If
  Next i
  If flag = False Then
    zed = zed + 1
    For i = 0 To 8
      PlayedSongs(1, zed, i) = searchlist.TextMatrix(searchlist.row, i)
    Next i
    PlayedSongs(1, zed, 9) = searchlist.CellBackColor
  End If
  For i = 0 To 8
```

```
selsong(i) = searchlist.TextMatrix(searchlist.row, i)
Next i
Playlist(0).AddItem selsong(0) & Chr(9) & selsong(1) & Chr(9) & selsong(2)
Playlist(1).AddItem selsong(0) & Chr(9) & selsong(1) & Chr(9) & selsong(2) & Chr(9) & selsong(3) & Chr(9) & selsong(4) &
Chr(9) & selsong(5) & Chr(9) & selsong(6) & Chr(9) & selsong(7) & Chr(9) & selsong(8)
'add a song to the total to be played

NumSongs.Text = PlaySongs
Playlist(1).row = Playlist(1).Rows - 1
Playlist(0).row = Playlist(0).Rows - 1
'add the song time to the play time box
SongsTime = SongsTime + CLng(Val(searchlist.TextMatrix(searchlist.row, 0)))
timebox.Text = Format(TimeSerial(0, 0, SongsTime), "hh:mm:ss")
For z = 0 To 2
   Playlist(0).Col = z
   Playlist(0).CellBackColor = searchlist.CellBackColor
   Playlist(0).BackColorSel = searchlist.CellBackColor
   Playlist(0).ForeColorSel = searchlist.CellForeColor
Next z
For z = 0 To 8
   Playlist(1).Col = z
   Playlist(1).CellBackColor = searchlist.CellBackColor
   Playlist(1).BackColorSel = searchlist.CellBackColor
   Playlist(1).ForeColorSel = searchlist.CellForeColor
Next z
If Playlist(0).row = 1 Then CheckOnDeck
delete.Enabled = True
RndMix.Enabled = True
ExpandList.Enabled = True
SavePlay.Enabled = True
Command1.Enabled = True
If IsNull(channel) Then
   channel = 1
   OtherChannel = 2
End If
Now.BackColor = &HFF&
Now.Enabled = True
PlayButton.Enabled = True
PlayButton.BackColor = &HFF8080
End If

End Sub

Private Sub searchlist_MouseMove(Button As Integer, Shift As Integer, X As Single, Y As Single)
Dim ScrollWidth As Integer
Dim ButtonWidth As Integer
ButtonWidth = 1080
ScrollWidth = 400
  If (X > searchlist.Width - ScrollWidth) And (searchlist.Height / searchlist.RowHeightMin < searchlist.Rows) Then
     SearchCat(8).Width = ButtonWidth - ScrollWidth + 200 + (HeadExpand * 44)
  Else
     SearchCat(8).Width = ButtonWidth + (HeadExpand * 44)
  End If
End Sub
```

```
Private Sub SongSpeed_Click(Index As Integer)
'select speed category
Speed = SongSpeed(Index).Caption
'disable speed buttons
For i = 0 To SongSpeed.count - 1
   AllSpeeds.Visible = True
   AllSpeeds.Enabled = False
   SongSpeed(i).Enabled = False
   SongSpeed(i).BackColor = &H8000000F
   AllSpeeds.BackColor = &H8000000F
Next i

'enable time selection buttons
   Mix.Enabled = False
   Mix.BackColor = &H8000000F
   PlayTime.Enabled = True
   PlayTime.BackColor = CatColor
   cat1count = 0
End Sub

Private Sub spacebar_Click()

If searchfield.Visible = True Then
   searchfield.SetFocus
   searchfield.Text = searchfield.Text + " "
   SendKeys "{end}"
   SendKeys "{tab}"
Else
   TimeInput.SetFocus
   TimeInput.Text = TimeInput.Text + " "
   SendKeys "{end}"
   SendKeys "{tab}"
End If
End Sub

Private Sub Text1_Change()

End Sub

Private Sub TimeCancel_Click()
   TimeFrame.Visible = False
   keyboard.Visible = False
   CancelSearch = True
End Sub

Private Sub TimeInput_Change()
   'SendKeys "{tab}"
End Sub

Private Sub TimeOK_Click()
Dim TempTime, TotalTime, TimeCount As Long
Dim selection, Mcat1 As String
Dim timearray(3000, 10) As Variant
```

```
Dim MixCount As Integer
Dim tempfield(9) As String
Dim position As Integer
Dim rndcount As Integer
On Error GoTo errorhandler
MousePointer = 11
searchflag = 0
cat1count = 0
FastSpeed = "FAST"
SlowSpeed = "SLOW"
MidSpeed = "MEDIUM"
CancelSearch = False
For i = 0 To 3
   SongSpeed(i).Enabled = False
   SongSpeed(i).BackColor = &H8000000F
   AllSpeeds.BackColor = &H8000000F
   AllSpeeds.Enabled = False
Next i
MixCount = 0
flag = True
i = 0
keyboard.Visible = False
  If TimeInput.Text <> "" Then
    TotalTime = CLng(Val(TimeInput.Text) * 60)
    PlayTime.Enabled = False
    PlayTime.BackColor = &H8000000F
    Mix.BackColor = &H8000000F
    'search the database for songs until the time is up
    Data1.Refresh
    Data3.Refresh
    'FIND THE SONG CATEGORY TAG THAT MATCHES THE BUTTON
    If Cat1 = "Dtype" Then
       Data2.RecordSource = 6


    Else
       Data2.RecordSource = 4
    End If
       Data2.Refresh
       Data3.Refresh
       Data2.Recordset.MoveLast
       Data3.Recordset.MoveLast
       Data2.Recordset.MoveFirst
       Data3.Recordset.MoveFirst
       Data2.Recordset.FindFirst "Label = '" & SelCat1 & "'"
          SelTag = Data2.Recordset.Fields("Tag")
          SelCat1 = SelTag
          If SelCat1 = "SPMIX" Then
             Cat1 = "Main3"
             MainCount = 4
          ElseIf SelCat1 = "EN" Then
             Cat1 = "Main2"
             MainCount = 3
          ElseIf SelCat1 = "EL" Then
```

```
                Catl = "Mstyle"
              End If

          If Speed <> "MIXED" And Speed <> "Any" Then
            Data2.RecordSource = 7
            Data2.Refresh
            Data2.Recordset.MoveFirst
            Data3.Recordset.MoveFirst
            Data2.Recordset.FindFirst "Label LIKE '*" & Speed & "*'"
            SelTag = Data2.Recordset.Fields("Tag")
            Speed = SelTag
          End If
          Data1.Refresh
          Data1.Recordset.MoveLast
          Data1.Recordset.MoveFirst
          Data1.Recordset.FindFirst Cat1 & " like '" & SelCat1 & "' and Speed = 'S'"
          If Data1.Recordset.NoMatch Then
            Data1.Refresh
            Data1.Recordset.MoveLast
            Data1.Recordset.MoveFirst
            Data1.Recordset.FindFirst Cat1 & " like '" & SelCat1 & "' and Speed = 'M'"
            If Data1.Recordset.NoMatch Then
              SlowSpeed = "FAST"
              MidSpeed = "FAST"
            Else
              SlowSpeed = "MEDIUM"
              MidSpeed = "FAST"
            End If
          End If
          undo.Enabled = True
        UndoEvent = 0
        If Playlist(0).Rows = 1 Then
          numRows = 0
        Else
          SavePlayList
        End If
      MainLoop:
          DoEvents
          position = 0
          Data1.Recordset.MoveLast
          Data3.Recordset.MoveLast
          Data1.Recordset.MoveFirst
          Data3.Recordset.MoveFirst
          If Speed <> "Any" And Speed <> "MIXED" Then
            Data1.Recordset.FindLast Cat1 & " like '" & SelCat1 & "' and Speed = '" & Speed & "'"
          Else
            Data1.Recordset.FindLast Cat1 & " LIKE '" & SelCat1 & "'"
          End If
          If Data1.Recordset.NoMatch Then flag = False
          final = Data1.Recordset.AbsolutePosition
          Data1.Recordset.MoveFirst
      If flag = True Then

          Do Until position = final
```

```
DoEvents
If Speed <> "Any" And Speed <> "MIXED" Then
  Data1.Recordset.FindNext Cat1 & " LIKE '" & SelCat1 & "' and Speed = '" & Speed & "'"
Else

  Data1.Recordset.FindNext Cat1 & " LIKE '" & SelCat1 & "'"
End If
  If IsNull(Data1.Recordset.Fields("time")) Then
    timearray(i, 0) = 300
  Else
    timearray(i, 0) = Data1.Recordset.Fields("time")
  End If
  If IsNull(Data1.Recordset.Fields("Title")) Then
    timearray(i, 1) = "NL"
  Else
    timearray(i, 1) = Data1.Recordset.Fields("Title")
  End If
  If IsNull(Data1.Recordset.Fields("Artist")) Then
    timearray(i, 2) = "NL"
  Else
    timearray(i, 2) = Data1.Recordset.Fields("Artist")
  End If
  If IsNull(Data1.Recordset.Fields("Date")) Then
    timearray(i, 3) = "NL"
  Else
    timearray(i, 3) = Data1.Recordset.Fields("Date")
  End If
  If IsNull(Data1.Recordset.Fields("Main1")) Then
    tempfield(4) = "NL"
  Else
    tempfield(4) = Data1.Recordset.Fields("Main1")
  End If
  If IsNull(Data1.Recordset.Fields("Mstyle")) Then
    tempfield(5) = "NL"
  Else
    tempfield(5) = Data1.Recordset.Fields("Mstyle")
  End If
  If IsNull(Data1.Recordset.Fields("Dtype")) Then
    tempfield(6) = "NL"
  Else
    tempfield(6) = Data1.Recordset.Fields("Dtype")
  End If
  If IsNull(Data1.Recordset.Fields("Speed")) Then
    tempfield(7) = "NL"
  Else
    tempfield(7) = Data1.Recordset.Fields("Speed")
  End If
  If IsNull(Data1.Recordset.Fields("Energy")) Then
    tempfield(8) = ""
  Else
    tempfield(8) = Data1.Recordset.Fields("Energy")
  End If
  For X = 4 To 8
    Data2.RecordSource = X
```

```
            Data2.Refresh
            Data2.Recordset.MoveLast
            Data2.Recordset.MoveFirst
            Data2.Recordset.FindFirst "Tag = '" & tempfield(X) & "'"
            timearray(i, X) = Data2.Recordset.Fields("Label")

        Next X 'ReDim timearray(i, 10)
        position = Data1.Recordset.AbsolutePosition
        'assign song color to tracking array
        Data3.Recordset.MoveFirst
        Mcat1 = Data1.Recordset.Fields("Main1")
        Data3.Recordset.FindFirst "Main1 = '" & Mcat1 & "'"
        timearray(i, 9) = Val(Data3.Recordset.Fields("colorID"))
        i = i + 1
        If CancelSearch = True Then
        MousePointer = 0
         Data1.Recordset.Close
         Data2.Recordset.Close
         Data3.Recordset.Close
         SavePlay.Enabled = False
         TimeFrame.Visible = False
        Speed = "Any"
        TimeInput.Text = ""
        Exit Sub
      End If
    Loop
  End If
  If SelCat1 = "SPMIX" Then
    Call CheckMain(Cat1)
    If MainCount < 8 Then GoTo MainLoop
  End If
  MainCount = 0


    Data1.Recordset.Close
    Data2.Recordset.Close
    Data3.Recordset.Close

  If IsEmpty(timearray(0, 1)) Then
  '= "" Then
      MsgBox "You do not have enough Music downloaded in the LP MOAEC Database to fill your request.  Please Go To Screen
4 and Select the Button, Music Available to Download and place your orders with Looney Productions at T# 781-863-2203."
      Speed = "Any"
      MousePointer = 0
      TimeFrame.Visible = False
      TimeInput.Text = ""
      Exit Sub
  ElseIf Speed = "MIXED" And i < 4 Then
      MsgBox "Sorry, there are not enough speed variations to mix that style.  Please try again."
      MousePointer = 0
      TimeFrame.Visible = False
      Speed = "Any"
      TimeInput.Text = ""
      Exit Sub
```

```
Else
  Now.Enabled = True
  Now.BackColor = &HFF&
  PlayButton.Enabled = True
  PlayButton.BackColor = &HFF8080

  SavePlay.Enabled = True
  Command1.Enabled = True
  Now.BackColor = &HFF&
  TimeFrame.Visible = False
  RndMix.Enabled = True
  rndcount = 0
  loopcount = 0
  Randomize
  Do While TimeCount < TotalTime
   DoEvents
     'select random song selections from the song array and add them to the play list

LoopReset:

     k = Rnd()
     Y = Int(i * k)
     AlreadyChosen = False
     If timearray(Y, 0) <> "" Then

        If IsNull(timearray(Y, 1)) Then GoTo LoopReset
        If Speed = "MIXED" Then
           If MixCount > 4 Then MixCount = 0
           If loopcount > 500 Then GoTo DEFAULT
           If (timearray(Y, 7) = FastSpeed And MixCount < 3) Or (timearray(Y, 7) = SlowSpeed And MixCount >= 3) Then

              If rndcount > 0 Then
                 For j = 0 To rndcount
                    If RndSongsCount(j) = timearray(Y, 1) Then
                       AlreadyChosen = True
                    End If
                 Next j
              End If
              If AlreadyChosen = False Then
                 Playlist(0).AddItem timearray(Y, 0) & Chr(9) & timearray(Y, 1) & Chr(9) & timearray(Y, 2)
                 Playlist(1).AddItem timearray(Y, 0) & Chr(9) & timearray(Y, 1) & Chr(9) & timearray(Y, 2) & Chr(9) &
timearray(Y, 3) & Chr(9) & timearray(Y, 4) & Chr(9) & timearray(Y, 5) & Chr(9) & timearray(Y, 6) & Chr(9) & timearray(Y, 7) &
Chr(9) & timearray(Y, 8)
                 RndSongsCount(rndcount) = timearray(Y, 1)
                 loopcount = 0
                 PlaySongs = PlaySongs + 1
                 rndcount = rndcount + 1
                 MixCount = MixCount + 1
              Else
                 loopcount = loopcount + 1
                 GoTo LoopReset
```

```
                End If
              Else
                loopcount = loopcount + 1
                GoTo LoopReset

              End If

            Else
DEFAULT:          If rndcount > 0 Then
                For j = 0 To rndcount
                  If RndSongsCount(j) = timearray(Y, 1) Then
                    AlreadyChosen = True
                  End If
                Next j
              End If
              If AlreadyChosen = False Then
                Playlist(0).AddItem timearray(Y, 0) & Chr(9) & timearray(Y, 1) & Chr(9) & timearray(Y, 2)
                Playlist(1).AddItem timearray(Y, 0) & Chr(9) & timearray(Y, 1) & Chr(9) & timearray(Y, 2) & Chr(9) & timearray(Y,
3) & Chr(9) & timearray(Y, 4) & Chr(9) & timearray(Y, 5) & Chr(9) & timearray(Y, 6) & Chr(9) & timearray(Y, 7) & Chr(9) &
timearray(Y, 8)
                RndSongsCount(rndcount) = timearray(Y, 1)
                PlaySongs = PlaySongs + 1
                rndcount = rndcount + 1
              End If

            End If


            If Playlist(0).Rows > 1 And AlreadyChosen = False Then
              loopcount = 0
              NumSongs.Text = PlaySongs
              Playlist(0).row = Playlist(0).Rows - 1
              Playlist(1).row = Playlist(1).Rows - 1
                For z = 0 To 2
                  Playlist(0).Col = z
                  Playlist(0).CellBackColor = timearray(Y, 9)
                  Playlist(0).BackColorSel = timearray(Y, 9)
                  Playlist(0).ForeColorSel = Playlist(0).CellForeColor
                Next z
                For z = 0 To 8
                  Playlist(1).Col = z
                  Playlist(1).CellBackColor = timearray(Y, 9)
                  Playlist(1).BackColorSel = timearray(Y, 9)
                  Playlist(1).ForeColorSel = Playlist(1).CellForeColor
                Next z
              TempTime = CLng(timearray(Y, 0))
              SongsTime = SongsTime + TempTime
              timebox.Text = Format(TimeSerial(0, 0, SongsTime), "hh:mm:ss")
              TimeCount = TimeCount + TempTime
              zed = zed + 1
              For j = 0 To 8
                'selsong(j) = Playlist(1).TextMatrix(Playlist(1).Row, j)
                PlayedSongs(1, zed, j) = Playlist(1).TextMatrix(Playlist(1).row, j)
```

```
            Next j
            PlayedSongs(1, zed, 9) = Playlist(1).CellBackColor
         Else
            loopcount = loopcount + 1
            If loopcount > 100 Then
               MsgBox ("Sorry, there were not enough different music titles to fill your time request.  Please try another category as well.")
               Exit Do
            End If
         End If


      End If
   Loop
   End If


   Speed = "Any"
   TimeInput.Text = ""
   AddList(0).Enabled = True
   ExpandList.Enabled = True
   delete.Enabled = True
   MousePointer = 0

   End If

  Call CheckOnDeck

  Exit Sub

errorhandler:
   Speed = "Any"
   TimeInput.Text = ""
   AddList(0).Enabled = True
   ExpandList.Enabled = True
   delete.Enabled = True
   MousePointer = 0

  Exit Sub
End Sub

Private Sub undo_Click()
On Error GoTo errorhandler

Select Case UndoEvent
  Case 0
     Call RestorePlayList

  Case 1
     Call RestoreSearchList


  End Select
```

```
undo.Enabled = False
Exit Sub

errorhandler:
   MsgBox ("Sorry....Nothing to undo.")
   undo.Enabled = False
End Sub
```

"titlefrm.frm"

```
Sub Main()
'allocate initial subcategories
   FinalCats(1) = "Dance"
   FinalCats(2) = "ENERGY"
   FinalCats(3) = "Favorite Hits"
   FinalCats(4) = "Traditional"
   FinalCats(5) = "Special Mixes"
   FinalCats(6) = "Club"
   StaticCats(7) = "Big Band"
   StaticCats(8) = "Spanish"
   StaticCats(9) = "Halloween"
   StaticCats(10) = "School Dances"
   StaticCats(11) = "Italian"
   subcatcount = 6
   subcattotal = 6
   CatColor = &H8000000E
   CancelSearch = False
   channel = 1
   cued(1) = False
   cued(2) = False
   ExitButtonPushed = False
   Speed = "Any"


End Sub

Private Sub Animation2_Click()
'enters the system if clicked
titlefrm.Hide
Unload titlefrm
Unload Loader
Animation1.Close
Animation2.Close
Screen1.Show
End Sub

Private Sub EnterSystem_Click(Index As Integer)
'button click to enter the system
If Index = 0 Then
   VoiceActivation = True
ElseIf Index = 1 Then
   VoiceActivation = False
End If
```

```
titlefrm.Hide
Unload titlefrm
Unload Loader
Animation1.Close
Animation2.Close
Load Screen1
Load Screen2
Screen1.Show
End Sub

Private Sub ExitSystem_Click()
Dim response As String
'exit option
response = MsgBox("Are you sure you want to exit?", 4, "Exit System")
  If response = vbNo Then
    Exit Sub
  Else

    Animation1.Close
    Animation2.Close
    EndItAll
    End
  End If
  End

End Sub



Private Sub Form_Activate()
  Dim WaitTime, ftime As Integer
  titlefrm.Refresh
  Call waveOutSetVolume(0, &HFFFFFFFF)
  MMControl1.Command = "stop"
  MMControl1.Command = "reset"
  MMControl1.Command = "play"
  WaitTime = Timer()
  ftime = Timer() - WaitTime

  Do While ftime <= 2
    DoEvents
    ftime = Timer() - WaitTime
  Loop
  Animation2.Visible = True
  Animation1.Visible = False

  'play the theme music
  Do While ftime <= 5
    'wait 9 seconds and then display title
    ftime = Timer() - WaitTime
    DoEvents

    If ftime >= 3 Then
      Title1(0).Visible = True
```

```
        Title1(1).Visible = True
      End If
    Loop
    'play the welcome sound file
    EnterSystem(0).Visible = True
    EnterSystem(1).Visible = True
    ExitSystem.Visible = True


End Sub

Private Sub Form_Load()
   MMControl1.Command = "open"
   titlefrm.WindowState = 2
End Sub

Private Sub Form_Resize()
Dim ScreenHeight As Integer
Dim ScreenWidth As Integer

ScreenHeight = (titlefrm.Height / 2)
ScreenWidth = (titlefrm.Width / 2)
   Title1(0).Width = titlefrm.Width - 105
   Title1(1).Width = titlefrm.Width - 105
   Animation1.Top = ScreenHeight - 1087
   Animation1.Left = ScreenWidth - 1087
   Animation2.Top = ScreenHeight - 1087
   Animation2.Left = ScreenWidth - 1087
   EnterSystem(1).Top = titlefrm.Height - 2880
   EnterSystem(0).Top = EnterSystem(1).Top + 600
   ExitSystem.Top = EnterSystem(1).Top + 1200
   EnterSystem(1).Left = ScreenWidth - 1207
   EnterSystem(0).Left = EnterSystem(1).Left
   ExitSystem.Left = EnterSystem(1).Left

End Sub

Private Sub Form_Unload(Cancel As Integer)
   Animation1.Close
   Animation2.Close
   MMControl1.Command = "stop"
   MMControl1.Command = "close"

End Sub
```

"Module 1"

```
Option Explicit
Global Const NONE = 0

' Clipboard formats
Global Const CF_LINK = &HBF00
Global Const CF_TEXT = 1
Global Const CF_BITMAP = 2
```

```
Global Const CF_METAFILE = 3
Global Const CF_DIB = 8

Global Const MODAL = 1

' ErrNum (LinkError)
Global Const WRONG_FORMAT = 1
Global Const DDE_SOURCE_CLOSED = 6
Global Const TOO_MANY_LINKS = 7
Global Const DATA_TRANSFER_FAILED = 8

' MousePointer
Global Const DEFAULT = 0
Global Const HOURGLASS = 11

' LinkMode (forms and controls)
Global Const LINK_NONE = 0
Global Const LINK_SOURCE = 1
Global Const LINK_AUTOMATIC = 1
Global Const LINK_MANUAL = 2

' Run time errors
Global Const NO_APP_RESPONDED = 282
Global Const DDE_REFUSED = 285

' Button parameter masks
Global Const LEFT_BUTTON = 1
Global Const RIGHT_BUTTON = 2

Global Const MB_YESNO = 4
Global Const MB_ICONQUESTION = 32
Global Const IDYES = 6

Global Const REP_LIGHT = "1 - Light"
Global Const REP_NORMAL = "2 - Normal"
Global Const REP_INTENSE = "3 - Intense"
```

"Module2"

```
Global Const SEL_DEFAULT = "0 - Default"
Global Const SEL_MINIMAL = "1 - Minimal"
Global Const SEL_AUTOMATIC = "2 - Automatic"
Global Const SEL_ALLWORDS = "3 - All Words"
```

"Musicdat"

```
'constants
Public Const WAVECAPS_LRVOLUME = &H8     ' separate left-right volume control
Public Const WAVECAPS_PITCH = &H1     ' supports pitch control
Public Const WAVECAPS_PLAYBACKRATE = &H2     ' supports playback rate control
Public Const WAVECAPS_VOLUME = &H4     ' supports volume control
Public Const WAVE_FORMAT_1S16 = &H8     ' 11.025 kHz, Stereo, 16-bit
Public Const WAVE_GOING = &H3
```

```
Public Const GMEM_MOVEABLE = &H2
Public Const GMEM_ZEROINIT = &H40
Public Const GENERIC_READ = &H80000000
Public Const GENERIC_WRITE = &H40000000
Public Const OPEN_EXISTING = 3
Public Const FILE_ATTRIBUTE_NORMAL = &H80
Public Const CREATE_NEW = 1
Public Const CREAT_ALWAYS = 2

'global variables
Public Cat1 As String
Public MemCat As String
Public SubCol As String
Public maxed As Boolean
Public SelCat1 As String
Public Cat2 As String
Public ScreenIndex As Integer
Public letter As String
Public Speed As String
Public cat1count As Integer
Public CurScreen As String
Public SongsTime As Long, time As Long
Public selsong(8) As String
Public Datalocked As Boolean
Public touchscreen As Boolean
Public cliktrak As Integer
Public songlist As Variant, songlist2 As Variant
Public songlength As Double
Public sortstat As Boolean
Public SelList As Integer
Public CatColor As Variant
Public MinDate(36) As Integer
Public MaxDate(36) As Integer
Public SearchCats(2, 10) As Variant
Public searchflag As Integer
Public colnum As Integer
Public SearchSongs As Integer, PlaySongs As Integer
Public MnCatColor(3000) As Variant
Public subcatcount As Integer, subcattotal As Integer
Public Stime(3000) As String, Ptime(3000), RndSongsCount(3000) As String
Public SubCats(100) As String, FinalCats(100) As String
Public StaticCats(12) As String
Public PlayTime As Integer
Public SongPlaying As Boolean
Public CancelSearch As Boolean
Public channel As Integer
Public HeadExpand As Integer
Public OtherChannel As Integer
Public cmd As String * 255
Public StopList As Boolean, PauseList As Boolean
Public cued(3) As Boolean
Public MainCount As Integer, SubCount As Integer
Public UndoEvent As Integer
Public UndoText(10) As String
```

```
Public UndoRow As Integer
Public ButMem As String
Public PlayedSongs(6, 3000, 10) As Variant
Public PlaylistsPlayed As Integer
Public PlayedTemp(6) As Integer
Public SlowSpeed As String
Public MidSpeed As String
Public FastSpeed As String
Public zed As Integer
Public FavHitsFinder As Integer
Public InitialFolder As String
Public totalFiles As Integer
Public NewSlidePos As Long
Public OldSlidePos As Long
Public volinc(2) As Long
Public RateInc As Long
Public DevID As Long
Public VolumeID As Long
Public VolumeHandle As Long
Public PitchHandle As Long
Public CancelCopy As Boolean
Public allCells1 As String, allCells2 As String, colors As String
Public FileNum As Integer, numRows As Integer
Public CurRow1 As Integer, CurRow2 As Integer, CurCol As Integer
Public FileColors() As Variant
Public AlreadyChosen As Boolean
Public automix As Boolean
Public FadePercent As Single
Public OldVolValue(2) As Long
Public WinPlayConnected As Integer
Public DisplayLibrary As Boolean
Public FirstLibrary As Boolean
Public NextTrackVar As Boolean
Public PrevTrackVar As Boolean
Public AutoExitTime As Long
Public AutoExitStart As Long
Public AutoExitEvent As Boolean
Public ExitButtonPushed
Public CancelLibrary As Boolean
Public VoiceActivation As Boolean
Public SongSelected As Boolean
Public FilePointer As Long
Public OrigVol(9) As Long
Public StoplistingList As Boolean
Public RatingTemp As String
Public RatingBlock As String
Public password As String
Public NewPassword1 As String
Public NewPassword2 As String
Public TimeSoFar As Long
Public NewPauseStartTime As Long

Declare Function waveOutClose Lib "winmm.dll" (ByVal hWaveOut As Long) As Long
```

```
Declare Function waveOutGetVolume Lib "winmm.dll" (ByVal uDeviceID As Long, lpdwVolume As Long) As Long

Declare Function waveOutSetVolume Lib "winmm.dll" (ByVal uDeviceID As Long, ByVal dwVolume As Long) As Long

Declare Function waveOutGetID Lib "winmm.dll" (ByVal hWaveOut As Long, lpuDeviceID As Long) As Long

Declare Function waveOutPause Lib "winmm.dll" (ByVal hWaveOut As Long) As Long

Declare Function waveOutRestart Lib "winmm.dll" (ByVal hWaveOut As Long) As Long

Declare Function waveOutGetPlaybackRate Lib "winmm.dll" (ByVal hWaveOut As Long, lpdwRate As Long) As Long

Declare Function waveOutSetPlaybackRate Lib "winmm.dll" (ByVal hWaveOut As Long, ByVal dwRate As Long) As Long

Declare Function waveOutGetPitch Lib "winmm.dll" (ByVal hWaveOut As Long, lpdwPitch As Long) As Long
Declare Function GlobalAlloc Lib "kernel32" (ByVal wFlags As Long, ByVal dwBytes As Long) As Long

Declare Function GlobalLock Lib "kernel32" (ByVal hMem As Long) As Long

Declare Function GlobalFree Lib "kernel32" (ByVal hMem As Long) As Long

Declare Function GlobalUnlock Lib "kernel32" (ByVal hMem As Long) As Long

Declare Function CreateFile Lib "kernel32" Alias "CreateFileA" (ByVal lpFileName As String, ByVal dwDesiredAccess As Long,
ByVal dwShareMode As Long, lpSecurityAttributes As Any, ByVal dwCreationDisposition As Long, ByVal dwFlagsAndAttributes
As Long, ByVal hTemplateFile As Long) As Long

Declare Function ReadFile Lib "kernel32" (ByVal hFile As Long, lpBuffer As Any, ByVal nNumberOfBytesToRead As Long,
lpNumberOfBytesRead As Long, lpOverlapped As Any) As Long

Declare Function WriteFile Lib "kernel32" (ByVal hFile As Long, lpBuffer As Any, ByVal nNumberOfBytesToWrite As Long,
lpNumberOfBytesWritten As Long, lpOverlapped As Any) As Long

Declare Function GetFileSize Lib "kernel32" (ByVal hFile As Long, lpFileSizeHigh As Long) As Long

Declare Function CloseHandle Lib "kernel32" (ByVal hObject As Long) As Long

Declare Function ExitWindows Lib "user32" (ByVal dwReserved As Long, ByVal uReturnCode As Long) As Long
Declare Function waveOutSetPitch Lib "winmm.dll" (ByVal hWaveOut As Long, ByVal dwPitch As Long) As Long


Public Sub EndItAll()
   Unload Screen1
   Unload Screen2
```

```
    'Unload titlefrm
    'Unload Updater
    'Unload DriveScan
    'Unload Main
    Unload Recorder
    End
End Sub
```

What is claimed is:

1. A music organizer and entertainment center comprising:

a storage device for storing encrypted, compressed data and an associated unique encryption key, the data defining a plurality of individual music selections and associated category flags, the encryption key being associated with an authorized user of the data;

a processor that retrieves selections and the associated category flags from the storage device based upon user selection of predetermined of the categories;

a decompression device that translates the encrypted, compressed data stored in the storage device into playable digital music data if a decrytion key associated with the authorized user and corresponding to the encryption key has been provided to the decompression device; and a sound card that converts the playable digital music data into audible music signals.

2. The center as set forth in claim 1 further comprising a data reading device that transfers data to the data storage device, the data reading device receiving data from a service provider that appends predetermined associated category flags to each of the plurality of individual music selections as originally prepared by the service provider.

3. The center as set forth in claim 2 wherein the data reading device comprises an optical disc reader that reads an optical disc of individual music selections prepared by the service provider.

4. The center as set forth in claim 3 wherein the storage device includes a file having all individual music selections available from the service provider, constructed and arranged so that a user can identify each of the individual music selections whereby the individual music selections can be requested from the service provider.

5. The center as set forth in claim 4 wherein one of the category flags comprises an ownership category flag that indicates which music selections from the list of all music selections are currently resident in the storage device.

6. The center as set forth in claim 1 further comprising a graphical user interface display having a plurality of selectable screens, at least one of the selectable screens including a plurality of category buttons constructed and arranged so that when a predetermined of the category buttons is activated, music selections having category flags matching the predetermined category of a respective of the buttons are selected and listed on the display.

7. The center as set forth in claim 6 wherein at least one of the displays includes a play list of music selections chosen from the search list, the center being constructed and arranged to translate compressed data of each of the music selections on the play list, in a predetermined order, and to convert the playable digital music data into audible music signals.

8. The center as set forth in claim 7 further comprising a memory function constructed and arranged to memorize predetermined lists of music selections for subsequent playback based upon predetermined list identifier commands.

9. The center as set forth in claim 8 wherein at least one of the category flags comprises a rating flag and further comprising means for selectively blocking playback of songs associated with predetermined rating flags, the means for blocking including a password entry function to control the means for blocking.

10. The center as set forth in claim 1 further comprising a display screen having a plurality of graphical user interface displays, at least one of the displays including a plurality of buttons that, when activated, display a list of music selections on a search list having the associated category flags.

11. The center as set forth in claim 10 wherein each of the category buttons is constructed and arranged to display a plurality of sub-category buttons with other associated category flags whereby activation of the sub-category buttons further defines a selection of individual music selections so that the further defined music selections have each of the selected associated category flags.

12. The center as set forth in claim 1 further comprising a graphical user interface having a plurality of display screens, at least one of the screens showing thereon a plurality of buttons associated with individual of the associated category flags, a playback list showing music selections schedule for playback by the center and a search list showing current music selections retrieved based upon predetermined of the category buttons.

13. The center as set forth in claim 12 wherein the graphical user interface comprises a further screen having a plurality of music playback control buttons for controlling sound levels of the audible music signals.

14. The center as set forth in claim 13 wherein the graphical user interface includes a display screen having a listing of all available music selections currently stored in the storage device.

15. The center as set forth in claim 1 wherein the decryption key is stored in the center.

16. The center as set forth in claim 1 wherein the keys comprise a public/private key pair.

17. The center as set forth in claim 1 wherein the center comprises two separately housed units for being docked with each other.

18. The center of claim 1 wherein the center includes a voice-activation mechanism.

* * * * *